United States Patent
Lee

(10) Patent No.: US 12,439,071 B2
(45) Date of Patent: Oct. 7, 2025

(54) METHOD FOR ENCODING/DECODING IMAGE SIGNAL, AND DEVICE THEREFOR

(71) Applicant: Apple Inc., Cupertino, CA (US)

(72) Inventor: Bae Keun Lee, Seongnam-si (KR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/437,671

(22) Filed: Feb. 9, 2024

(65) Prior Publication Data
US 2024/0187629 A1    Jun. 6, 2024

Related U.S. Application Data

(63) Continuation of application No. 18/136,572, filed on Apr. 19, 2023, now Pat. No. 11,936,895, which is a
(Continued)

(30) Foreign Application Priority Data

Feb. 28, 2019    (KR) .................. 10-2019-0023615
Jun. 20, 2019    (KR) .................. 10-2019-0073785

(51) Int. Cl.
H04N 19/46    (2014.01)
H04N 19/105    (2014.01)
(Continued)

(52) U.S. Cl.
CPC .......... *H04N 19/46* (2014.11); *H04N 19/105* (2014.11); *H04N 19/132* (2014.11); *H04N 19/159* (2014.11); *H04N 19/176* (2014.11)

(58) Field of Classification Search
CPC .... H04N 19/46; H04N 19/105; H04N 19/132; H04N 19/159; H04N 19/176; H04N 19/11; H04N 19/70; H04N 19/593
(Continued)

(56) References Cited

U.S. PATENT DOCUMENTS

| | | |
|---|---|---|
| 11,711,534 B2 | 7/2023 | Lee |
| 11,936,895 B2 | 3/2024 | Lee |
| 2014/0362917 A1 | 12/2014 | Joshi |
| 2015/0063462 A1 | 3/2015 | Balaraman |
| 2016/0227221 A1 | 8/2016 | Lai et al. |

(Continued)

FOREIGN PATENT DOCUMENTS

| | | |
|---|---|---|
| EP | 1629437 | 3/2006 |
| EP | 1239680 | 4/2007 |

(Continued)

OTHER PUBLICATIONS

Abdoi et al., "AHG11: Block DPCM for Screen Content Coding," Joint Video Experts Team (JVET) of ITU-T SG 16 WP 3 and ISO/IEC JTC 1/SC 29/WG 11. JVET-L0078. 12th Meeting: Macao, CN, Oct. 3-12, 2018, pp. 1-7.

(Continued)

*Primary Examiner* — Susan E. Hodges
(74) *Attorney, Agent, or Firm* — Fish & Richardson P.C.

(57) ABSTRACT

An image decoding method according to the present invention comprises the steps of: referring to a first flag for indicating whether intra block-based delta pulse code modulation (BDPCM) signaled through a sequence parameter set is permitted, so as to determine whether a second flag for indicating whether the intra BDPCM is applied to a current block is parsed; determining whether the intra BDPCM is applied to the current block on the basis of the second flag; determining an intra BDPCM mode of the current block when it is determined that the intra BDPCM is applied to the current block; and acquiring a residual sample of the current block on the basis of the intra BDPCM mode.

12 Claims, 31 Drawing Sheets

(a)

(b)

Related U.S. Application Data continuation of application No. 17/265,418, filed as application No. PCT/KR2020/002838 on Feb. 27, 2020, now Pat. No. 11,711,534.

(51) Int. Cl.
*H04N 19/132* (2014.01)
*H04N 19/159* (2014.01)
*H04N 19/176* (2014.01)

(58) Field of Classification Search
USPC ........................................................ 375/240
See application file for complete search history.

(56) References Cited

U.S. PATENT DOCUMENTS

| | | | |
|---|---|---|---|
| 2018/0160113 | A1 | 6/2018 | Jeong et al. |
| 2021/0306654 | A1 | 9/2021 | Lee |
| 2022/0070439 | A1* | 3/2022 | Laroche ............... H04N 19/176 |
| 2022/0086429 | A1* | 3/2022 | Ko .......................... H04N 19/70 |
| 2024/0015317 | A1 | 1/2024 | Lee |

FOREIGN PATENT DOCUMENTS

| | | |
|---|---|---|
| KR | 10-2015-0095254 | 8/2015 |
| WO | WO 2009067741 | 6/2009 |
| WO | WO 2014098380 | 6/2014 |
| WO | WO 2018026118 | 2/2018 |

OTHER PUBLICATIONS

Abdoi et al., "CE8: BDPCM with horizontal/vertical predictor and independently decodable areas (test 8.3.1b)," Joint Video Experts Team (JVET) of ITU-T SG 16 WP 3 and ISO/IEC JTC 1/SC 29/WG 11. JVET-M0057, 13th Meeting: Marrakech, MA, Jan. 9-18, 2019, pp. 1-7.

Bross et al., "Versatile Video Coding (Draft 7)," JVET-P2001, version 14, Joint Video Experts Team (JVET) of ITU-T SG 16 WP 3 and ISO/IEC JTC 1/SC 29/WG 11, 16th Meeting, Geneva, CH, Oct. 1-11, 2019, published Nov. 14, 2019, 489 pages.

Clare et al., "CE8-related: SPS flag for BDPCM," Joint Video Experts Team (JVET) of ITU-T SG 16 WP 3 and ISO/IEC JTC 1/SC 29/WG 11. JVET-O0165. 15th Meeting: Gothenburg, SE, Jul. 3-12, 2019, 2 pages.

International Preliminary Report on Patentability in International Appln. No. PCT/KR2020/002838, dated Sep. 10, 2021, 11 pages (with Machine Translation).

International Search Report and Written Opinion in International Appln. No. PCT/KR2020/002838, dated Jun. 4, 2020, 13 pages (with Machine Translation).

International Telecommunication Union, "Series H: Audiovisual and Multimedia Systems: Infrastructure of audiovisual services—Coding of moving video: High efficiency video coding," Recommendation ITU-T H.265, Oct. 2014, 540 pages.

\* cited by examiner

[FIG. 1]
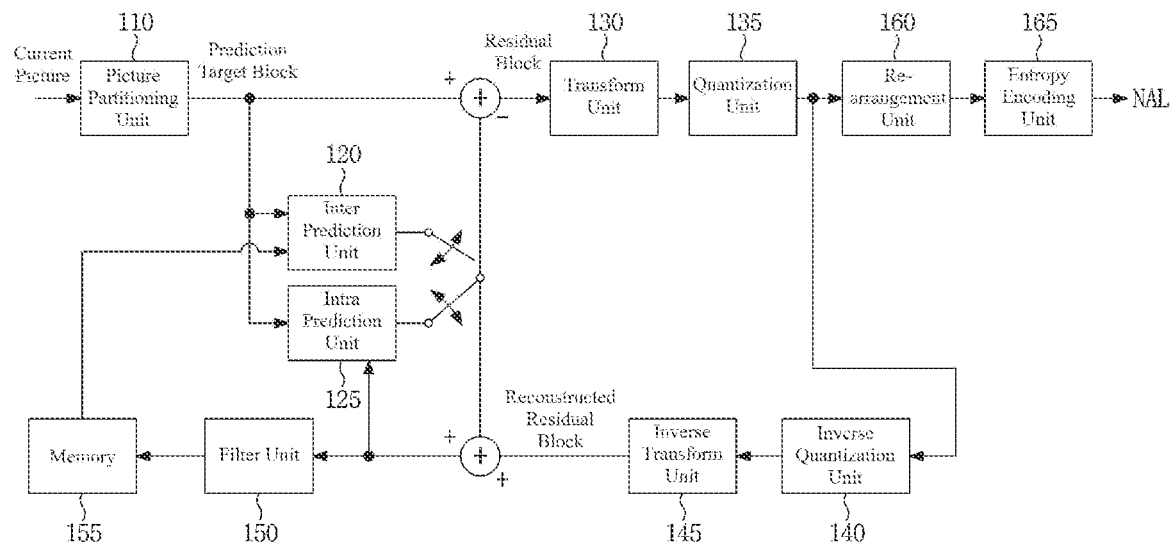
[FIG. 2]
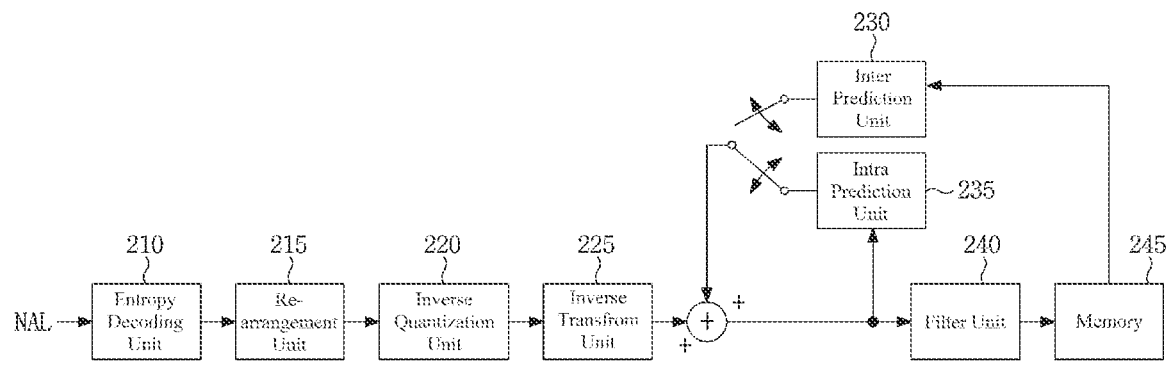

[FIG. 3]
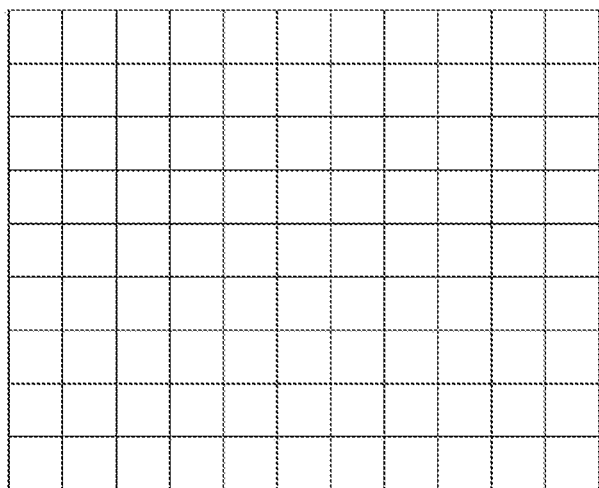
[FIG. 4]
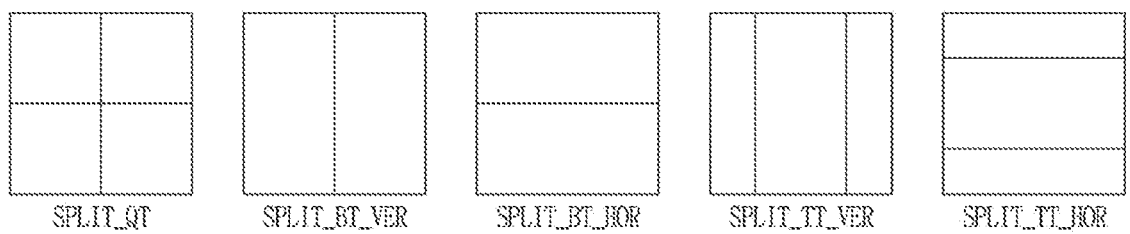

[FIG. 5]
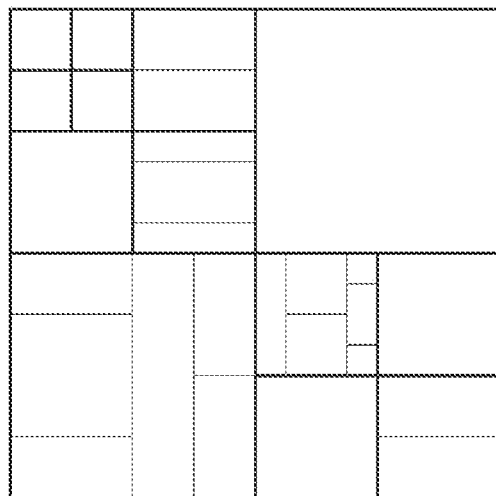
[FIG. 6]
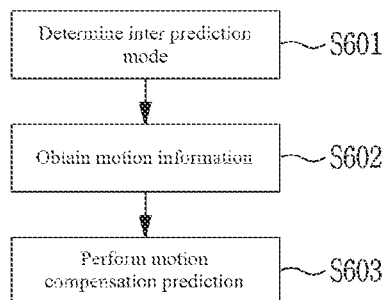
[FIG. 7]
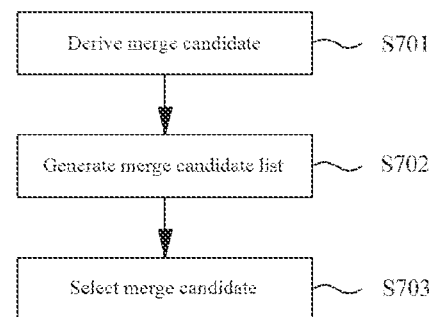

[FIG. 8]
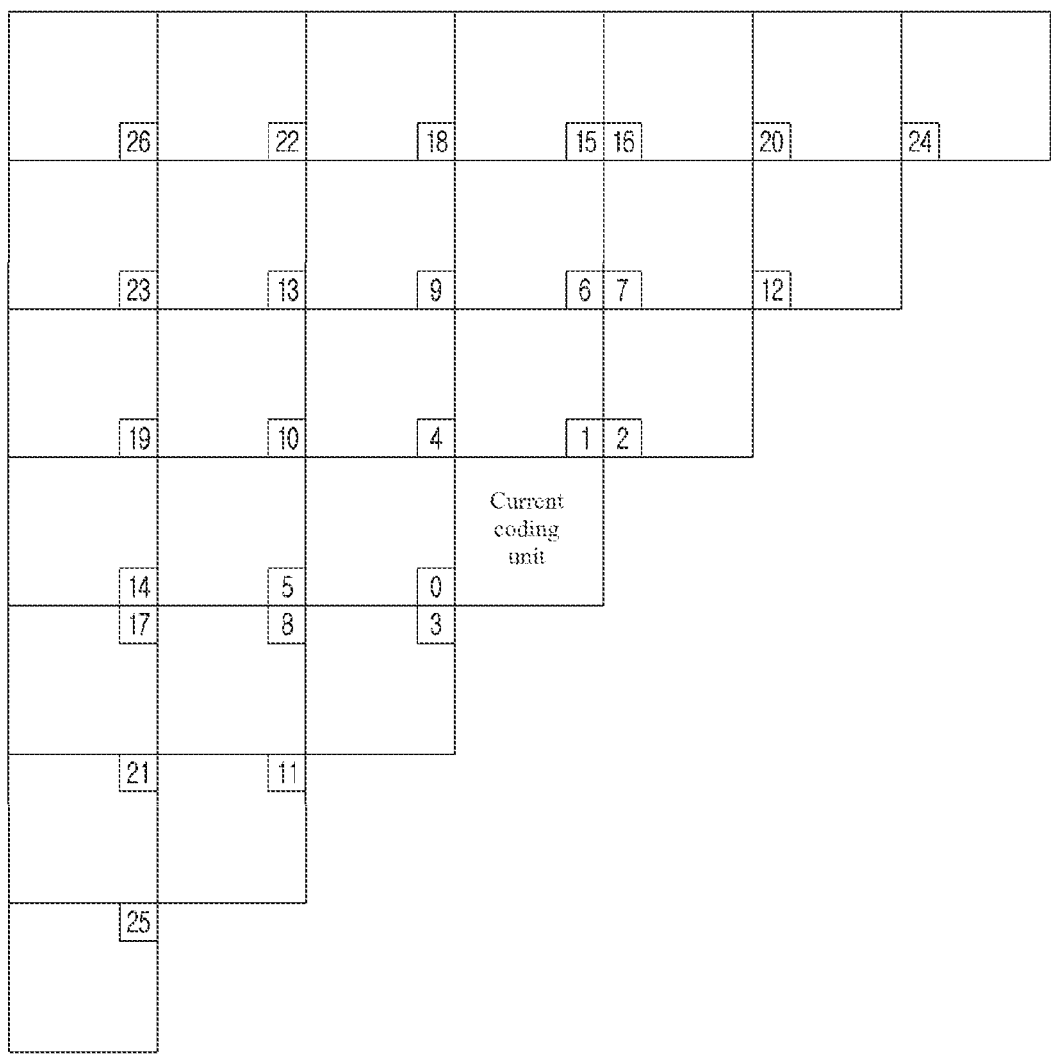

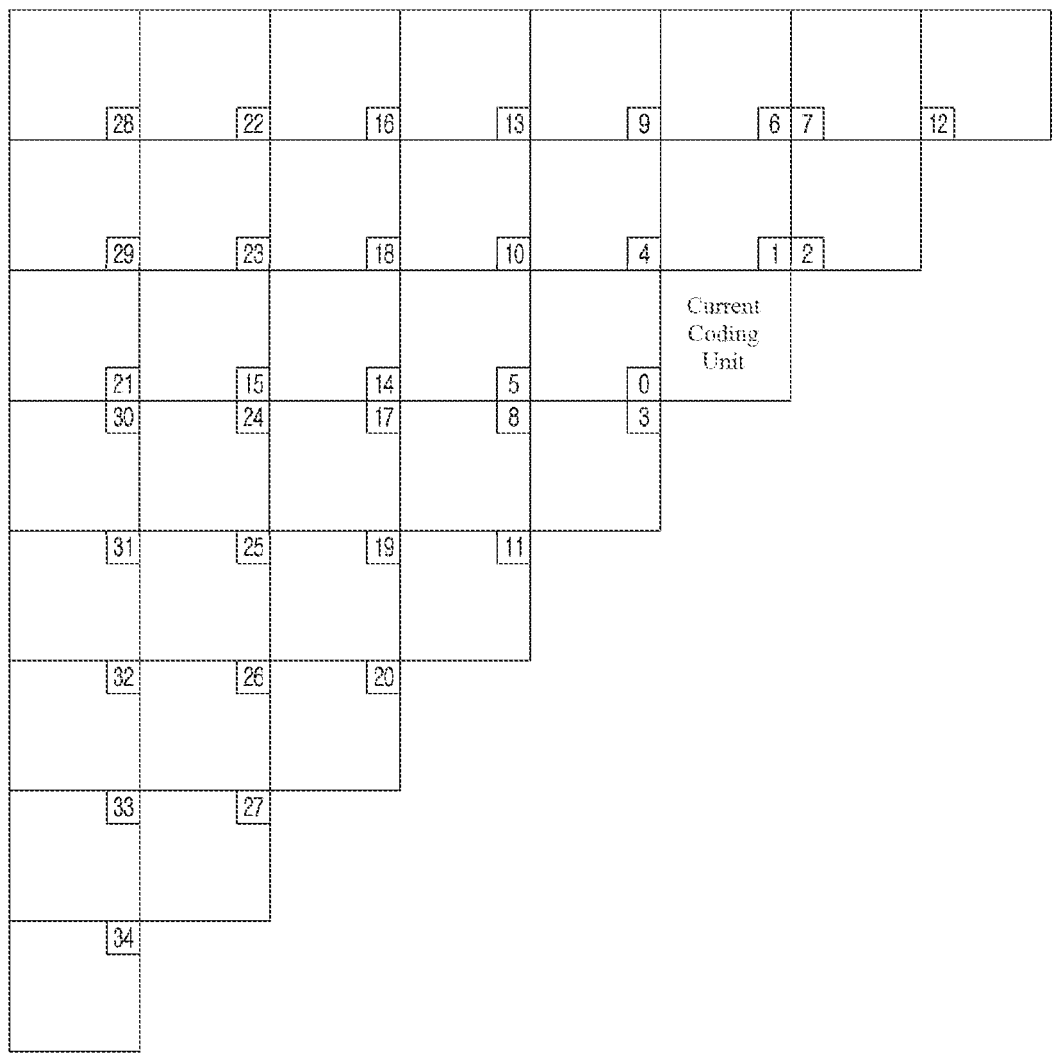
[FIG. 9]

[FIG. 10]
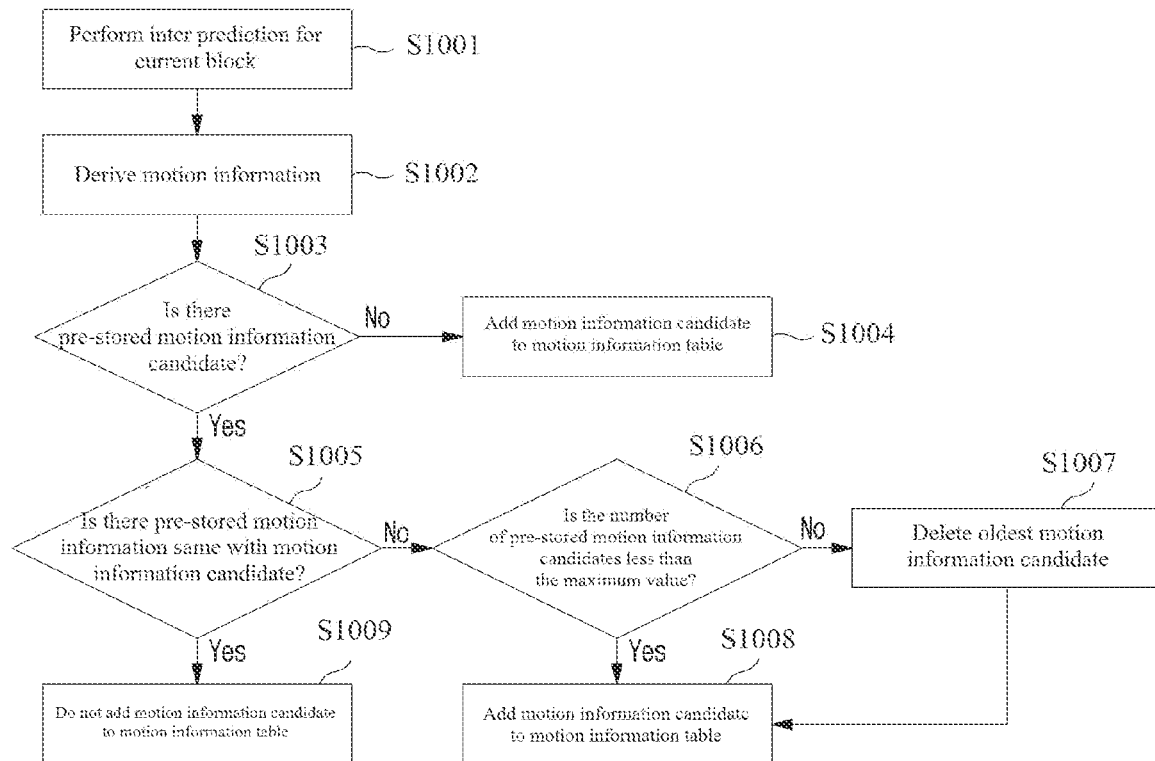
[FIG. 11]
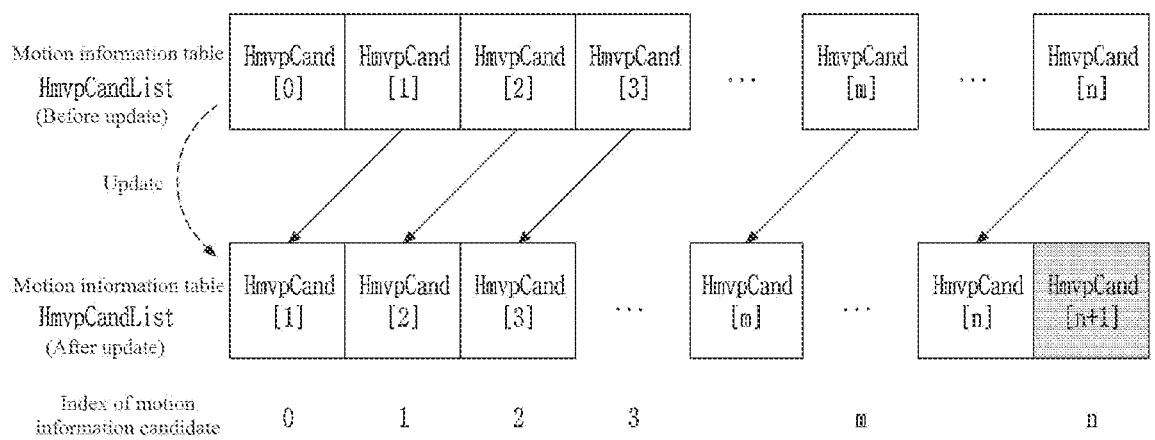

[FIG. 12]
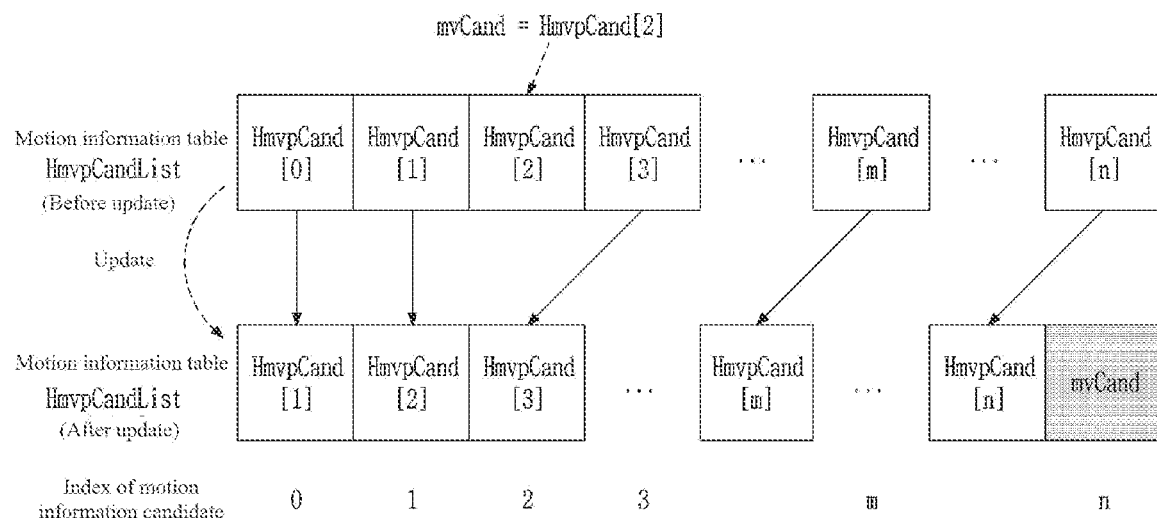
[FIG. 13]
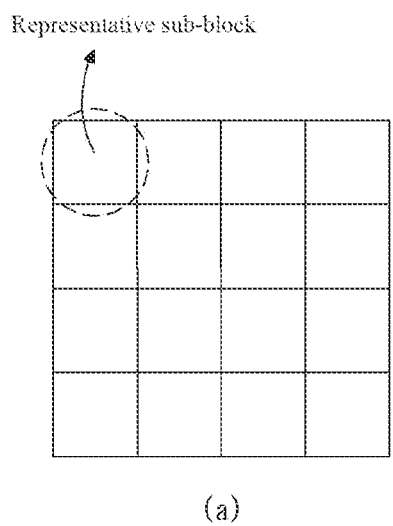
(a)
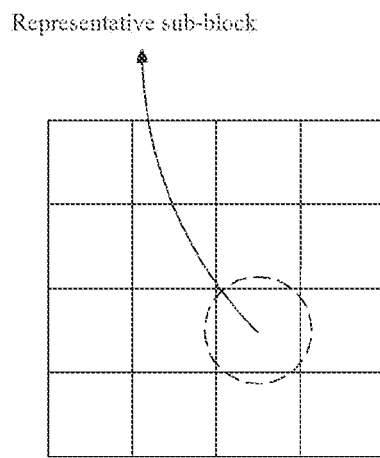
(b)

[FIG. 14]
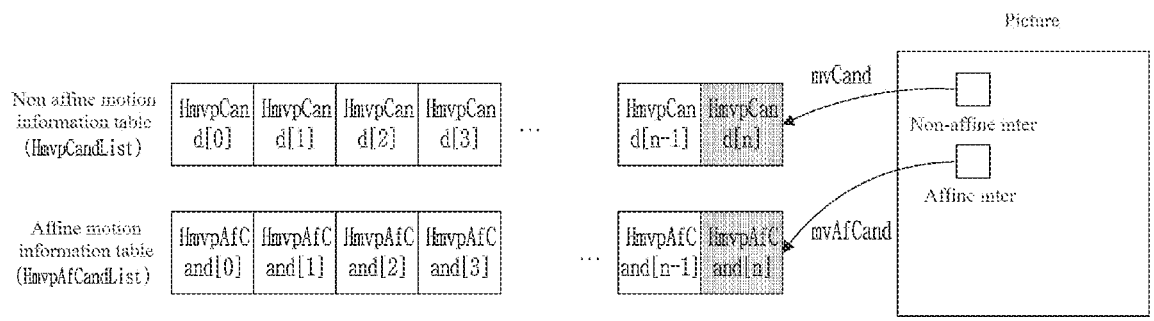
[FIG. 15]
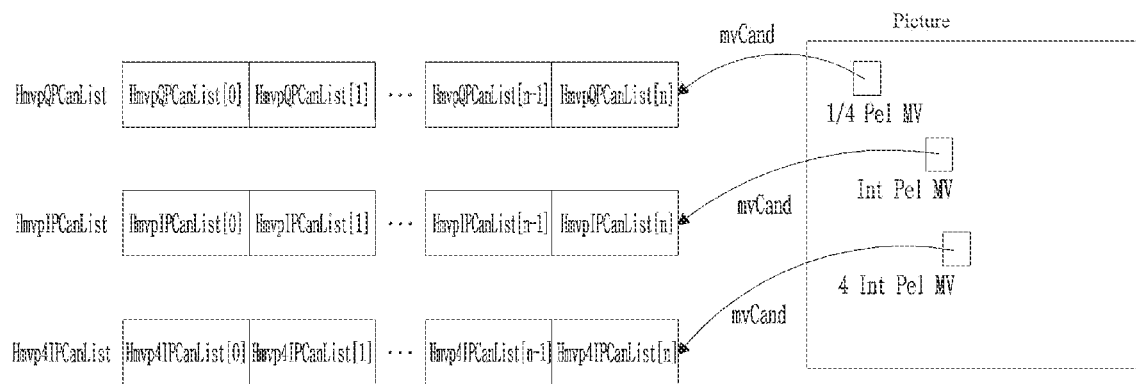
[FIG. 16]
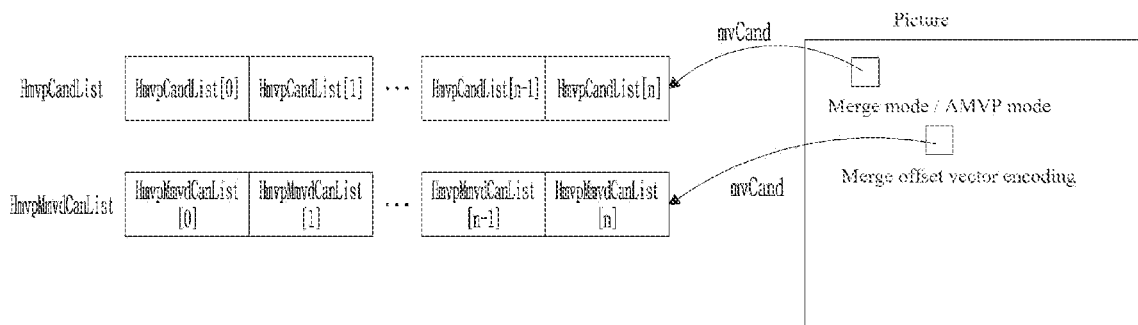

[FIG. 17]
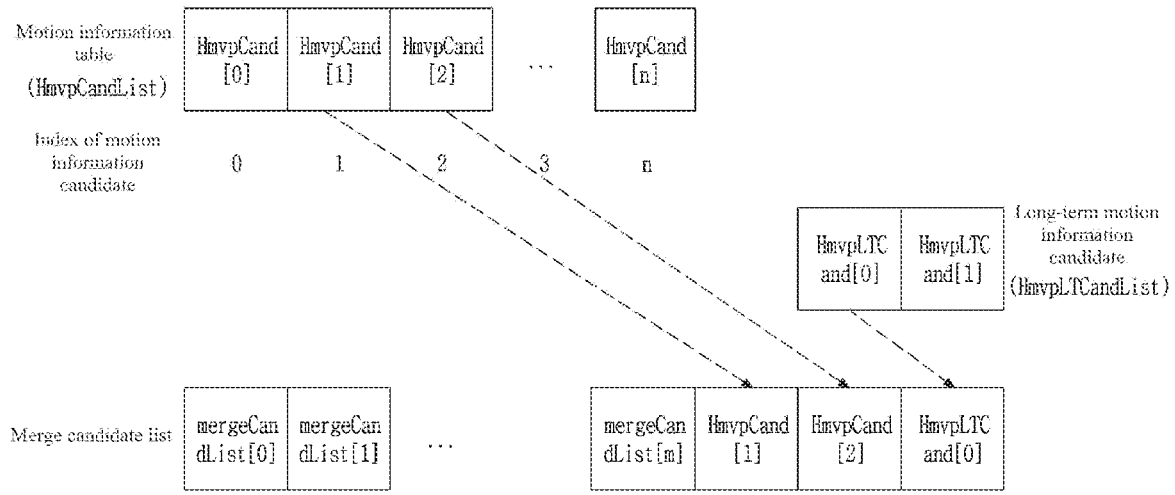
[FIG. 18]
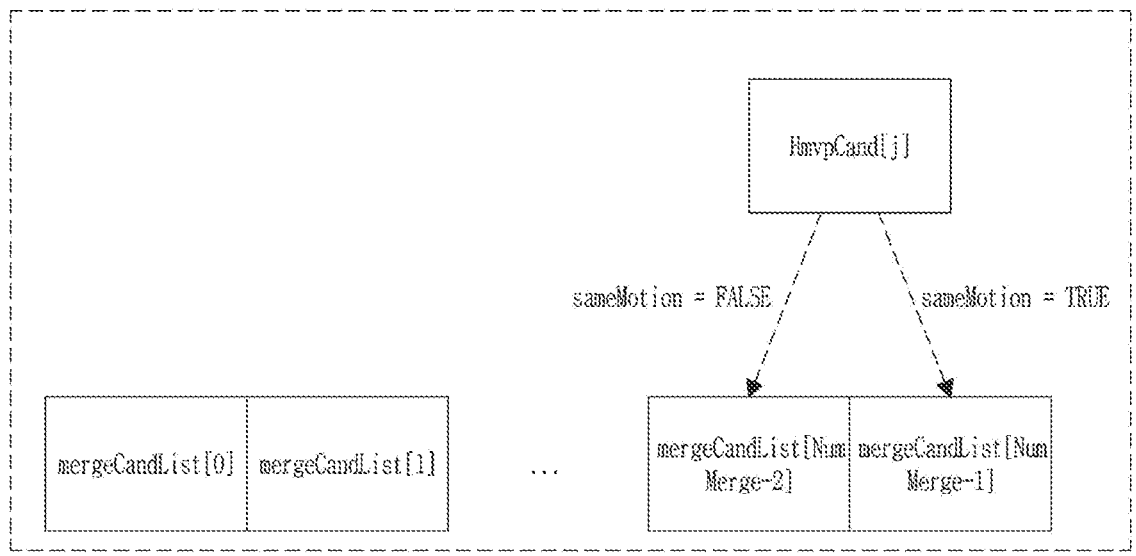

[FIG. 19]
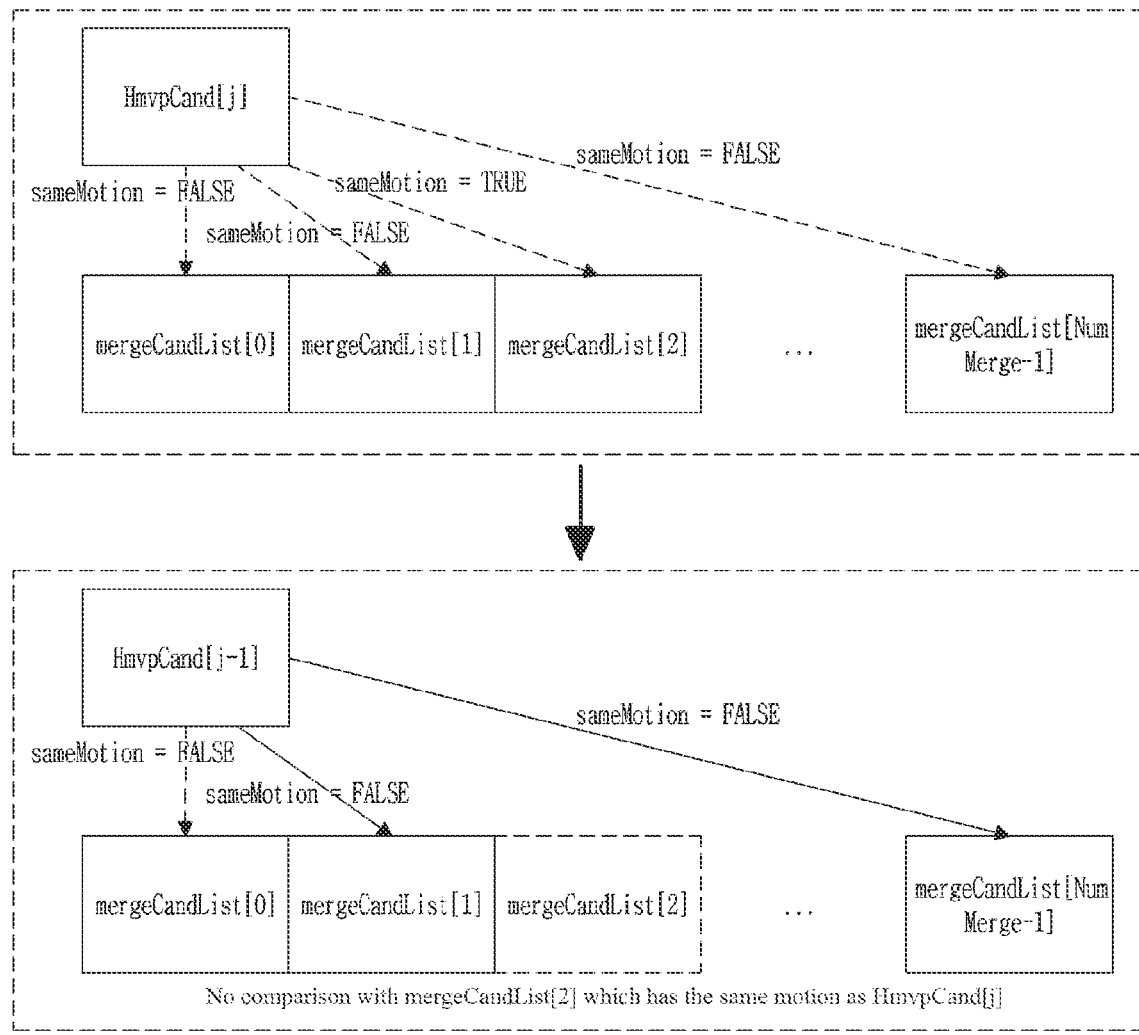

[FIG. 22]
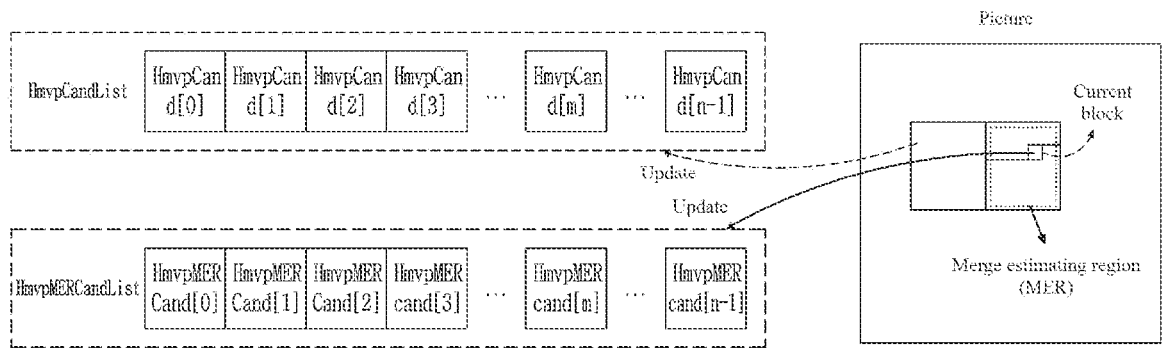
[FIG. 23]
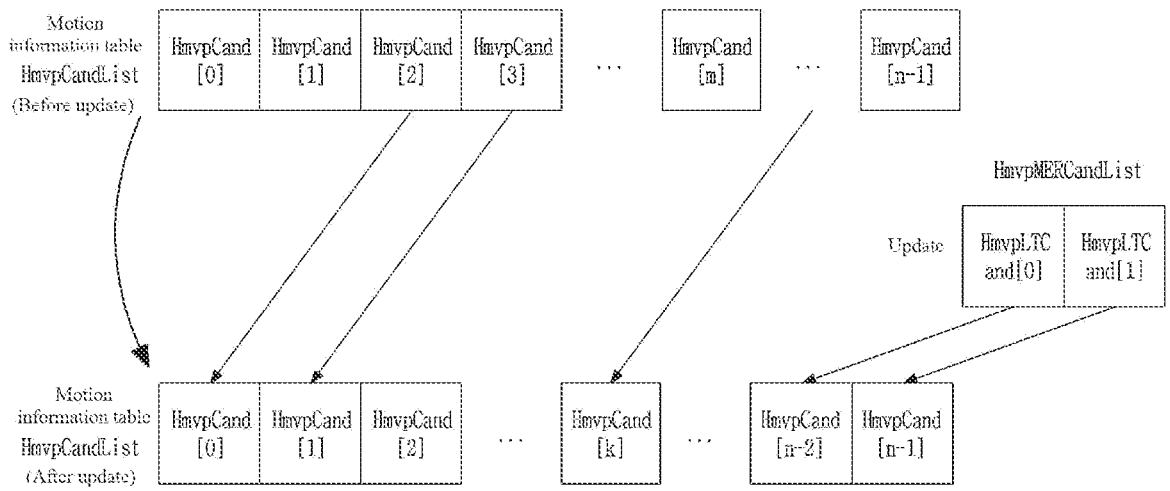
[FIG. 24]
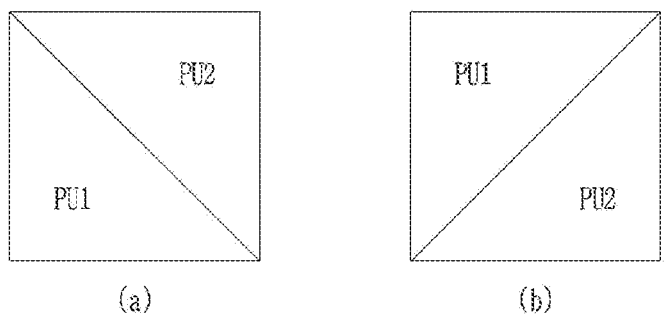

[FIG. 25]
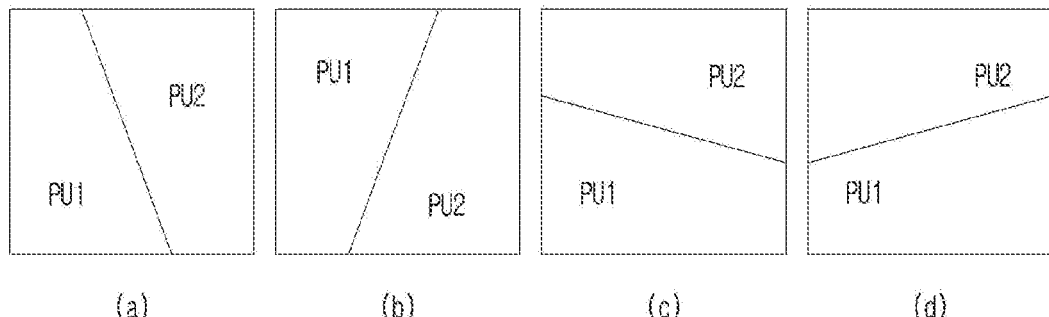
(a)  (b)  (c)  (d)
[FIG. 26]
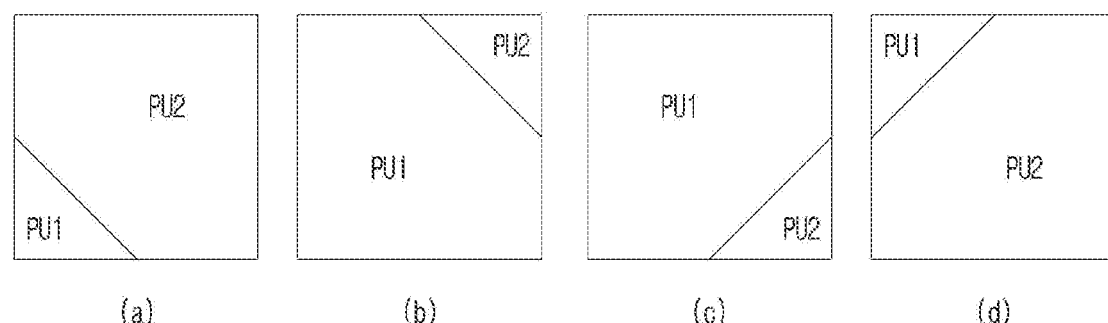
(a)  (b)  (c)  (d)
[FIG. 27]
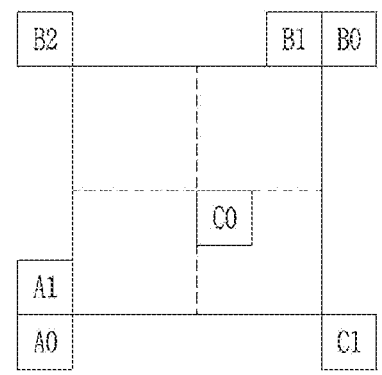

[FIG. 28]
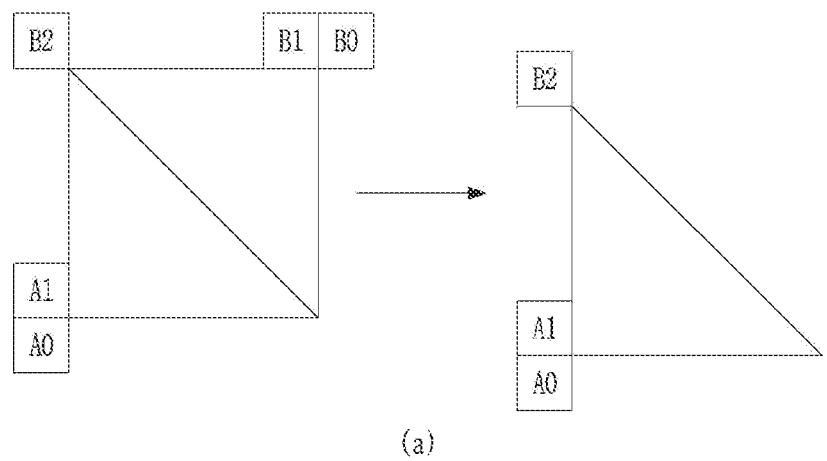
(a)
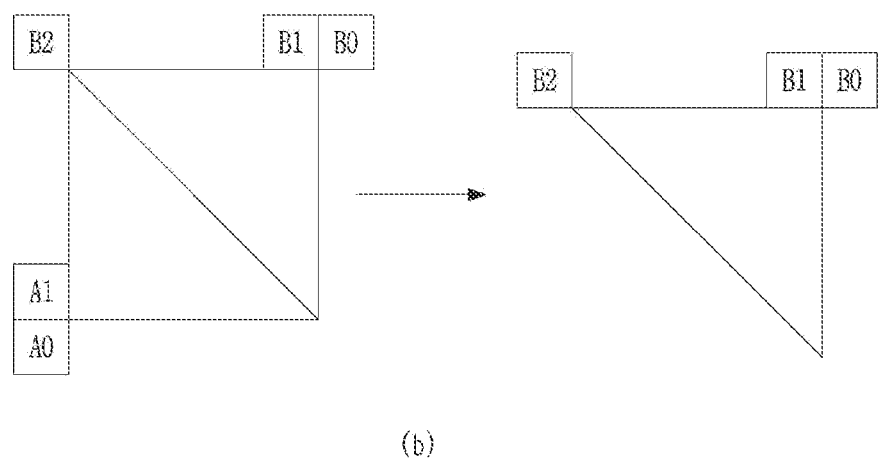
(b)

[FIG. 29]
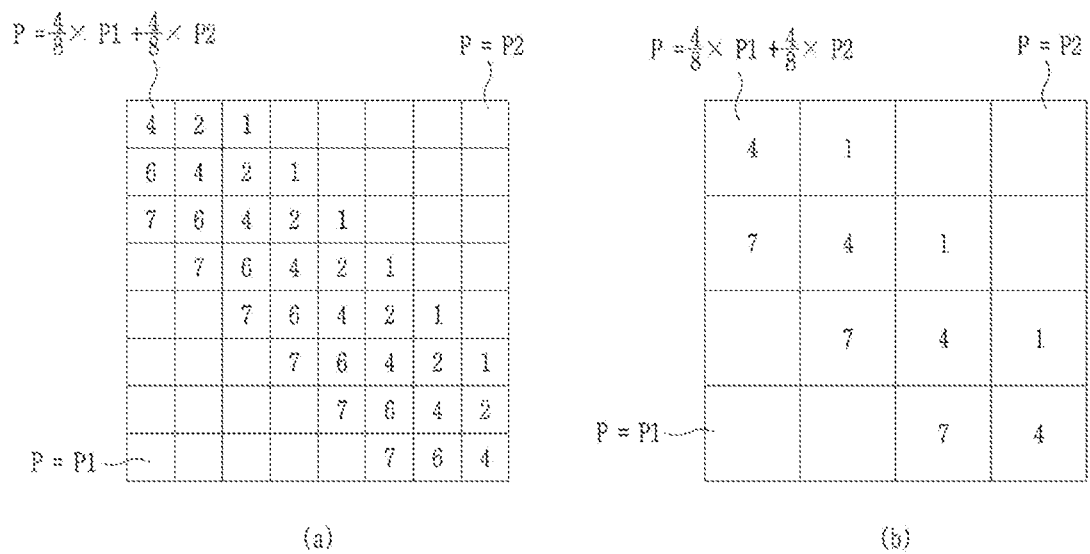
(a)　　　　　　　　　　　(b)
[FIG. 30]
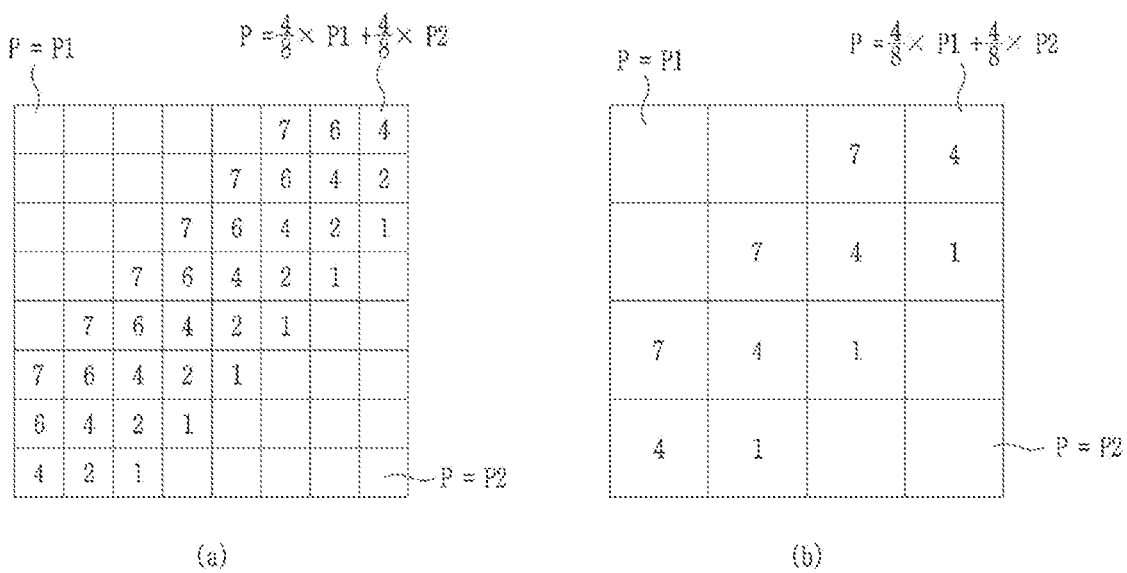
(a)　　　　　　　　　　　(b)

[FIG. 35]
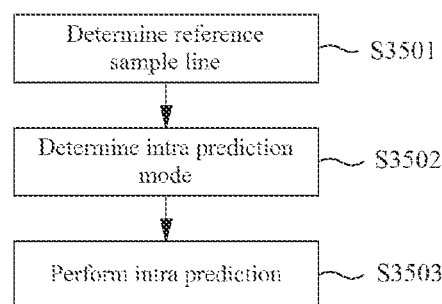

[FIG. 36]
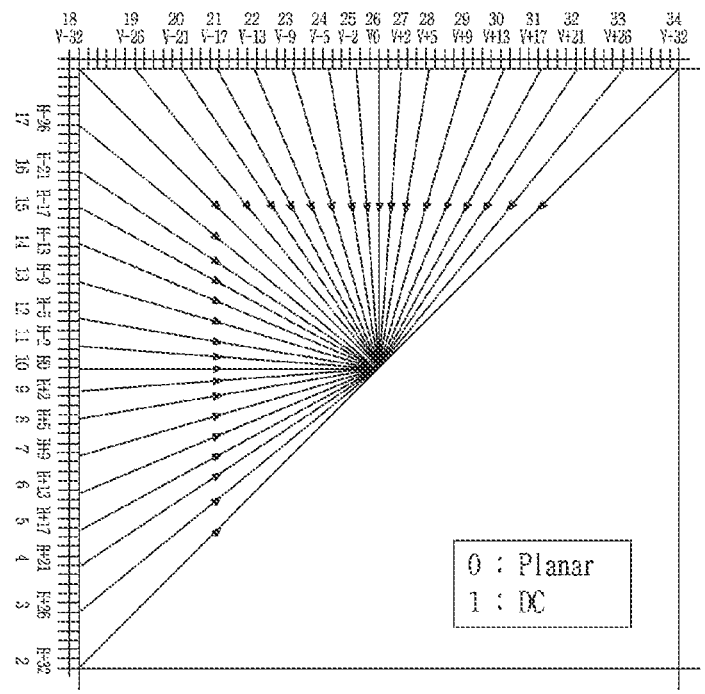
(a)
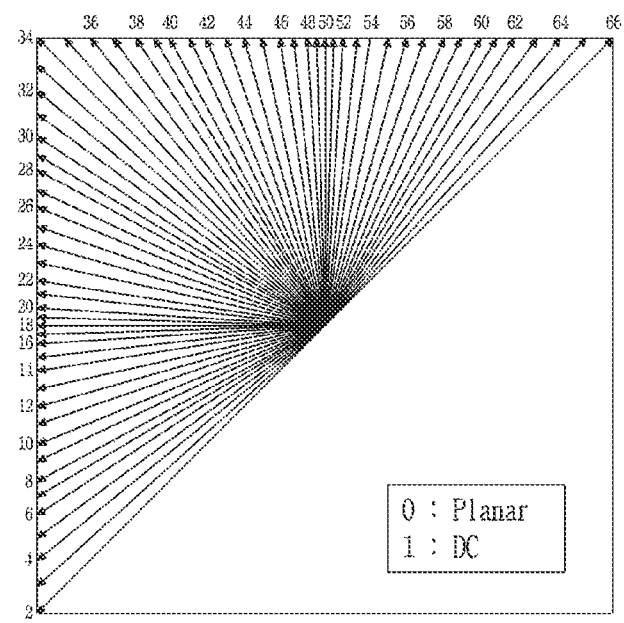
(b)

[FIG. 37]
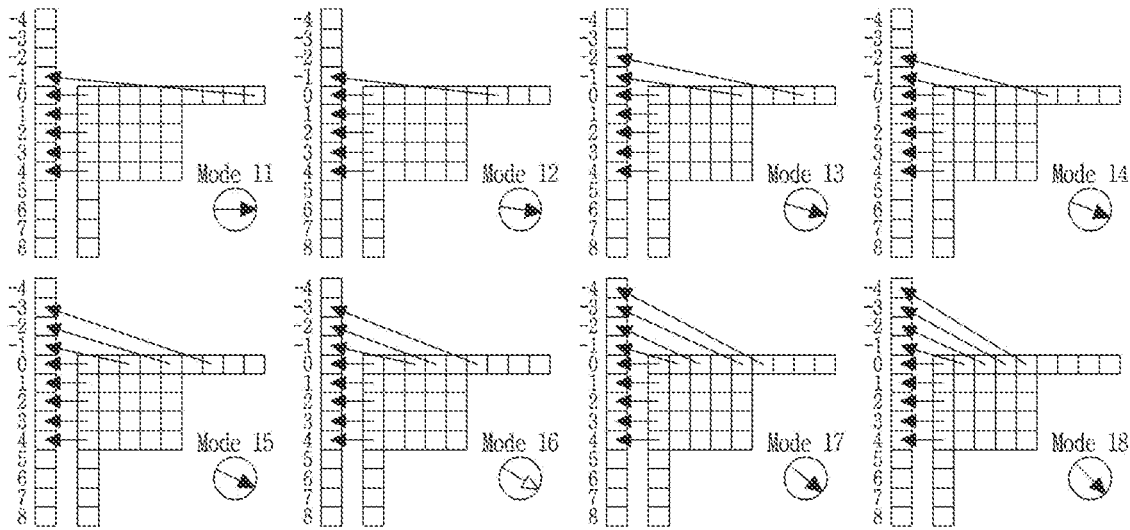
[FIG. 38]
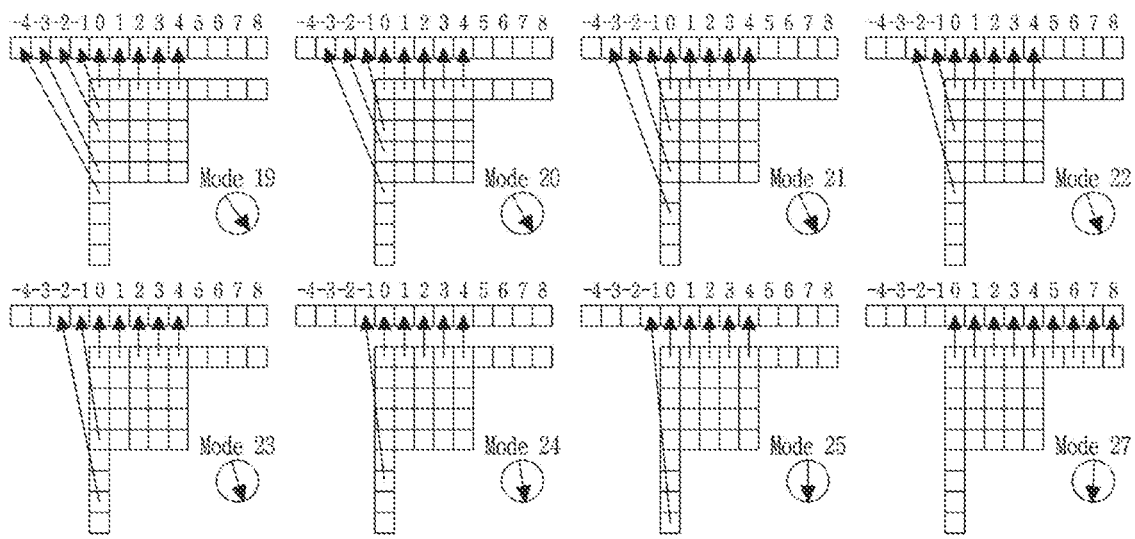

[FIG. 39]
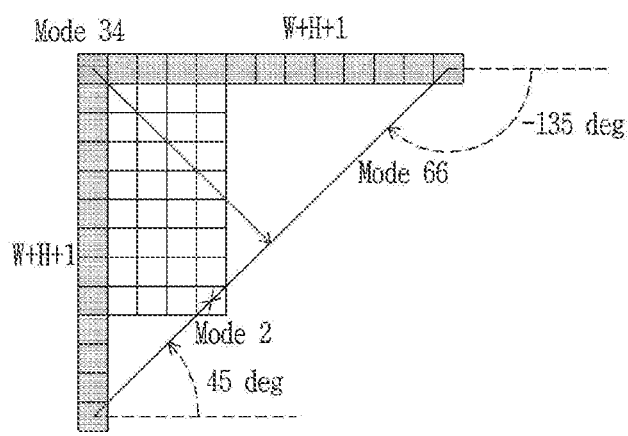
[FIG. 40]
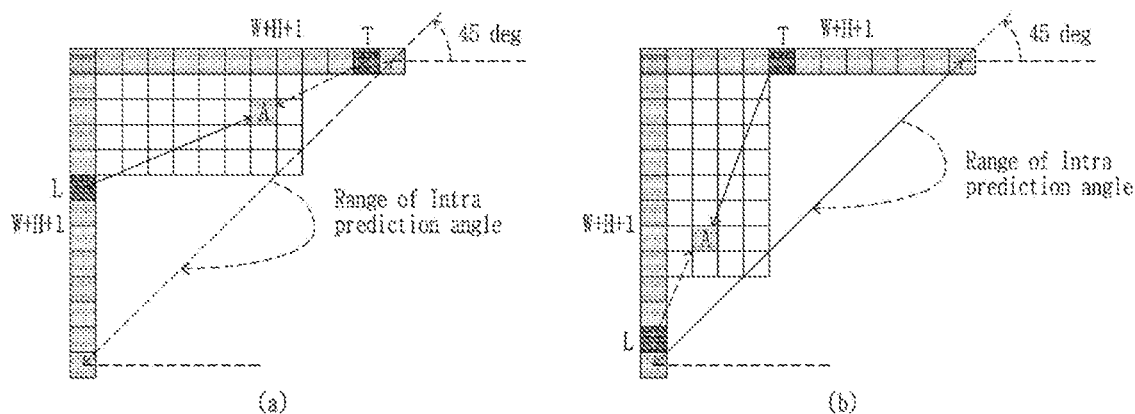
(a)                                (b)

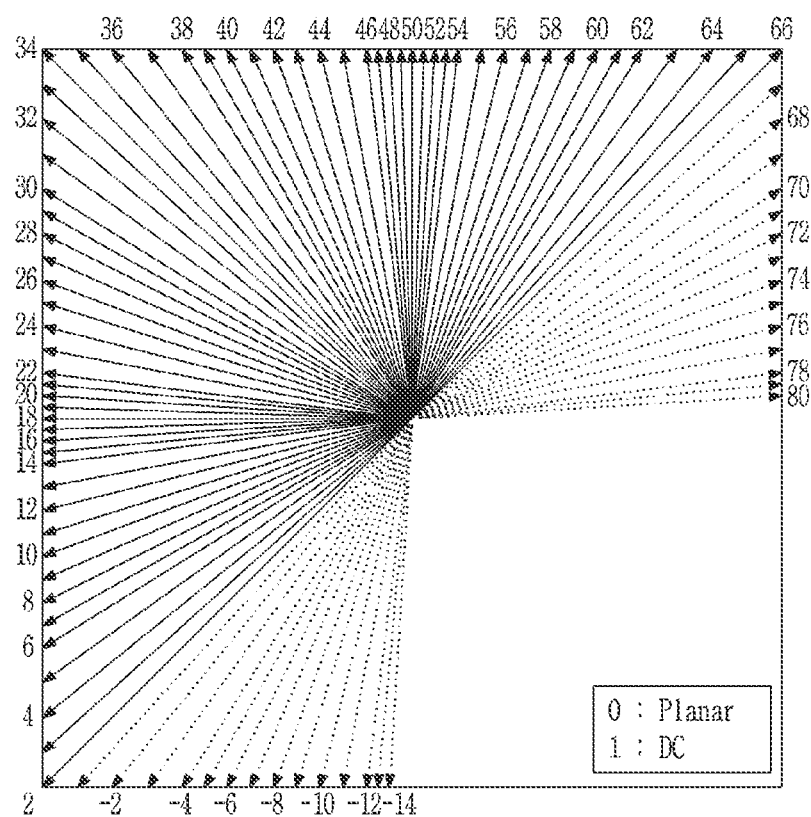
[FIG. 41]

[FIG. 42]
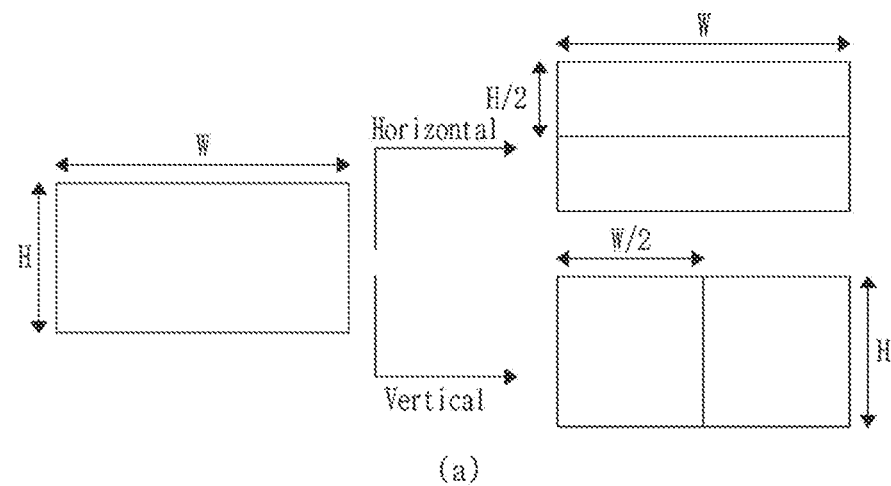
(a)
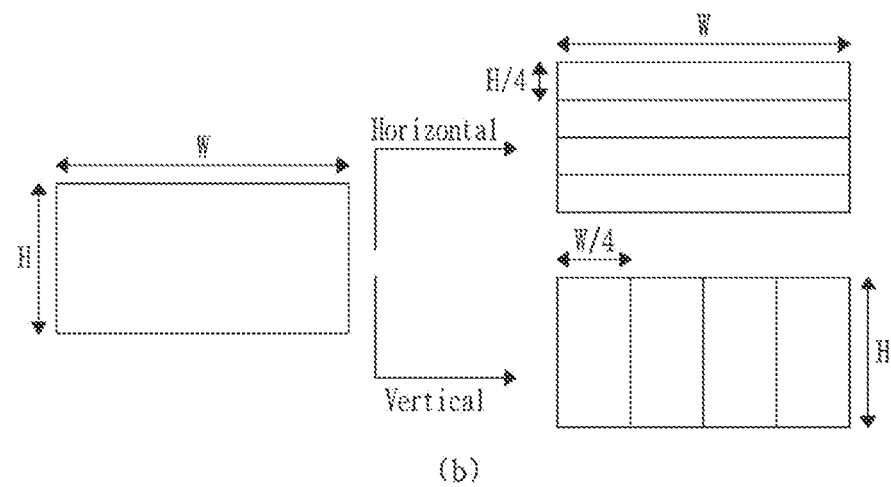
(b)

[FIG. 43]
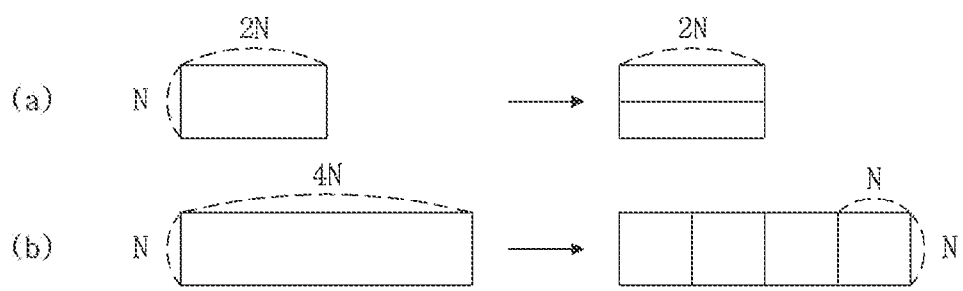
[FIG. 44]
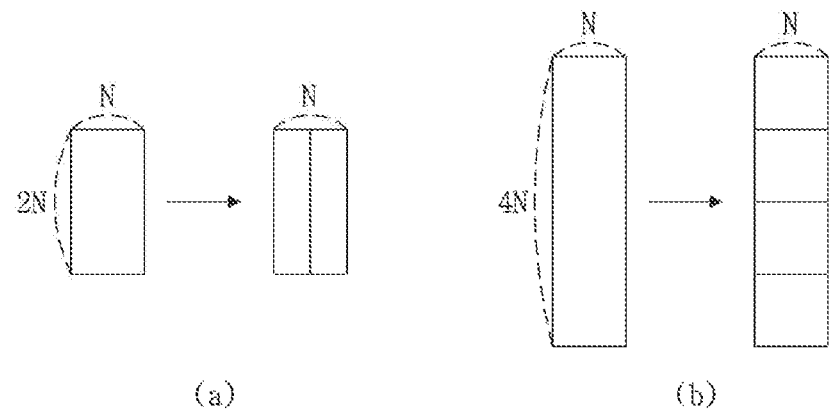
(a)          (b)

[FIG. 45]
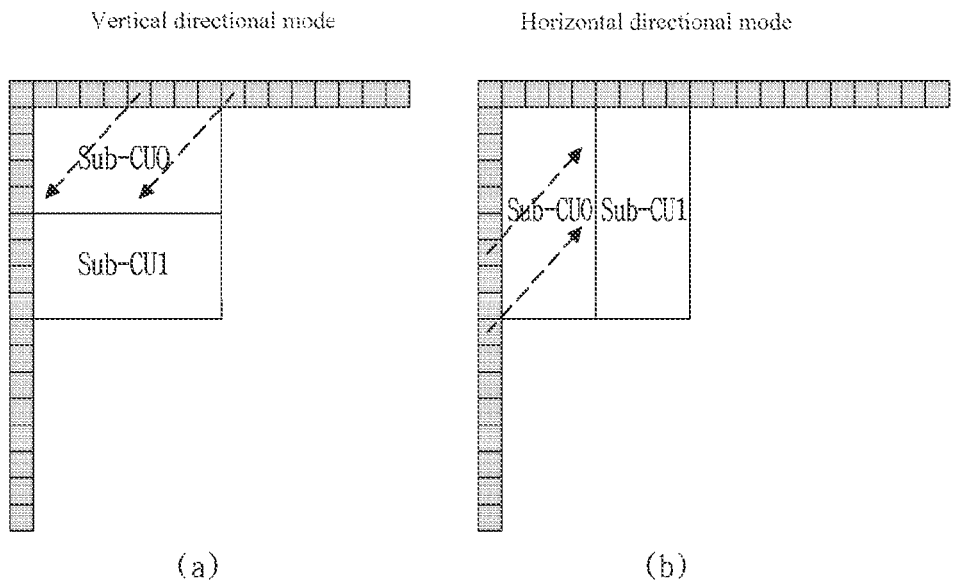
(a) Vertical directional mode  (b) Horizontal directional mode
[FIG. 46]
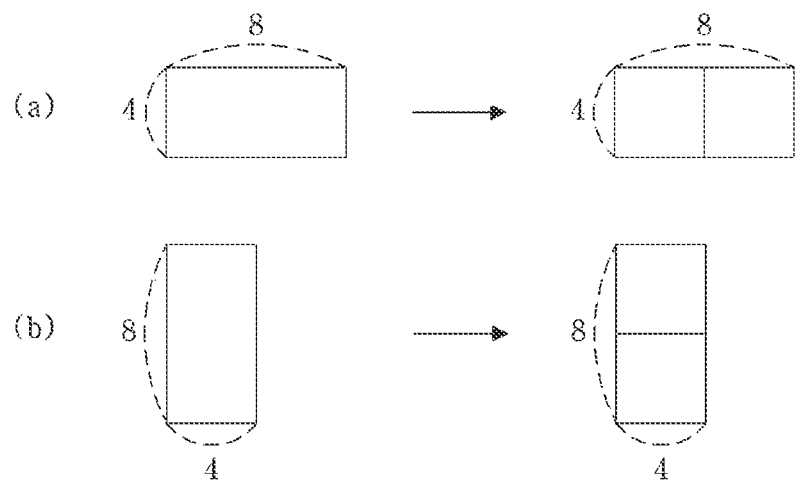

[FIG. 47]
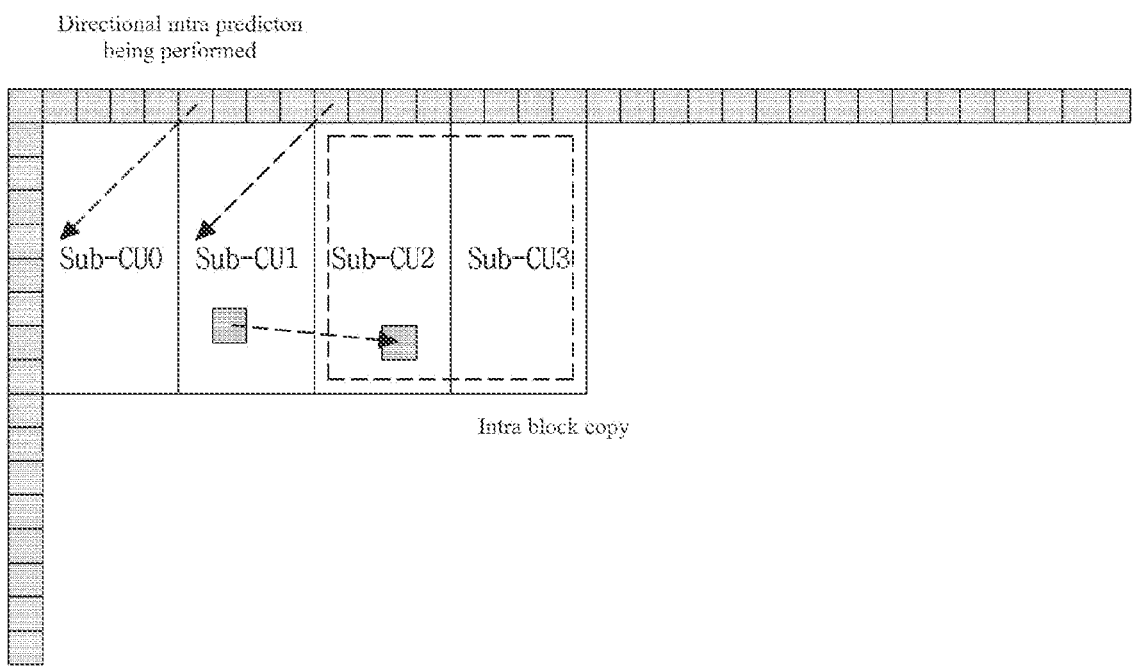

[FIG. 48]
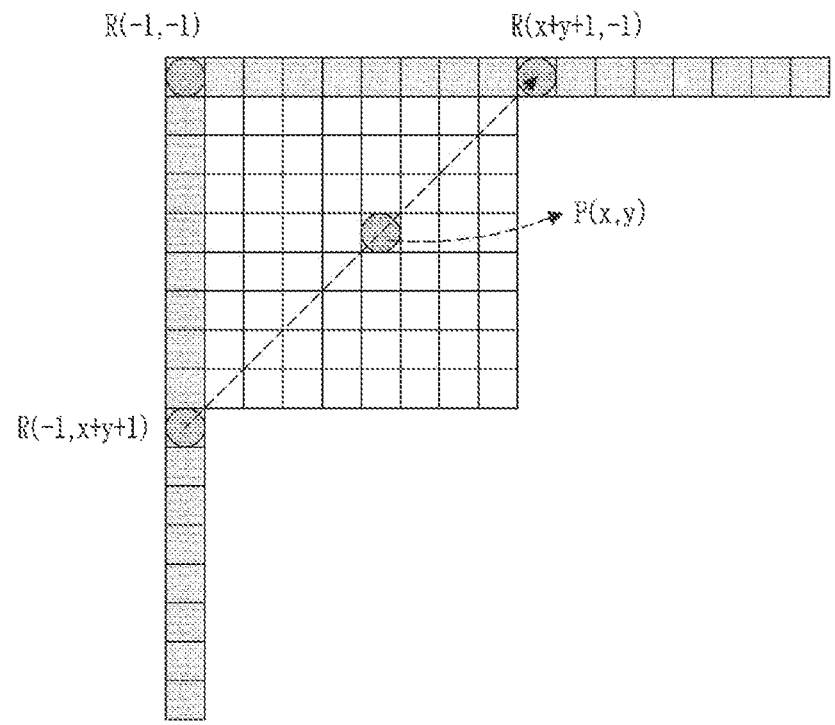
[FIG. 49]
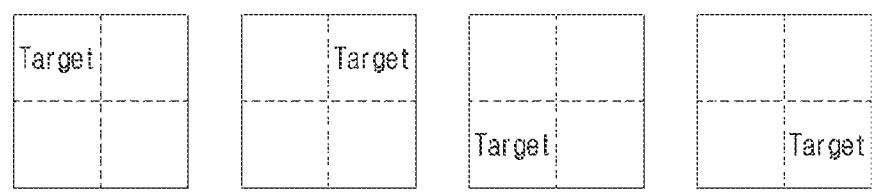
[FIG. 50]
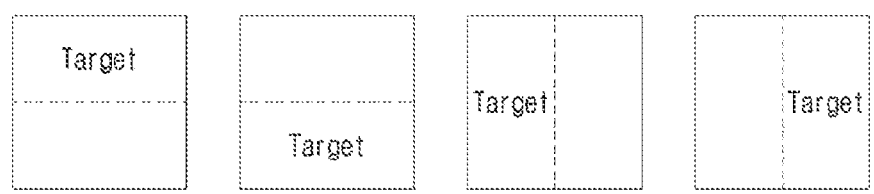

[FIG. 51]
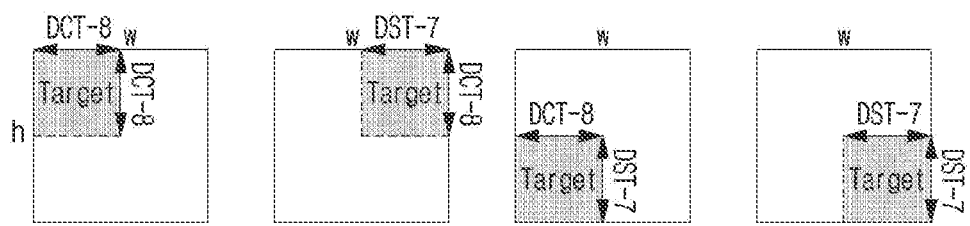
[FIG. 52]
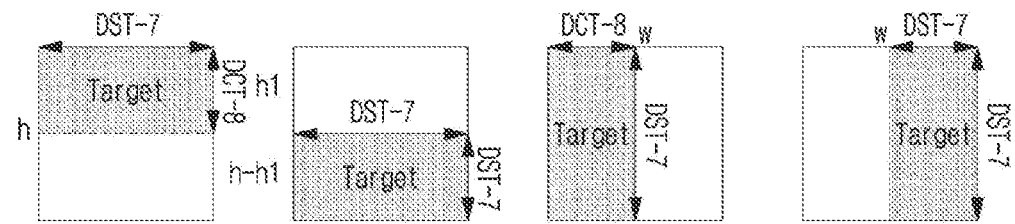

METHOD FOR ENCODING/DECODING IMAGE SIGNAL, AND DEVICE THEREFOR

CROSS-REFERENCE TO RELATED APPLICATIONS

This application is a continuation of U.S. application Ser. No. 18/136,572, filed on Apr. 19, 2023, which is a continuation of U.S. Application Ser. No. 17/265,418, filed on Feb. 2, 2021, which claims the benefit under 35 U.S.C. section 371, of PCT International Application No. PCT/KR2020/002838, filed on Feb. 27, 2020, which claims foreign priority to Korean Patent Application No. 10-2019-0023615, filed on Feb. 28, 2019 and Korean Patent Application No. 10-2019-0073785, filed on Jun. 20, 2019, in the Korean Intellectual Property Office, the disclosures of which are hereby incorporated by reference in their entireties.

FIELD OF THE DISCLOSURE

The present disclosure relates to a video signal encoding/decoding method and a device therefor.

DESCRIPTION OF THE RELATED ART

As display panels become larger, video service of higher quality is required. The biggest problem with high-definition video service is that an amount of data is greatly increased. In order to solve the above problem, research for improving the video compression rate is being actively conducted. As a representative example, the Joint Collaborative Team on Video Coding (JCT-VC) was formed in 2009 by the Motion Picture Experts Group (MPEG) and the Video Coding Experts (VCEG) Group under the International Telecommunication Union-Telecommunication (ITU-T). The JCT-VC proposed High Efficiency Video Coding (HEVC), a video compression standard that about has twice compression performance of H.264/AVC, and that was approved as standard on Jan. 25, 2013. However, with rapid development of high-definition video services, the performance of HEVC is gradually showing its limitations.

DISCLOSURE

Technical Purpose

A purpose of the present disclosure is to provide a device for performing an intra BDPCM method in encoding/decoding a video signal, and a device for performing the method.

A purpose of the present disclosure is to provide a method of performing intra-prediction in a unit of a sub-block after partitioning a coding block into a plurality of sub-blocks in encoding/decoding a video signal, and a device for performing the method.

A purpose of the present disclosure is to provide a method of performing transform for at least one of a plurality of sub-blocks after partitioning a coding block into a plurality of sub-blocks in encoding/decoding a video signal, and a device for performing the method.

Technical purposes obtainable from the present disclosure are non-limited to the above-mentioned technical purposes, and other unmentioned technical purposes may be clearly understood from the following description by those having ordinary skill in the technical field to which the present disclosure pertains.

Technical Solution

A video signal decoding method according to the present disclosure may include determining whether to parse a second flag, representing whether intra BDPCM (Block-based Delta Pulse Code Modulation) is applied to a current block, by referring to a first flag, representing whether the intra BDPCM is allowed, signaled by a sequence parameter set, determining whether the intra BDPCM is applied to the current block based on the second flag, determining an intra BDPCM mode of the current block when it is determined to apply the intra BDPCM to the current block, and obtaining a residual sample of the current block based on the intra BDPCM mode.

In a video signal decoding method according to the present disclosure, the intra BDPCM mode may be determined as a horizontal direction or in a vertical direction.

In a video signal decoding method according to the present disclosure, the residual sample may be derived by adding a neighboring residual sample adjacent to the residual sample and a residual difference value decoded in a bitstream.

In a video signal decoding method according to the present disclosure, when the intra BDPCM is applied to the current block, it is forced to apply transform skip to the current block.

In a video signal decoding method according to the present disclosure, when the intra BDPCM is applied to the current block, an intra-prediction mode of the current block may be inferred to have a horizontal direction or a vertical direction when deriving an MPM (Most Probable Mode) candidate of a neighboring block adjacent to the right or bottom of the current block.

It is to be understood that the foregoing summarized features are exemplary aspects of the following detailed description of the present disclosure without limiting the scope of the present disclosure.

Technical Effect

According to the present disclosure, encoding/decoding efficiency of a video signal may be improved by suggesting an intra BDPCM method.

According to the present disclosure, encoding/decoding efficiency of a video signal may be improved by partitioning a coding block into a plurality of sub-blocks and performing transform for at least one of a plurality of sub-blocks.

Effects obtainable from the present disclosure may be non-limited by the above-mentioned effect, and other unmentioned effects may be clearly understood from the following description by those having ordinary skill in the technical field to which the present disclosure pertains.

BRIEF DESCRIPTION OF THE DRAWINGS

FIG. 1 is a view showing a block diagram of a video encoding device (encoder) according to an embodiment of the present disclosure;

FIG. 2 is a view showing a block diagram of a video decoding device (decoder) according to an embodiment of the present disclosure;

FIG. 3 is a view showing a basic coding tree unit according to an embodiment of the present disclosure;

FIG. 4 is a view showing various partitioning types of a coding block.

FIG. 5 is a view of an example showing an aspect of partitioning a CTU.

FIG. 6 is a flow diagram of an inter prediction method according to an embodiment of the present disclosure.

FIG. 7 is a flow diagram of a process deriving the current block motion information under a merge mode.

FIG. 8 is a diagram of illustrating candidate blocks used to derive a merge candidate.

FIG. 9 is a diagram illustrating candidate blocks used to derive a merge candidate.

FIG. 10 is a diagram to explain the update aspect of a motion information table.

FIG. 11 is a diagram showing the update aspect of a motion information table.

FIG. 12 is a diagram showing an example in which the index of a pre-saved motion information candidate is renewed.

FIG. 13 is a diagram showing the position of a representative sub-block.

FIG. 14 shows an example in which a motion information table is generated per inter-prediction mode.

FIG. 15 shows an example in which a motion information table is generated per motion vector resolution.

FIG. 16 shows an example in which the motion information of a block to which a merge offset encoding method is applied is stored in a separate motion information table.

FIG. 17 is a diagram showing an example in which a motion information candidate included in a long-term motion information table is added to a merge candidate list.

FIG. 18 is a diagram showing an example in which a redundancy check is performed only for a part of merge candidates.

FIG. 19 is a diagram showing an example in which a redundancy check with a specific merge candidate is omitted.

FIG. 22 is a diagram showing a temporary motion information table.

FIG. 23 is a diagram showing an example in which a motion information table and a temporary motion information table are unified.

FIG. 24 is a diagram showing an example in which a coding block is partitioned into a plurality of prediction units by using a diagonal line.

FIG. 25 is a diagram showing an example in which a coding block is partitioned into two prediction units.

FIG. 26 shows examples in which a coding block is partitioned into a plurality of different-sized prediction blocks.

FIG. 27 is a diagram showing neighboring blocks used to derive a partitioning mode merge candidate.

FIG. 28 is a diagram for explaining an example in which the availability of a neighboring block is determined per prediction unit.

FIGS. 29 and 30 are diagrams showing an example in which a prediction sample is derived based on a weighted sum operation of the first prediction sample and the second prediction sample.

FIG. 35 is a flow diagram of an intra-prediction method according to the embodiment of the present disclosure.

FIG. 36 is a diagram showing intra-prediction modes.

FIGS. 37 and 38 are a diagram showing an example of a one-dimensional array which arranges reference samples in a line.

FIG. 39 is a diagram illustrating an angle formed by directional intra-prediction modes with a straight line parallel to an x-axis.

FIG. 40 is a diagram showing an aspect in which a prediction sample is obtained when a current block has a non-square shape.

FIG. 41 is a diagram showing wide angle intra-prediction modes.

FIG. 42 is a diagram showing an example of vertical directional partitioning and horizontal directional partitioning.

FIG. 43 is a diagram showing an example in which a partitioning type of a coding block is determined.

FIG. 44 is a diagram showing an example in which a partitioning type of a coding block is determined.

FIG. 45 is a diagram showing an example in which a partitioning type of a coding block is determined based on an intra-prediction mode of a coding block.

FIG. 46 is a diagram for describing a partitioning aspect of a coding block.

FIG. 47 is a diagram showing an example in which a prediction encoding mode is differently set per sub-block.

FIG. 48 is a diagram showing an application aspect of PDPC.

FIGS. 49 and 50 are diagrams showing an application aspect of a sub-transform block encoding method.

FIGS. 51 and 52 show a horizontal directional transform type and a vertical directional transform type according to a position of a sub-block which is a target of a transform.

DETAILED DESCRIPTION OF THE DISCLOSURE

Figure 20:
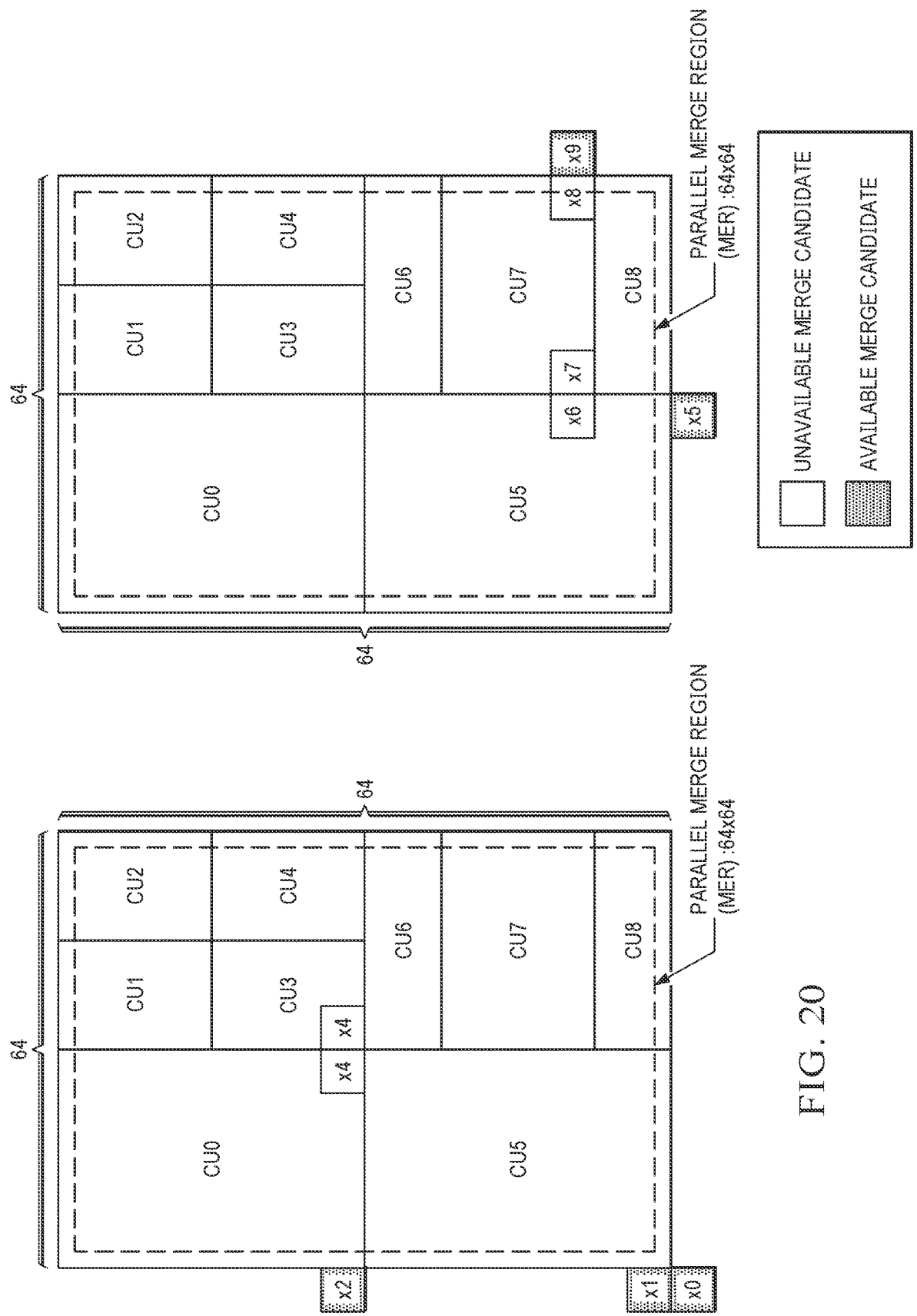
FIG. 20 is a diagram showing an example in which a candidate block included in the same merge processing region as a current block is set to be unavailable as a merge candidate.

Hereinafter, embodiments of the present disclosure will be described in detail with reference to the accompanying drawings.

Image encoding and decoding is performed on a basis of a block. In an example, for a coding block, a transform block, or a prediction block, encoding/decoding processes such as transform, quantization, prediction, in-loop filtering, reconstruction, etc. may be performed.

Hereinafter, an encoding/decoding target block is referred to as a "current block". In an example, a current block may represent a coding block, a transform block, or a prediction block according to a current process of encoding/decoding.

In addition, the term "unit" used in the present specification represents a basis unit for performing a specific encoding/decoding process, and a "block" may be understood to represent a sample array having a predetermined size. Unless otherwise stated, "block" and "unit" may be used interchangeably. In an example, in examples described later, a coding block and a coding unit may be understood to have the same meaning as each other.

FIG. 1 is view showing a block diagram of an image encoding apparatus (encoder) according to an embodiment of the present disclosure.

Referring to FIG. 1, an image encoding apparatus 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

Components described in FIG. 1 are independently illustrated in order to show different characteristic functions in an image encoding apparatus, and the figure does not mean that each component is constituted by separated hardware or one software unit. That is, each component is just enumerated for convenience of explanation, at least two components of respective components may constitute one component or one component may be partitioned into a plurality of components which may perform their functions. Even an embodiment of integrating respective components and embodiment of dividing a component are also included in the scope of the present disclosure unless they are departing from the spirit of the present disclosure.

Further, some components are not requisite components that perform essential functions of the present disclosure but are optional components for just improving performance. The present disclosure may be implemented with the requisite component for implementing the spirit of the present disclosure other than the component used to just improve the performance and a structure including only the requisite component other than the optional component used to just improve the performance is also included in the scope of the present disclosure.

The picture partitioning unit 110 may partition an input picture into at least one processing unit. In this connection, the processing unit may be a prediction unit (PU), a transform unit (TU), or a coding unit (CU). In the picture partitioning unit 110, a single picture may be partitioned into combinations of a plurality of coding units, prediction units, and transform units, and the picture may be encoded by selecting a combination of the coding units, the prediction units, and the transform units according to a predetermined condition (for example, cost function).

For example, a single picture may be partitioned into a plurality of coding units. In order to partition a picture into coding units, a recursive tree structure such as a quad-tree structure may be used, and a coding unit that is originated from a root such as a single image or largest coding unit may be partitioned into other coding units and may have child nodes as many as the partitioned coding units. A coding unit that is no longer partitioned according to certain restrictions becomes a leaf node. Namely, when it is assumed that only square partitioning is available for a single coding unit, a single coding unit may be partitioned into at most four other coding units.

Hereinafter, in the embodiment of the present disclosure, a coding unit may be used as a unit for encoding or may be used as a unit for decoding.

A prediction unit may be obtained by partitioning a single coding unit into at least one square or rectangle having the same size, or a single coding unit may be partitioned into prediction units in such a manner that one prediction unit may be different from another prediction unit in a shape and/or size.

In generation of a prediction unit based on a coding block to which intra-prediction is being performed, when the coding unit is not the smallest coding unit, intra-prediction may be performed without performing partitioning into a plurality of N×N prediction units.

The prediction units 120 and 125 may include an inter-prediction unit 120 performing inter-prediction and an intra prediction unit 125 performing intra-prediction. Whether to perform inter-prediction or intra-prediction on a prediction unit may be determined, and detailed information (for example, an intra-prediction mode, a motion vector, a reference picture, etc.) according to each prediction method may be determined. In this connection, a processing unit on which prediction is performed may differ with a processing unit for which a prediction method, and detail thereof are determined. For example, a prediction method, a prediction mode, etc. may be determined on the basis of a prediction unit, and prediction may be performed on the basis of a transform unit. A residual value (residual block) between the generated prediction block and an original block may be input to the transform unit 130. In addition, prediction mode information used for prediction, motion vector information, etc. may be encoded using a residual value by the entropy encoding unit 165 and may be transmitted to the decoder. When a specific encoding mode is used, an original block is encoded as it is and transmitted to a decoding unit without generating a prediction block through the prediction unit 120 or 125.

The inter-prediction unit 120 may predict a prediction unit on the basis of information on at least one of a previous picture and a subsequent picture of a current picture, or in some cases, may predict a prediction unit on the basis of information on some encoded regions in the current picture. The inter-prediction unit 120 may include a reference picture interpolation unit, a motion prediction unit, and a motion compensation unit.

The reference picture e interpolation unit may receive reference picture information from the memory 155, and generate pixel information of a pixel at an integer or less from the reference picture. In case of a luma pixel, an 8-tap DCT-based interpolation filter having different coefficients may be used so as to generate pixel information on a pixel at an integer or less for a ¼ pixel unit. In case of a chroma signal, a 4-tap DCT-based interpolation having filter different filter coefficients may be used so as to generate pixel information on a pixel at an integer or less for a ⅛ pixel unit.

The motion prediction unit may perform motion prediction based on a reference picture interpolated by the reference picture interpolation unit. As methods for calculating a motion vector, various methods, such as a full search-based block matching algorithm (FBMA), a three step search (TSS) algorithm, a new three-step search (NTS) algorithm, etc. may be used. A motion vector may have a motion vector value in a unit of ½ or ¼ pixel on the basis of the interpolated pixel. The motion prediction unit may predict a current prediction unit by varying a motion prediction method. As motion prediction methods, various methods, such as a skip method, a merge method, an advanced motion vector prediction (AMVP) method, an intra block copy method, etc. may be used.

The intra-prediction unit 125 may generate a prediction unit on the basis of information on a reference pixel around a current block, which is pixel information in a current picture. When a neighboring block of a current prediction unit is a block for which inter-prediction is performed, and thus a reference pixel is a pixel for which inter-prediction is performed, a reference pixel included in the block for which inter-prediction is performed may be replaced by information on a reference pixel of a neighboring block for which intra-prediction is performed. In other words, when a reference pixel is unavailable, at least one reference pixel of available reference pixels may be used in place of unavailable reference pixel information.

A prediction mode in intra-prediction may include a directional prediction mode using reference pixel information according to a prediction direction and a non-directional mode not using directional information when performing prediction. A mode for predicting luma information may be different from a mode for predicting chroma information. In order to predict the chroma information, information on an intra-prediction mode used for predicting the luma information or information on a predicted luma signal may be used.

In performing intra-prediction, when a prediction unit is identical in a size with a transform unit, intra-prediction may be performed on the prediction unit on the basis of pixels positioned at the left, the top-left, and the top of the prediction unit. However, in performing intra-prediction, when a prediction unit is different in a size with a transform unit, intra-prediction may be performed by using a reference pixel based on the transform unit. In addition, intra-prediction using N×N partitioning may be only used for the smallest coding unit.

In an intra-prediction method, a prediction block may be generated after applying an adaptive intra smoothing (AIS) filter to a reference pixel according to a prediction mode. A type of AIS filter applied to a reference pixel may vary. In order to perform an intra-prediction method, an intra prediction mode for a current prediction unit may be predicted from an intra-prediction mode of a prediction unit present around the current prediction unit. In predicting a prediction mode for a current prediction unit by using mode information predicted from a neighboring prediction unit, when an intra prediction mode for the current prediction unit is identical to an intra prediction mode of the neighboring prediction unit, information indicating that the current prediction unit and the neighboring prediction unit have the same prediction mode may be transmitted by using predetermined flag information. When a prediction mode for the current prediction unit is different from prediction modes of the neighboring prediction units, entropy encoding may be performed to encode information on a prediction mode for a current block.

In addition, a residual block may be generated which includes information on a residual value that is a difference value between a prediction unit for which prediction is performed on by the prediction unit 120 or 125, and an original block of the prediction unit. The generated residual block may be input to the transform unit 130.

The transform unit 130 may perform transform on a residual block, which includes information on a residual value between an original block and a prediction unit generated by the prediction unit 120 or 125, by using a transform method such as discrete cosine transform (DCT) or discrete sine transform (DST). In this connection, a DCT transform core includes at least one of DCT2 or DCT8 and a DST transform core includes DST7. Whether to apply DCT, or DST so as to perform transform on a residual block may be determined on the basis of information on an intra-prediction mode of a prediction unit which is used to generate the residual block. It is possible to skip a transform for a residual block. A flag indicating whether or not to skip a transform for a residual block may be encoded. Transform skip may be allowed for a residual block whose a size is smaller than or equal to a threshold value, a residual block of a luma component, or a residual block of a chroma component under 4:4:4 format.

The quantization unit 135 may perform quantization on values transformed into a frequency domain by the transform unit 130. A quantization coefficient may vary according to a block or importance of an image. Values calculated in the quantization unit 135 may be provided to the dequantization unit 140 and the rearrangement unit 160.

The rearrangement unit 160 may perform rearrangement on coefficient values with respect to quantized residual values.

The rearrangement unit 160 may change coefficients in the form of a two-dimensional block into coefficients in the form of a one-dimensional vector through a coefficient scanning method. For example, the rearrangement unit 160 may scan from a DC coefficient to a coefficient in a high frequency domain by using a zigzag scanning method so as to change the coefficients into the form of a one-dimensional vector. According size and an intra prediction mode of a transform unit, rather than zigzag scanning, vertical directional scanning where coefficients in the form of a two-dimensional block are scanned in a column direction, or horizontal directional scanning where coefficients in the form of two-dimensional block are scanned in a row direction may be used. In other words, which scanning method among zigzag scanning, vertical directional scanning, and horizontal directional scanning is used may be determined according to a size and an intra prediction mode of a transform unit.

The entropy encoding unit 165 may perform entropy encoding on the basis of values calculated by the rearrangement unit 160. Entropy encoding may use various encoding methods, for example, exponential Golomb coding, context-adaptive variable length coding (CAVLC), or context-adaptive binary arithmetic coding (CABAL).

The entropy encoding unit 165 may encode various types of information, such as information on a residual value coefficient and information on a block type of a coding unit, information on a prediction mode, information on a partitioning unit, information on a prediction unit, information on a partitioning unit, information on a prediction unit and information on a transmission unit, information on a motion vector, information on a reference frame, information on a block interpolation, filtering information, etc. obtained from the rearrangement unit 160 and the prediction units 120 and 125.

The entropy encoding unit 165 may entropy encode coefficients of a coding unit input from the rearrangement unit 160.

The dequantization unit 140 may perform dequantization on values quantized in the quantization unit 135, and the inverse-transform unit 145 may perform inverse-transform on values transformed in the transform unit 130. A residual value generated by the dequantization unit 140 and the inverse-transform unit 145 may be added with a prediction unit predicted by a motion estimation unit, a motion compensation unit, or the intra-prediction unit which are included in the prediction units 120 and 125 so as to generate a reconstructed block.

The filter unit 150 may include at least one of a deblocking filter, an offset correction unit, and an adaptive loop filter (ALF).

The deblocking filter may remove block distortion that occurs due to boundaries between blocks in a reconstructed picture. In order to determine whether or not to perform deblocking, whether or not to apply a deblocking filter to a current block may be determined on the basis of pixels included in several rows and columns included in a block. When a deblocking filter is applied to a block, a strong filter or a weak filter is applied according to required deblocking filtering strength. In addition, in applying a deblocking filter, when performing horizontal directional filtering and vertical directional filtering, horizontal directional filtering and vertical directional filtering may be configured to be processed in parallel.

The offset correction unit may correct an original image by an offset in a unit of a pixel with respect to an image for which deblocking is performed. In order to perform offset correction on a specific picture, a method of applying a offset to a region which is determined after partitioning pixels of the image into the predetermined number of regions, or a method of applying an offset according to edge information of each pixel may be used.

Adaptive loop filtering (ALF) may be performed on the basis of a value obtained by comparing a filtered reconstructed image with an original image. Pixels included in an image may be partitioned into predetermined groups, a filter to be applied to each of the groups may be determined, and filtering may be individually performed on each group. Information on whether or not to apply ALF and may be transmitted for each coding unit (CU) for a luma signal, and a shape and a filter coefficient of an ALF filter to be applied may vary on the basis of each block. Alternatively, an ALF filter having the same shape (fixed shape) may be applied regardless of a feature of a block to which the filter will be applied.

In the memory 155, a reconstructed block or picture calculated through the filter unit 150 may be stored. The stored reconstructed block or picture may be provided to the prediction unit 120 or 125 when performing inter-prediction.

FIG. 2 is view showing a block diagram of an image decoding apparatus (decoder) according to an embodiment of the present disclosure.

Referring to FIG. 2, an image decoding apparatus 200 may include: an entropy decoding unit 210, a rearrangement unit 215, a dequantization unit 220, an inverse-transform unit 225, prediction units 230 and 235, a filter unit 240, and a memory 245.

When an image bitstream is input from the encoder, the input bitstream may be decoded according to an inverse process of the image encoding apparatus.

The entropy decoding unit 210 may perform entropy decoding according to the inverse process of the entropy encoding by the entropy encoding unit of the image encoder. For example, in association with the methods performed by the image encoder apparatus, various methods, such as exponential Golomb coding, context-adaptive variable length coding (CAVLC), or context-adaptive binary arithmetic coding (CABAC) may be applied.

The entropy decoding unit 210 may decode information on intra-prediction and inter-prediction performed by the encoder.

The rearrangement unit 215 may perform rearrangement on the bitstream entropy decoded by the entropy decoding unit 210 on the basis of the rearrangement method used in the encoder. Coefficients represented in the form of a one-dimensional vector may be reconstructed and rearranged into coefficients in the form of a two-dimensional block. The rearrangement unit 215 may perform rearrangement through of receiving information related to coefficient scanning performed in the encoder and of inversely scanning on the basis of the scanning order performed in the encoder.

The dequantization unit 220 may perform dequantization on the basis of a quantization parameter received from the encoder and coefficient values of the rearranged block.

The inverse-transform unit 225 may perform, an inverse transform, that is inverse DCT or inverse DST, against to a transform, that is DCT or DST, performed on the quantization result by the transform unit in the image encoder. In this connection, a DCT transform core may include at least one of DCT2 or DCT8, and a DST transform core may include DST7. Alternatively, when the transform is skipped in the image encoder, the inverse-transform also not be performed in the inverse-transform unit 225. Inverse transform may be performed on the basis of a transmission unit determined by the image encoder. The inverse transform unit 225 of the image decoder may selectively perform a transform method (for example, DCT, or DST) according to multiple pieces of information, such as a prediction method, a size of a current block, a prediction direction, etc.

The prediction unit 230 or 235 may generate a prediction block on the basis of information related to a prediction block received from the entropy decoding unit 210 and information on a previously decoded block or picture received from the memory 245.

As described above, as the operation of the image encoder, in performing intra-prediction, when a prediction unit is identical in size with a transform unit, intra-prediction may be performed on the prediction unit on the basis of pixels positioned at the left, the top-left, and the top of the prediction unit. However, in performing intra-prediction, when a prediction unit is different in size with a transform unit, intra-prediction may be performed by using a reference pixel based on the transform unit. In addition, intra-prediction using N×N partitioning may be only used for the smallest coding unit.

The prediction units 230 and 235 may include a PU determination module, an inter-prediction unit, and an intra-prediction unit. The PU determination unit may receive various types of information, such as information on a prediction unit, information on a prediction mode of an intra-prediction method, information on a motion prediction of an inter-prediction method, etc. which are input from the entropy decoding unit 210, divide a prediction unit in a current coding unit, and determine whether inter-prediction or intra-prediction is performed on the prediction unit. By using information required in inter-prediction of a current prediction unit received from the image encoder, the inter-prediction unit 230 may perform inter-prediction on the current prediction unit on the basis of information on at least one of a previous picture and a subsequent picture of a current picture including the current prediction unit. Alternatively, inter-prediction may be performed on the basis of information on some pre-reconstructed regions in a current picture including the current prediction unit.

In order to perform inter-prediction, which method among a skip mode, a merge mode, an AMVP mode, or an intra block copy mode is used as a motion prediction method for a prediction unit included in a coding unit may be determined on the basis of the coding unit.

The intra prediction unit 235 may generate a prediction block on the basis of information on a pixel within a current picture. When a prediction unit is a prediction unit for which intra-prediction has been performed, intra-prediction may be performed on the basis of information on an intra-prediction mode of a prediction unit received from the image encoder. The intra prediction unit 235 may include an adaptive intra smoothing (AIS) filter, a reference pixel interpolation module, or a DC filter. The AIS filter may perform filtering on a reference pixel of a current block, and whether to apply the filter may be determined according to a prediction mode for a current prediction unit. A prediction mode of the prediction unit and information on an AIS filter which are received from the image encoder may be used when performing AIS filtering on a reference pixel of a current block. When a prediction mode for the current block is a mode to which AIS filtering is not applied, the AIS filter may not be applied.

When a prediction mode of a prediction unit is a prediction mode for which intra-prediction is performed on the basis of a pixel value obtained by interpolating reference pixels, the reference pixel interpolation unit may interpolate the reference pixels so as to generate a reference pixel having a unit of an integer or less. When a prediction mode for a current prediction unit is a prediction mode where a prediction block is generated without interpolating reference pixels, the reference pixels may not be interpolated. The DC filter may generate a prediction block through filtering when a prediction mode for a current block is a DC mode.

A reconstructed block or picture may be provided to the filter unit 240. The filter unit 240 may include a deblocking filter, an offset correction module, and an ALF.

Information on whether or not a deblocking filter has been applied to a corresponding block or picture and information on whether a strong filter or a weak filter is applied when the deblocking filter is applied may be received from the image encoder. The deblocking filter of the image decoder may receive information on a deblocking filter from the image encoder, and the image decoder may perform deblocking filtering on a corresponding block.

The offset correction unit may perform offset correction on a reconstructed image on the basis of a type of offset correction, information on an offset value, etc. applied to an image when performing encoding.

The ALF may be applied to a coding unit on the basis of information on whether or not to apply ALF, information on an ALF coefficient, etc. received from the encoder. The above ALF information may be provided by being included in a particular parameter set.

In the memory 245, a reconstructed picture or block may be stored so as to be used as a reference picture or reference block, and the reconstructed picture may be provided to an output unit.

FIG. 3 is a view showing a basic coding tree unit according to an embodiment of the present disclosure.

The largest coding block may be defined as a coding tree block. A single picture may be partitioned into a plurality of coding tree units (CTU). A CTU may be a coding unit of the largest size, and may be referred to as the largest coding unit (LCU). FIG. 3 is a view showing an example where a single picture is partitioned into a plurality of CTUs.

A size of a CTU may be defined in a picture level or sequence level. For the same, information representing a size of a CTU may be signaled through a picture parameter set or sequence parameter set.

In an example, a size of a CTU for the entire picture within a sequence may be set to 128×128. Alternatively, any one of 128×128 or 256×256 may be determined as a size of a CTU in a picture level. In an example, a CTU may be set to have a size of 128×128 in a first picture, and a size of 256×256 in a second picture.

Coding blocks may be generated by partitioning a CTU. A coding block represents a basic unit for performing encoding/decoding. In an example, prediction or transform may be performed for each coding block, or a prediction encoding mode may be determined for each coding block. In this connection, the prediction encoding mode represents a method of generating a prediction image. In an example, a prediction encoding mode may include intra-prediction, inter-prediction, current picture referencing (CPR), intra block copy (IBC) or combined prediction. For a coding block, a prediction block of the coding block may be generated by using a prediction encoding mode of at least one of intra-prediction, inter-prediction, current picture referencing, or combined prediction.

Information representing a prediction encoding mode for a current block may be signaled in a bitstream. In an example, the information may be a 1-bit flag representing whether a prediction encoding mode is an intra mode or an inter mode. When a prediction encoding mode for a current block is determined as an inter mode, current picture referencing or combined prediction may be available.

Current picture referencing is setting a current picture as a reference picture and obtaining a prediction block of a current block from a region that has been already encoded/decoded within a current picture. In this connection, the current picture means a picture including the current block. Information representing whether or not current picture referencing is applied to a current block may be signaled in a bitstream. In an example, the information may be a 1-bit flag. When the flag is TRUE, a prediction encoding mode for a current block may be determined as current picture referencing, and when the flag is FALSE, a prediction encoding mode for a current block may be determined as inter-prediction.

Alternatively, a prediction encoding mode for a current block may be determined on the basis of a reference picture index. In an example, when a reference picture index indicates a current picture, a prediction encoding mode for a current block may be determined as current picture referencing. When a reference picture index indicates a picture other than a current picture, a prediction encoding mode for a current block may be determined as inter-prediction. In other words, current picture referencing is a prediction method using information on a region that has been already encoded/decoded within a current picture, and inter-prediction is a prediction method using information on another picture that has been already encoded/decoded.

Combined prediction represents a combined encoding mode combining at least two of intra-prediction, inter-prediction, and current picture referencing. In an example, when combined prediction is applied, a first prediction block may be generated on the basis of any one of intra-prediction, inter-prediction or current picture referencing, and a second prediction block may be generated on the basis of another. When a first prediction block and a second prediction block are generated, a final prediction block may be generated by calculating an average or weighted sum of the first prediction block and the second prediction block. Information representing whether or not to apply combined prediction to a current block may be signaled in a bitstream. The information may be a 1-bit flag.

FIG. 4 is a view showing various partitioning types a coding block.

A coding block may be partitioned into a plurality of coding blocks on the basis of quad-tree partitioning, binary-tree partitioning or ternary tree partitioning. The partitioned coding block may be partitioned again into a plurality of coding blocks on the basis of quad-tree partitioning, binary-tree partitioning or ternary tree partitioning.

Quad-tree partitioning represents a method of partitioning a current block into four blocks. As a result of quad-tree partitioning, a current block may be partitioned into four square partitions (refer to "SPLIT_QT" of FIG. 4(*a*)).

Binary-tree partitioning represents a method of partitioning a current block into two blocks. Partitioning a current block into two blocks along a vertical direction (that is, using a vertical line across the current block) may be referred to vertical directional binary-tree partitioning, and partitioning a current block into two blocks along a horizontal direction (that is, using a horizontal line across the current block) may be referred to as horizontal directional binary-tree partitioning. As a result of binary-tree partitioning, a current block may be partitioned into two non-square partitions. "SPLIT_BT_VER" of FIG. 4(*b*) is a view showing a result of vertical directional binary-tree partitioning, and "SPLIT_BT_HOR" of FIG. 4(*c*) is a view showing a result of horizontal directional binary-tree partitioning.

Ternary-tree partitioning represents a method of partitioning a current block into three blocks. Partitioning a current block into three blocks along a vertical direction (that is, using two vertical lines across the current block) may be referred to vertical directional ternary-tree partitioning, and partitioning a current block into three blocks along a horizontal direction (that is, using two horizontal lines across the current block) may be referred to as horizontal directional ternary-tree partitioning. As a result of ternary-tree partitioning, a current block may be partitioned into three non-square partitions. In this connection, a width/height of a partition positioned at the center of a current block may be twice than a width/height of other partitions. "SPLIT_TT_VER" of FIG. 4(d) is a view showing a result of vertical directional ternary-tree partitioning, and "SPLIT_TT_HOR" of FIG. 4(e) is a view showing a result of horizontal directional ternary-tree partitioning.

The number of partitioning times of a CTU may be defined as a partitioning depth. The maximum partitioning depth of a CTU may be determined in a sequence or picture level. Accordingly, the maximum partitioning depth of a CTU may vary on the basis of a sequence or picture.

Alternatively, the maximum partitioning depth may be independently determined for each partitioning method. In an example, the maximum partitioning depth where quad-tree partitioning is allowed may differ from the maximum partitioning depth where binary-tree partitioning and/or ternary-tree partitioning is allowed.

The encoder may signal information representing at least one of a partitioning type and a partitioning depth of a current block in a bitstream. The decoder may determine a partitioning type and a partitioning depth of a CTU on the basis of the information obtained by parsing a bitstream.

FIG. 5 is a view of an example showing an aspect of partitioning a CTU.

Partitioning a coding block by using quad-tree partitioning, binary-tree partitioning and/or ternary-tree partitioning may be referred to as multi-tree partitioning.

Coding blocks generated by partitioning a coding block by applying multi-tree partitioning may be referred to child coding blocks. When a partitioning depth of a coding block is k, a partitioning depth of child coding blocks is set to k+1.

To the contrary, for coding blocks having a partitioning depth of k+1, a coding block having a partitioning depth of k may be referred to as a parent coding block.

A partitioning type of a coding block may be current determined on the basis of at least one of a partitioning type of a parent coding block and a partitioning type of a neighboring coding block. In this connection, the neighboring coding block may be a block adjacent to a current coding block, and include at least one of an top neighboring block, a left neighboring block, or a neighboring block adjacent to the top-left corner of the current coding block. In this connection, the partitioning type may include whether or not to apply quad-tree partitioning, whether or not to apply binary-tree partitioning, a direction of binary-tree partitioning, whether or not to apply ternary-tree partitioning, or a direction of ternary-tree partitioning.

In order to determine a partitioning type of a coding block, information representing whether or not a coding block is partitioned may be signaled in a bitstream. The information is a 1-bit flag of "split_cu_flag", and when the flag is TRUE, it may represent that a coding block is partitioned by a multi tree partitioning method.

When split_cu_flag is TRUE, information representing whether or not a coding block is partitioned by quad-tree partitioning may be signaled in a bitstream. The information is a 1-bit flag of split_qt_flag, and when the flag is TRUE, a coding block may be partitioned into four blocks.

In an example, in an example shown in FIG. 5, a CTU is partitioned by quad-tree partitioning, and thus four coding blocks having a partitioning depth of 1 are generated. In addition, it is shown that quad-tree partitioning is applied again to the first coding block and the fourth coding block among four coding blocks generated by quad-tree partitioning. As a result, four coding blocks having a partitioning depth of 2 may be generated.

In addition, by applying again quad-tree partitioning to a coding block having a partitioning depth of 2, a coding block having a partitioning depth of 3 may be generated.

When quad-tree partitioning is not applied to a coding block, whether to perform binary-tree partitioning or ternary-tree partitioning for the coding block may be determined according to at least one of a size of the coding block, whether or not the coding block is positioned at a picture boundary, the maximum partitioning depth, or a partitioning type of a neighboring block. When it is determined to perform binary-tree partitioning or ternary-tree partitioning for the coding block, information representing a partitioning direction may be signaled in a bitstream. The information may be a 1-bit flag of mtt_split_cu_vertical_flag. Whether a partitioning direction is a vertical direction or a horizontal direction may be determined on the basis of the flag. Additionally, information representing which one of binary-tree partitioning or ternary-tree partitioning is applied to the coding block may be signaled in a bitstream. The information may be a 1-bit flag of mtt_split_cu_binary_flag. Whether binary-tree partitioning is applied to the coding block or ternary-tree partitioning is applied to the coding block may be determined on the basis of the flag.

In an example, in an example shown in FIG. 5, vertical directional binary-tree partitioning is applied to a coding block having a partitioning depth of 1, vertical directional ternary-tree partitioning is applied to a left coding block among coding blocks generated by the partitioning, and vertical directional binary-tree partitioning is applied to a right coding block.

Inter-prediction is a prediction encoding mode predicting a current block by using information on a previous picture. In an example, a block (hereinafter, collocated block) at the same position with a current block within a previous picture may be set as a prediction block of the current block. Hereinafter, a prediction block generated on the basis of a collocated block of the current block may be referred to as a collocated prediction block.

To the contrary, when an object present in a previous picture has moved to another position in a current picture, a current block may be effectively predicted by using motions of the object. For example, when a motion direction and a size of the object is determined by comparing a previous picture with a current picture, a prediction block (or prediction image) of the current block may be generated according to motion information of the objects. Hereinafter, a prediction block generated by using motion information may be referred to as a motion prediction block.

A residual block may be generated by subtracting a prediction block from a current block. In this connection, in case where an object moves, energy of a residual block may be reduced by using a motion prediction block rather than using a collocated prediction block, and thus compression performance of the residual block may be improved.

As above, generating a prediction block by using motion information may be referred to as motion estimation prediction. In the most inter-prediction, a prediction block may be generated on the basis of motion compensation prediction.

Motion information may include at least one of a motion vector, a reference picture index, a prediction direction, and a bidirectional weighting factor index. A motion vector represents a motion direction of an object and a magnitude. A reference picture index specifies a reference picture of a current block among reference pictures included in a reference picture list. A prediction direction indicates any one of uni-directional L0 prediction, uni-directional L1 prediction, or bi-directional prediction (L0 prediction and L1 prediction). At least one of L0 directional motion information and L1 directional motion information may be used according to a prediction direction of a current block. A bidirectional weighting factor index specifies a weighting factor applied to an L0 prediction block and a weighting factor applied to an L1 prediction block.

FIG. 6 is a flow diagram of an inter-prediction method according to the embodiment of the present disclosure.

In reference to FIG. 6, an inter-prediction method includes determining an inter-prediction mode for a current block S601, obtaining motion information of the current block according to the determined inter-prediction mode S602, and performing motion compensation prediction for a current block on the basis of the obtained motion information S603.

In this connection, the inter-prediction mode may represent various methods for determining motion information of a current block, and include an inter-prediction mode using translation motion information, an inter-prediction mode using affine motion information. In an example, an inter-prediction mode using translation motion information may include a merge mode and a motion vector prediction mode, and an inter-prediction mode using affine motion information may include an affine merge mode and an affine motion vector prediction mode. Motion information on a current block may be determined on the basis of a neighboring block neighboring the current block or information obtained by parsing a bitstream.

Motion information of a current block may be derived from motion information of another block. In this connection, another block may be a block encoded/decoded by inter prediction previous to the current block. Setting motion information of a current block to be the same as motion information of another block may be defined as a merge mode. Also, setting a motion vector of another block as a prediction value of a motion vector of the current block may be defined as a motion vector prediction mode.

FIG. 7 is a flow diagram of a process deriving the motion information of a current block under a merge mode.

The merge candidate of a current block may be derived S701. The merge candidate of a current block may be derived from a block encoded/decoded by inter-prediction prior to a current block.

FIG. 8 is a diagram illustrating candidate blocks used to derive a merge candidate.

The candidate blocks may include at least one of neighboring blocks including a sample adjacent to a current block or non-neighboring blocks including a sample non-adjacent to a current block. Hereinafter, samples determining candidate blocks are defined as base samples. In addition, a base sample adjacent to a current block is referred to as a neighboring base sample and a base sample non-adjacent to a current block is referred to as a non-neighboring base sample.

A neighboring base sample may be included in a neighboring column of a leftmost column of a current block or a neighboring row of an uppermost row of a current block. In an example, when the coordinate of a left-top sample of a current block is (0,0), at least one of a block including a base sample at a position of (−1, H−1), (W−1, −1), (W, −1), (−1, H) or (−1, −1) may be used as a candidate block. In reference to a diagram, the neighboring blocks of index 0 to 4 may be used as candidate blocks.

A non-neighboring base sample represents a sample that at least one of a x-axis distance or a y-axis distance with a base sample adjacent to a current block has a predefined value. In an example, at least one of a block including a base sample that a x-axis distance with a left base sample is a predefined value, a block including a non-neighboring sample that a y-axis distance with a top base sample is a predefined value or a block including a non-neighboring sample that a x-axis distance and a y-axis distance with a left-top base sample are a predefined value may be used as a candidate block. A predefined value may be a natural number such as 4, 8, 12, 16, etc. In reference to a diagram, at least one of blocks in an index 5 to 26 may be used as a candidate block.

A sample not positioned on the same vertical, horizontal or diagonal line as a neighboring base sample may be set as a non-neighboring base sample.

Hereinafter, a candidate block including a neighboring base sample among candidate blocks is referred to as a neighboring block and a candidate block including a non-neighboring base sample is referred to as a non-neighboring block.

When a distance between a current block and a candidate block is equal to or greater than a threshold value, the candidate block may be set to be unavailable as a merge candidate. The threshold value may be determined based on a size of a coding tree unit. In an example, a threshold value may be set as a height of a coding tree unit (ctu_height) or a value adding or subtracting an offset to or from a height of a coding tree unit (ctu_height±N). As an offset N is a predefined value in an encoding device and a decoding device, it may be set to be 4, 8, 16, 32 or ctu_height.

When a difference between a y-axis coordinate of a current block and a y-axis coordinate of a sample included in a candidate block is greater than a threshold value, a candidate block may be determined to be unavailable as a merge candidate.

Alternatively, a candidate block not belonging to the same coding tree unit as a current block may be set to be unavailable as a merge candidate. In an example, when a base sample is out of an upper boundary of a coding tree unit to which a current block belongs, a candidate block including the base sample may be set to be unavailable as a merge candidate.

When an upper boundary of a current block adjoins an upper boundary of a coding tree unit, a plurality of candidate blocks may be determined to be unavailable as a merge candidate, so the encoding/decoding efficiency of a current block may be reduced. To solve such a problem, it may be set that the number of candidate blocks positioned at the left of a current block is greater than the number of candidate blocks positioned at the top of a current block.

FIG. 9 is a diagram illustrating candidate blocks used to derive a merge candidate.

As in an example shown in FIG. 9, top blocks belonging to N block rows at the top of a current block and left blocks belonging to M block columns at the left of a current block may be set as candidate blocks. In this case, the number of left candidate blocks may be set to be greater than the number of top candidate blocks by setting N to be greater than M.

In an example, a difference between a y-axis coordinate of a base sample in a current block and a y-axis coordinate of a top block which may be used as a candidate block may be set not to exceed N times the height of a current block. In addition, a difference between an x-axis coordinate of a base sample in a current block and an x-axis coordinate of a left block which may be used as a candidate block may be set not to exceed M times a width of a current block.

In an example, an example shown in FIG. 9 showed that blocks belonging to two block rows at the top of a current block and blocks belonging to five left block columns at the left of a current block are set as candidate blocks.

A merge candidate may be derived from a temporal neighboring block included in a picture different from a current block. In an example, a merge candidate may be derived from a collocated block included in a collocated picture. Any one of reference pictures included in a reference picture list may be set as a collocated picture. Index information identifying a collocated picture among reference pictures may be signaled in a bitstream. Alternatively, a reference picture with a predefined index among reference pictures may be determined as a collocated picture.

The motion information of a merge candidate may be set the same as the motion information of a candidate block. In an example, at least one of a motion vector, a reference picture index, a prediction direction or a bidirectional weight index of a candidate block may be set as the motion information of a merge candidate.

A merge candidate list including a merge candidate may be generated S702.

The index of merge candidates in a merge candidate list may be assigned according to the predetermined order. In an example, an index may be assigned in the order of a merge candidate derived from a left neighboring block, a merge candidate derived from a top neighboring block, a merge candidate derived from a right-top neighboring block, a merge candidate derived from a left-bottom neighboring block, a merge candidate derived from a left-top neighboring block and a merge candidate derived from a temporal neighboring block.

When a plurality of merge candidates are included in a merge candidate, at least one of a plurality of merge candidates may be selected S703. Concretely, information for specifying any one of a plurality of merge candidates may be signaled in a bitstream. In an example, information, merge_idx, representing an index of any one of merge candidates included in a merge candidate list may be signaled in a bitstream.

When the number of merge candidates included in a merge candidate list is less than the threshold, a motion information candidate included in a motion information table may be added to a merge candidate list as a merge candidate. In this connection, the threshold may be the maximum number of merge candidates which may be included in a merge candidate list or a value in which an offset is subtracted from the maximum number of merge candidates. An offset may be a natural number such as 1 or 2, etc.

A motion information table includes a motion information candidate derived from a block encoded/decoded based on inter-prediction in a current picture. In an example, the motion information of a motion information candidate included in a motion information table may be set the same as the motion information of a block encoded/decoded based on inter-prediction. In this connection, motion information may include at least one of a motion vector, a reference picture index, a prediction direction or a bidirectional weight index.

A motion information candidate included in a motion information table also can be referred to as a inter region merge candidate or a prediction region merge candidate.

The maximum number of a motion information candidate which may be included in a motion information table may be predefined in an encoder and a decoder. In an example, the maximum number of a motion information candidate which may be included in a motion information table may be 1, 2, 3, 4, 5, 6, 7, 8 or more (e.g. 16).

Alternatively, information representing the maximum number of a motion information candidate which may be included in a motion information table may be signaled in a bitstream. The information may be signaled in a sequence, a picture or a slice level. The information may represent the maximum number of a motion information candidate which may be included in a motion information table. Alternatively, the information may represent difference between the maximum number of a motion information candidate which may be included in a motion information table and the maximum number of a merge candidate which may be included in a merge candidate list.

Alternatively, the maximum number of a motion information candidate which may be included in a motion information table may be determined according to a picture size, a slice size or a coding tree unit size.

A motion information table may be initialized in a unit of a picture, a slice, a tile, a brick, a coding tree unit or a coding tree unit line (a row or a column). In an example, when a slice is initialized, a motion information table is also initialized thus a motion information table may not include any motion information candidate.

Alternatively, information representing whether a motion information table will be initialized may be signaled in a bitstream. The information may be signaled in a slice, a tile, a brick or a block level. Until the information indicates the initialization of a motion information table, a pre-configured motion information table may be used.

Alternatively, information on an initial motion information candidate may be signaled in a picture parameter set or a slice header. Although a slice is initialized, a motion information table may include an initial motion information candidate. Accordingly, an initial motion information candidate may be used for a block which is the first encoding/decoding target in a slice.

Alternatively, a motion information candidate included in the motion information table of a previous coding tree unit may be set as an initial motion information candidate. In an example, a motion information candidate with the smallest index or with the largest index among motion information candidates included in the motion information table of a previous coding tree unit may be set as an initial motion information candidate.

Blocks are encoded/decoded in the order of encoding/decoding, and blocks encoded/decoded based on inter-prediction may be sequentially set as a motion information candidate in the order of encoding/decoding.

FIG. 10 is a diagram to explain the update aspect of a motion information table.

For a current block, when inter-prediction is performed S1001, a motion information candidate may be derived based on a current block S1002. The motion information of a motion information candidate may be set the same as that of a current block.

When a motion information table is empty S1003, a motion information candidate derived based on a current block may be added to a motion information table S1004.

When a motion information table already includes a motion information candidate S1003, a redundancy check for the motion information of a current block (or, a motion information candidate derived based on it) may be performed S1005. A redundancy check is to determine whether the motion information of a pre-stored motion information candidate in a motion information table is the same as the motion information of a current block. A redundancy check may be performed for all pre-stored motion information candidates in a motion information table. Alternatively, a redundancy check may be performed for motion information candidates with an index over or below the threshold among pre-stored motion information candidates in a motion information table. Alternatively, a redundancy check may be performed for the predefined number of motion information candidates. In an example, 2 motion information candidates with smallest indexes or with largest indexes may be determined as targets for a redundancy check.

When a motion information candidate with the same motion information as a current block is not included, a motion information candidate derived based on a current block may be added to a motion information table S1008. Whether motion information candidates are identical may be determined based on whether the motion information (e.g. a motion vector/a reference picture index, etc.) of motion information candidates is identical.

In this connection, when the maximum number of motion information candidates are already stored in a motion information table S1006, the oldest motion information candidate may be deleted S1007 and a motion information candidate derived based on a current block may be added to a motion information table S1008. In this connection, the oldest motion information candidate may be a motion information candidate with the largest or the smallest index.

Motion information candidates may be identified by respective index. When a motion information candidate derived from a current block is added to a motion information table, the smallest index (e.g. 0) may be assigned to the motion information candidate and indexes of pre-stored motion information candidates may be increased by 1. In this connection, When the maximum number of motion information candidates are already stored in a motion information table, a motion information candidate with the largest index is removed.

Alternatively, when a motion information candidate derived from a current block is added to a motion information table, the largest index may be assigned to the motion information candidate. In an example, when the number of pre-stored motion information candidates in a motion information table is less than the maximum value, an index with the same value as the number of pre-stored motion information candidates may be assigned to the motion information candidate. Alternatively, when the number of pre-stored motion information candidates in a motion information table is equal to the maximum value, an index subtracting 1 from the maximum value may be assigned to the motion information candidate. Alternatively, a motion information candidate with the smallest index is removed and the indexes of residual pre-stored motion information candidates are decreased by 1.

FIG. 11 is a diagram showing the update aspect of a motion information table.

It is assumed that as a motion information candidate derived from a current block is added to a motion information table, the largest index is assigned to the motion information candidate. In addition, it is assumed that the maximum number of a motion information candidate is already stored in a motion information table.

When a motion information candidate HmvpCand[n+1] derived from a current block is added to a motion information table HmvpCandList, a motion information candidate HmvpCand[0] with the smallest index among pre-stored motion information candidates may be deleted and indexes of residual motion information candidates may be decreased by 1. In addition, the index of a motion information candidate HmvpCand[n+1] derived from a current block may be set to the maximum value (for an example shown in FIG. 11, n).

When a motion information candidate identical to a motion information candidate derived based on a current block is prestored S1005, a motion information candidate derived based on a current block may not be added to a motion information table S1009.

Alternatively, while a motion information candidate derived based on a current block is added to a motion information table, a pre-stored motion information candidate identical to the motion information candidate may be removed. In this case, it causes the same effect as when the index of a pre-stored motion information candidate is newly updated.

FIG. 12 is a diagram showing an example in which the index of a pre-stored motion information candidate is updated.

When the index of a pre-stored motion information candidate identical to a motion information candidate mvCand derived from a current block is hIdx, the pre-stored motion information candidate may be removed and the index of motion information candidates with an index larger than hIdx may be decreased by 1. In an example, an example shown in FIG. 1 showed that HmvpCand[2] identical to mvCand is deleted in a motion information table HvmpCandList and an index from HmvpCand[3] to HmvpCand[n] is decreased by 1.

And, a motion information candidate mvCand derived based on a current block may be added to the end of a motion information table.

Alternatively, an index assigned to a pre-stored motion information candidate identical to a motion information candidate derived based on a current block may be updated. For example, the index of a pre-stored motion information candidate may be changed to the minimum value or the maximum value.

The motion information of blocks included a in predetermined region may be set not to be added to a motion information table. In an example, a motion information candidate derived based on the motion information of a block included in a merge processing region may not be added to a motion information table. Since the encoding/decoding order for blocks included in a merge processing region is not defined, it is improper to use motion information of any one of them for the inter-prediction of another of them. Accordingly, motion information candidates derived based on blocks included in a merge processing region may not be added to a motion information table.

Alternatively, the motion information of a block smaller than a preset size may be set not to be added to a motion information table. In an example, a motion information candidate derived based on the motion information of a coding block whose width or height is smaller than 4 or 8 or the motion information of a 4×4 sized coding block may not be added to a motion information table.

When motion compensation prediction is performed per sub-block basis, a motion information candidate may be derived based on the motion information of a representative sub-block among a plurality of sub-blocks included in a current block. In an example, when a sub-block merge candidate is used for a current block, a motion information candidate may be derived based on the motion information of a representative sub-block among sub-blocks.

The motion vector of sub-blocks may be derived in the following order. First, any one of merge candidates included in the mere candidate list of a current block may be selected and an initial shift vector (shVector) may be derived based on the motion vector of a selected merge candidate. And, a shift sub-block that a base sample is at a position of (xColSb, yColSb) may be derived by adding an initial shift vector to the position (xSb, ySb) of the base sample of each sub-block in a coding block (e.g. a left-top sample or a center sample). The below Equation 1 shows a formula for deriving a shift sub-block.

(xColSb,yColSb)=(xSb+shVector[0]>>4,ySb+shVector[1]>>4)  [Equation 1]

Then, the motion vector of a collocated block corresponding to the center position of a sub-block including (xColSb, yColSb) may be set as the motion vector of a sub-block including (xSb, ySb).

A representative sub-block may mean a sub-block including the a top-left sample, a central sample, a bottom-right sample, a top-right sample or a bottom-left sample of a current block.

FIG. 13 is a diagram showing the position of a representative sub-block.

FIG. 13(a) shows an example in which a sub-block positioned at the left-top of a current block is set as a representative sub-block and FIG. 13(b) shows an example in which a sub-block positioned at the center of a current block is set as a representative sub-block. When motion compensation prediction is performed in a basis of a sub-block, the motion information candidate of a current block may be derived based on the motion vector of a sub-block including the left-top sample of a current block or including the central sample of a current block.

Based on the inter-prediction mode of a current block, it may be determined whether a current block will be used as a motion information candidate. In an example, a block encoded/decoded based on an affine motion model may be set to be unavailable as a motion information candidate. Accordingly, although a current block is encoded/decoded by inter-prediction, a motion information table may not be updated based on a current block when the inter-prediction mode of a current block is an affine prediction mode.

Alternatively, based on at least one of a motion vector resolution of a current block, whether a merge offset encoding method is applied, whether combined prediction is applied or whether triangular partitioning is applied, whether a current block will be used as a motion information candidate may be determined. In an example, a current block may be set to be unavailable as a motion information candidate in at least one of a case when a motion information resolution of a current block is equal to or greater than 2 integer-pel, a case when combined prediction is applied to a current block or a case when a merge offset encoding method is applied to a current block.

Alternatively, a motion information candidate may be derived based on at least one sub-block vector of a sub-block included in a block encoded/decoded based on an affine motion model. In an example, a motion information candidate may be derived by using a sub-block positioned at the left-top, the center or the right-top of a current block.

Alternatively, the average value of the sub-block vectors of a plurality of sub-blocks may be set as the motion vector of a motion information candidate.

Alternatively, a motion information candidate may be derived based on the average value of the affine seed vectors of a block encoded/decoded based on an affine motion model. In an example, at least one average of the first affine seed vector, the second affine seed vector or the third affine seed vector of a current block may be set as the motion vector of a motion information candidate.

Alternatively, a motion information table may be configured per inter-prediction mode. In an example, at least one of a motion information table for a block encoded/decoded by an intra block copy, a motion information table for a block encoded/decoded based on a translation motion model or a motion information table for a block encoded/decoded based on an affine motion model may be defined. According to the inter-prediction mode of a current block, any one of a plurality of motion information tables may be selected.

FIG. 14 shows an example in which a motion information table is generated per inter-prediction mode.

When a block is encoded/decoded based on a non-affine motion model, a motion information candidate mvCand derived based on the block may be added to a non-affine motion information table HmvpCandList. On the other hand, when a block is encoded/decoded based on an affine motion model, a motion information candidate mvAfCand derived based on the above model may be added to an affine motion information table HmvpCandList.

The affine seed vectors of the above block may be stored in a motion candidate from block information derived a encoded/decoded based on an affine motion model. Accordingly, the motion information candidate may be used as a merge candidate for deriving the affine seed vectors of a current block.

Alternatively, a motion information table may be configured per motion vector resolution. In an example, at least one of a motion information table for storing motion information that a motion vector resolution is a ¹⁄₁₆ pel, a motion information table for storing motion information that a motion vector resolution is a ¼ pel, a motion information table for storing motion information that a motion vector resolution is a ½ pel, a motion information table for storing motion information that a motion vector resolution is an integer-pel or a motion information table for storing motion information that a motion vector resolution is a 4 integer-pel may be defined.

FIG. 15 shows an example in which a motion information table is generated per motion vector resolution.

When a motion vector resolution of a block has a ¼ pel, the motion information of a block, mvCand, may be stored in a quarter-pel motion information table HmvpQPCandList. On the other hand, when a motion vector resolution of a block has an integer-pel, the motion information of a block, mvCand, may be stored in an integer-pel motion information table HmvpIPCandList. When a motion vector resolution of a block has a 4 integer-pel, the motion information of a block, mvCand, may be stored in a 4 integer-pel motion information table Hmvp4IPCandList.

Based on a motion vector resolution of a current block, a merge candidate of a current block may be derived by selecting a motion information table. In an example, when a motion vector resolution of a current block is a ¼ pel, a merge candidate of a current block may be derived by using a quarter-pel motion information table HmvpQPCandList. On the other hand, when a motion vector resolution of a current block is an integer-pel, a merge candidate of a current block may be derived by using an integer-pel motion information table HmvpIPCandList.

Alternatively, the motion information of a block to which a merge offset encoding method is applied may be stored in a separate motion information table.

FIG. 16 shows an example in which the motion information of a block to which a merge offset encoding method is applied is stored in a separate motion information table.

When a merge offset vector encoding method is not applied to a block, the motion information of a block, mvCand, may be stored in a motion information table HmvpCandList. On the other hand, when a merge offset vector encoding method is applied to a block, the motion information of a block, mvCand, may not be stored in a motion information table HmvpCandList, and may be stored in a merge offset motion information table HmvpMMVD-CandList.

Based on whether a merge offset vector encoding method is applied to a current block, a motion information table may be selected. In an example, when a merge offset encoding method is not applied to a current block, a merge candidate of a current block may be derived by using a motion information table HmvpCandList. On the other hand, when a merge offset encoding method is applied to a current block, a merge candidate of a current block may be derived by using a merge offset motion information table HmvpMMVDCandList.

An additional motion information table may be defined in addition to the described motion information table. A long-term motion information table (hereinafter, referred to as the second motion information table) may be defined in addition to the above-described motion information table (hereinafter, referred to as the first motion information table). In this connection, a long-term motion information table includes long-term motion information candidates.

When both the first motion information table and the second motion information table are empty, first, a motion information candidate may be added to the second motion information table. After the number of motion information candidates available for the second motion information table reaches the maximum number, a motion information candidate may be added to the first motion information table.

Alternatively, one motion information candidate may be added to both the second motion information table and the first motion information table.

In this connection, a second motion information table which is fully filled may not perform an update any more. Alternatively, when a decoded region in a slice is over a predetermined ratio, the second motion information table may be updated. Alternatively, the second motion information table may be updated per N coding tree unit line.

On the other hand, the first motion information table may be updated whenever an encoded/decoded block is generated by inter-prediction. But, a motion information candidate added to the second motion information table may be set not to be used to update the first motion information table.

Information for selecting any one of the first motion information table or the second motion information table may be signaled in a bitstream. When the number of a merge candidate included in a merge candidate list is less than the threshold, motion information candidates included in a motion information table indicated by the information may be added to a merge candidate list as a merge candidate.

Alternatively, a motion information table may be selected based on a size of a current block, a shape of the current block, an inter-prediction mode of the current block, whether bidirectional prediction is applied to the current block, whether a motion vector is refined or whether a triangular partitioning is applied to the current block.

Alternatively, when the number of merge candidates included in a merge candidate list is less than the maximum number even though a motion information candidate included in the first motion information table is added, a motion information candidate included in the second motion information table may be added to a merge candidate list.

FIG. 17 is a diagram showing an example in which a motion information candidate included in a long-term motion information table is added to a merge candidate list.

In case that the number of a merge candidate included in a merge candidate list is less than the maximum number, a motion information candidate included in the first motion information table HmvpCandList may be added to a merge candidate list. In When the number of a merge candidate included in the merge candidate list is less than the maximum number even though motion information candidates included in the first motion information table is added to a merge candidate list, a motion information candidate included in a long-term motion information table HmvpLTCandList may be added to the merge candidate list.

A motion information candidate may be set to include additional information except for motion information. In a example, at least one of a size, shape or partition information of a block may be additionally stored in a motion information candidate. When the merge candidate list of a current block is configured, only motion information candidate whose a size, shape or partition information is identical or similar to a current block among motion information candidates may be used or a motion information candidate whose a size, shape or partition information is identical or similar to a current block may be added to a merge candidate list in advance. Alternatively, a motion information table may be generated per block size, shape or partition information. The merge candidate list of a current block may be configured by using a motion information table matching the shape, size or partition information of a current block among a plurality of motion information tables.

When the number of a merge candidate included in the merge candidate list of a current block is less than the threshold, a motion information candidate included in a motion information table may be added to a merge candidate list as a merge candidate. The additional process is performed in the order reflecting sorted order of indexes of motion information candidates in ascending or descending order. In an example, a motion information candidate with the largest index may be first added to the merge candidate list of a current block.

When a motion information candidate included in a motion information table is added to a merge candidate list, a redundancy check between a motion information candidate and pre-stored merge candidates in the merge candidate list may be performed. As a result of a redundancy check, a motion information candidate with the same motion information as a pre-stored merge candidate may not be added to the merge candidate list.

A redundancy check may be performed only for a part of motion information candidates included in a motion information table. In an example, a redundancy check may be performed only for a motion information candidate with an index over or below the threshold. Alternatively, a redundancy check may be performed only for N motion information candidates with the largest index or the smallest index. Alternatively, a redundancy check may be performed only for a part of pre-stored merge candidates in a merge candidate list. In an example, a redundancy check may be performed only for a merge candidate whose index is over or below the threshold or a merge candidate derived from a block at a specific position. In this connection, a specific position may include at least one of the left neighboring block, the top neighboring block, the right-top neighboring block or the left-bottom neighboring block of a current block.

FIG. 18 is a diagram showing an example in which a redundancy check is performed only for a part of merge candidates.

When a motion information candidate HmvpCand[j] is added to a merge candidate list, a redundancy check with 2 merge candidates with the largest index, mergeCandList[NumMerge−2] and mergeCandList[NumMerge−1], may be performed for a motion information candidate. In this connection, NumMerge may show the number of an available e candidate and a temporal merge candidate.

Unlike a shown example, when a motion information candidate HmvpCand[j] is added to a merge candidate list, a redundancy check with 2 merge candidates with the smallest index may be performed for a motion information candidate. For example, it may be checked whether mergeCandList[0] and mergeCandList[1] are identical to HmvpCand[j].

Alternatively, a redundancy check may be performed only for a merge candidate derived from a specific position. In an example, a redundancy check may be performed for at least one of a merge candidate derived from a neighboring block positioned at the left of a current block or at the top of a current block. When there is no merge candidate derived from a specific position in a merge candidate list, a motion information candidate may be added to a merge candidate list without a redundancy check.

When a motion information candidate HmvpCand[j] is added to a merge candidate list, a redundancy check with 2 merge candidates with the largest index, mergeCandList[NumMerge−2] and mergeCandList[NumMerge−1], may be performed for a motion information candidate. In this connection, NumMerge may show the number of an available spatial merge candidate and a temporal merge candidate.

A redundancy check with a merge candidate may be performed only for a part of motion information candidates. In an example, a redundancy check may be performed only for N motion information candidates with a large or a small index among motion information candidates included in a motion information table. In an example, a redundancy check may be performed only for motion information candidates with an index that the number and difference of motion information candidates included in a motion information table are below the threshold. When the threshold is 2, a redundancy check may be performed only for 3 motion information candidates with the largest index value among motion information candidates included in a motion information table. A redundancy check may be omitted for motion information candidates except for the above 3 motion information candidates. When a redundancy check is omitted, a motion information candidate may be added to a merge candidate list regardless of whether the same motion information as a merge candidate is exist or not.

Conversely, a redundancy check is set to be performed only for motion information candidates with an index that the number and difference of motion information candidates included in a motion information table are over the threshold.

The number of a motion information candidate that a redundancy check is performed may be redefined in an encoder and a decoder. In an example, the threshold may be an integer such as 0, 1 or 2.

Alternatively, the threshold may be determined based on at least one of the number of a merge candidate included in a merge candidate list or the number of motion information candidates included in a motion information table.

When a merge candidate identical to the first motion information candidate is found, a redundancy check with the merge candidate identical to the first motion information candidate may be omitted in a redundancy check for the second motion information candidate.

FIG. 19 is a diagram showing an example in which a redundancy check with a specific merge candidate is omitted.

When a motion information candidate HmvpCand[i] whose index is i is added to a merge candidate list, a redundancy check between the motion information candidate and pre-stored merge candidates in a merge candidate list is performed. In this connection, when a merge candidate mergeCandlist[j] identical to a motion information candidate HmvpCand[i] is found, a redundancy check between a motion information candidate HmvpCand[i−1] whose index is i−1 and merge candidates may be performed without adding the motion information candidate HmvpCand[i] to a merge candidate list. In this connection, a redundancy check between the motion information candidate HmvpCand[i−1] and the merge candidate mergeCandList[j] may be omitted.

In an example, in an example shown in FIG. 19, it was determined that HmvpCand[i] and mergeCandList[2] are identical. Accordingly, a redundancy check for HmvpCand[i−1] may be performed without adding HmvpCand[i] to a merge candidate list. In this connection, a redundancy check between HmvpCand[i−1] and mergeCandList[2] may be omitted.

When the number of a merge candidate included in the merge candidate list of a current block is less than the threshold, at least one of a pairwise merge candidate or a zero merge candidate may be additionally included except for a motion information candidate. A pairwise merge candidate means a merge candidate having a value obtained from averaging the motion vectors of more than 2 merge candidates as a motion vector and a zero merge candidate means a merge candidate whose motion vector is 0.

For the merge candidate list of a current block, a merge candidate may be added in the following order.

Spatial merge candidate—Temporal merge candidate—Motion information candidate—(Affine motion information candidate)—Pairwise merge candidate—Zero merge candidate A spatial merge candidate means a merge candidate derived from at least one of a neighboring block or a non-neighboring block and a temporal merge candidate means a merge candidate derived from a previous reference picture. An affine motion information candidate represents a motion information candidate derived from a block encoded/decoded by an affine motion model.

A motion information table may be used in a motion vector prediction mode. In an example, when the number of a motion vector prediction candidate included in the motion vector prediction candidate list of a current block is less than the threshold, a motion information candidate included in a motion information table may be set as a motion vector prediction candidate for a current block. Concretely, the motion vector of a motion information candidate may be set as a motion vector prediction candidate.

If any one of motion vector prediction candidates included in the motion vector prediction candidate list of a current block is selected, a selected candidate may be set as a motion vector predictor of a current block. Then, after the motion vector residual value of a current block is decoded, the motion vector of a current block may be obtained by adding up the motion vector predictor and the motion vector residual value.

The motion vector prediction candidate list of a current block may be configured in the following order.

Spatial motion vector prediction candidate—Temporal motion vector prediction candidate—Motion information candidate—(Affine motion information candidate)—Zero motion vector prediction candidate A spatial motion vector prediction candidate means a motion vector prediction candidate derived from at least one of a neighboring block or a non-neighboring block and a temporal motion vector prediction candidate means a motion vector prediction candidate derived from a previous reference picture. An affine motion information candidate represents a motion information candidate derived from a block encoded/decoded by an affine motion model. A zero motion vector prediction candidate represents a candidate that the value of a motion vector is 0.

A merge processing region larger than a coding block may be defined. Coding blocks included in a merge processing region may be processed in parallel without being sequentially encoded/decoded. In this connection, not being sequentially encoded/decoded means the order of encoding/decoding is not defined. Accordingly, the encoding/decoding process of blocks included in a merge processing region may be independently processed. Alternatively, blocks included in a merge processing region may share merge candidates. In this connection, the merge candidates may be derived based on a merge processing region.

According to the above-mentioned feature, a merge processing region may be referred to as a parallel processing region, a shared merge region (SMR) or a merge estimation region (MER).

A merge candidate of a current block may be derived based on a coding block. However, when a current block is included in a merge processing region larger than the current block, a candidate block included in the same merge processing region as the current block may be set to be unavailable as a merge candidate.

FIG. 20 is a diagram showing an example in which a candidate block included in the same merge processing region as a current block is set to be unavailable as a merge candidate.

In an example shown in FIG. 20(a), in the decoding/decoding of CU5, blocks including base samples adjacent to CU5 may be set as candidate blocks. In this connection, candidate blocks X3 and X4 included in the same merge processing region as CU5 may be set to be unavailable as a merge candidate of CU5. But, candidate blocks X0, X1 and X2 not included in the same merge processing region as CU5 may be set to be available as a merge candidate.

In an example shown in FIG. 20(b), in the decoding/decoding of CU8, blocks including base samples adjacent to CU8 may be set as candidate blocks. In this connection, candidate blocks X6, X7 and X8 included in the same merge processing region as CU8 may be set to be unavailable as a merge candidate. However, candidate blocks X5 and X9 not included in the same merge processing region as CU8 may be set to be available as a merge candidate.

Alternatively, when a current block is included in a merge processing region, a neighboring block adjacent to a current block and to a merge processing region may be set as a candidate block.

Figure 21:
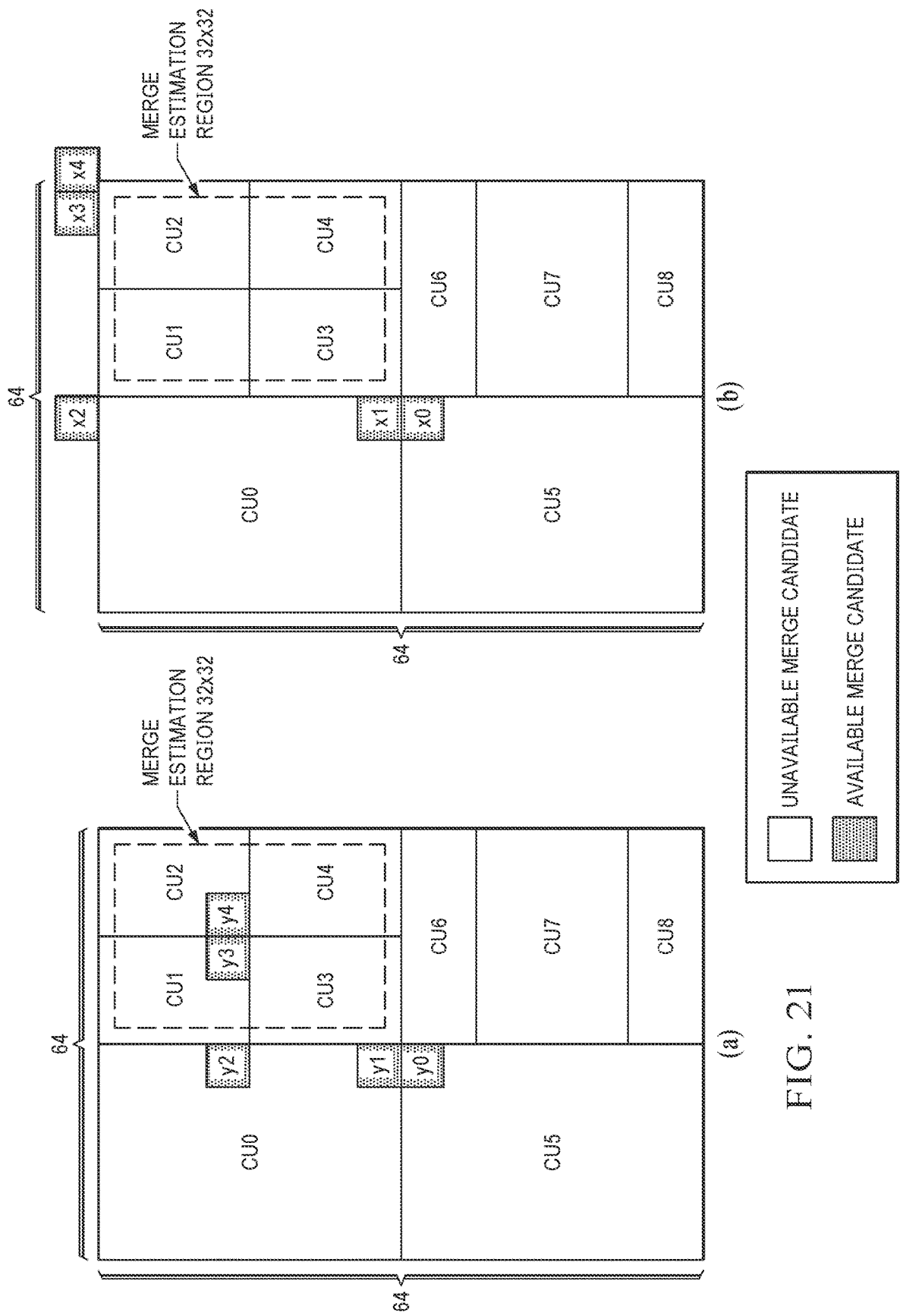
FIG. 21 is a diagram showing an example deriving a merge candidate for a current block when a current block is included in a merge processing region.
Figure 31:
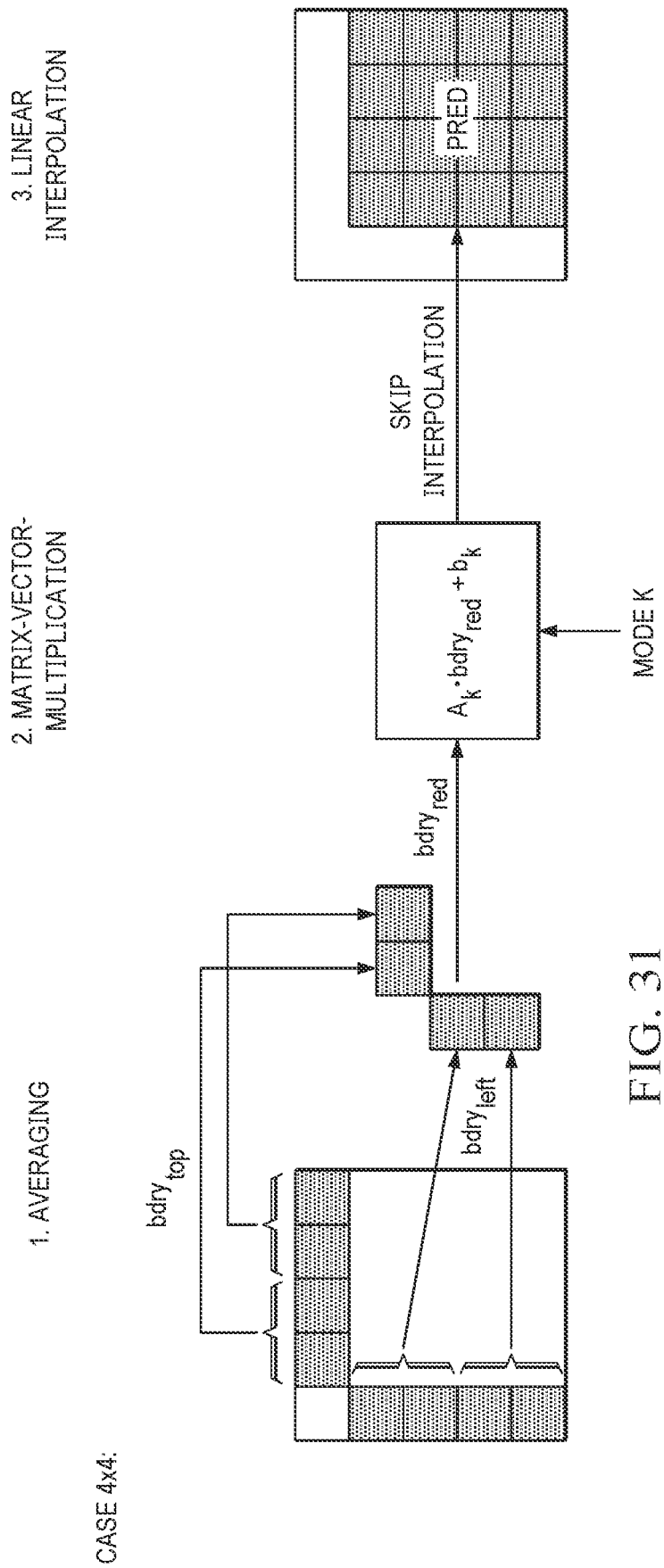
FIGS. 31 to 34 are diagrams showing an implementation aspect of matrix-based intra-prediction according to a size of a current block.
Figure 32:
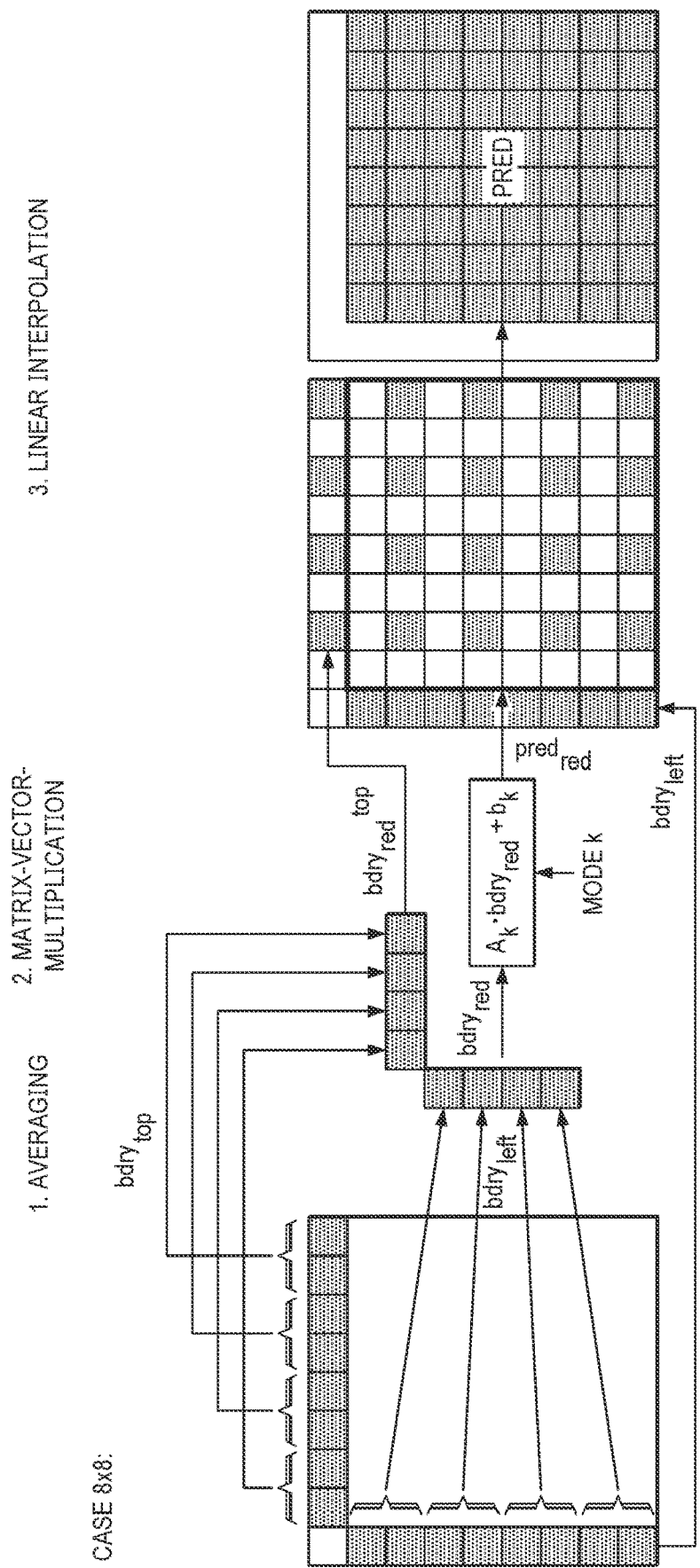
Figure 33:
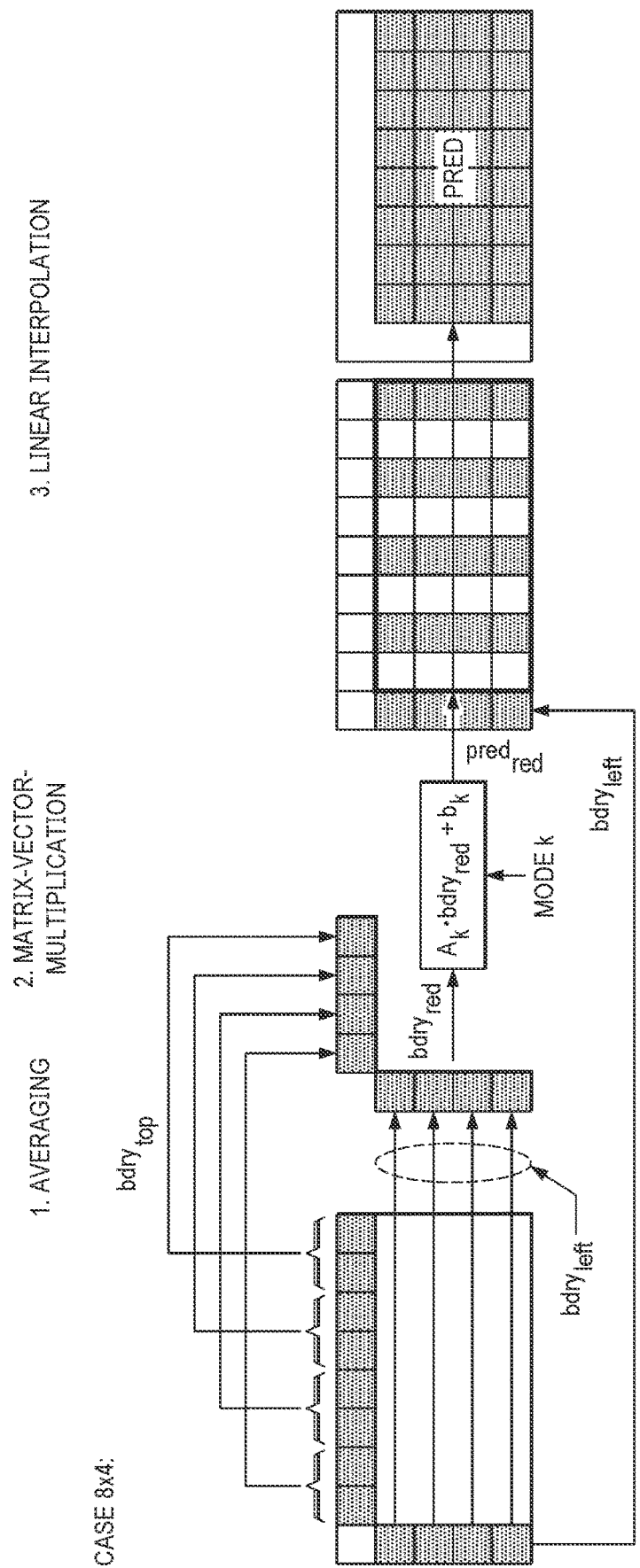
Figure 34:
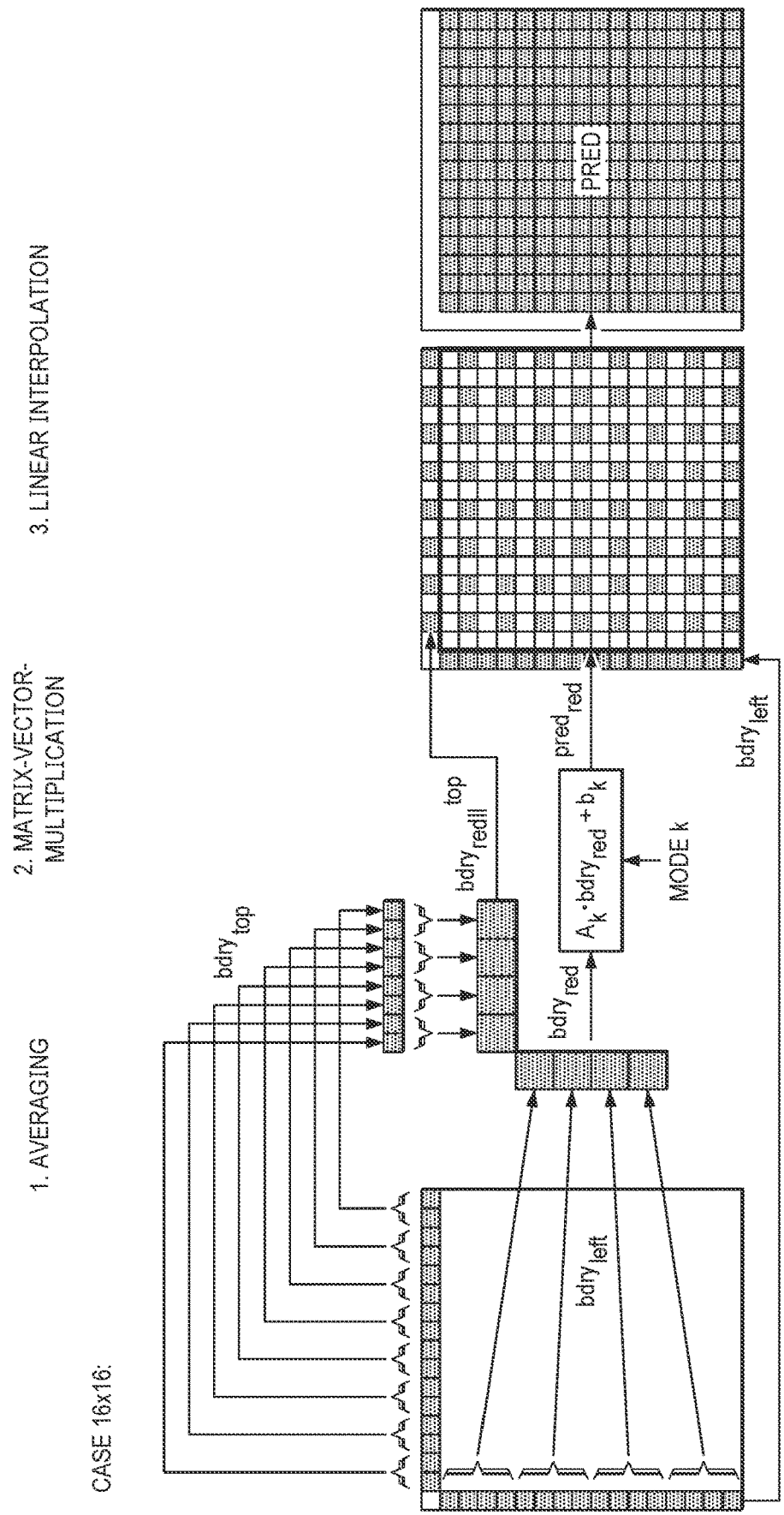

FIG. 21 is a diagram showing an example which derives a merge candidate for a current block when a current block is included in a merge processing region.

As in an example shown in FIG. 21(a), neighboring blocks adjacent to a current block may be set as candidate blocks for deriving the merge candidate of the current block. In this connection, a candidate block included in the same merge processing region as the current block may be set to be unavailable as a merge candidate. In an example, in deriving a merge candidate for a coding block CU3, a top neighboring block y3 and a right-top neighboring block y4 included in the same merge processing region as the coding block CU3 may be set to be unavailable as a merge candidate of the coding block CU3.

By scanning neighboring blocks adjacent to a current block in the predefined order, a merge candidate may be derived. In an example, the predefined order may be the order of y1, y3, y4, y0 and y2.

When the number of merge candidates which may be derived from neighboring blocks adjacent to a current block is less than a value that an offset is subtracted from the maximum number of merge candidates or the maximum number, a merge candidate for the current block may be derived by using neighboring blocks adjacent to a merge processing region like an example shown in FIG. 21(b). In an example, neighboring blocks adjacent to a merge processing region including a coding block CU3 may be set as candidate blocks for the coding block CU3. In this connection, neighboring blocks adjacent to a merge processing region may include at least one of a left neighboring block x1, a top neighboring block x3, a left-bottom neighboring block x0, a right-top neighboring block x4 or a left-top neighboring block x2.

By scanning neighboring blocks adjacent to a merge processing region in the predefined order, a merge candidate may be derived. In an example, the predefined order may be the order of x1, x3, x4, x0 and x2.

In summary, a merge candidate on the coding block CU3 including in a merge processing region may be derived by scanning candidate blocks in the following scanning order.

(y1, y3, y4, y0, y2, x1, x3, x4, x0, x2)

But, the scanning order of the above-illustrated candidate blocks only shows the example of the present disclosure and candidate blocks may be scanned in the order different from the above example. Alternatively, the scanning order may be adaptively determined based on at least one of a size or a shape of a current block or a merge processing region.

A merge processing region may be square or non-square. Information for determining a merge processing region may be signaled in a bitstream. The information may include at least one of information representing the shape of a merge processing region or information representing the size of a merge processing region. When a merge processing region is non-square, at least one of information representing the size of a merge processing region, information representing the width or height of a merge processing region or information representing a ratio between the width and height of a merge processing region may be signaled in a bitstream.

The size of a merge processing region may be determined based on at least one of information signaled in a bitstream, picture resolution, the size of a slice or the size of a tile.

If motion compensation prediction is performed for a block included in a merge processing region, a motion information candidate derived based on the motion information of a block in which motion compensation prediction is performed may be added to a motion information table.

But, if a motion information candidate derived from a block included in a merge processing region is added to a motion information table, a case may occur where a motion information candidate derived the from block is used in the encoding/decoding of other block in the merge processing region whose encoding/decoding is actually slower than the block. In other words, although dependence between blocks should be excluded in the encoding/decoding of blocks included in a merge processing region, a case may occur where motion prediction compensation is performed by using the motion information of other block included in the merge processing region. To solve such a problem, although the encoding/decoding of a block included in a merge processing region is completed, the motion information of the block whose encoding/decoding is completed may not be added to a motion information table.

Alternatively, a motion information table may be updated by using only a block at a predefined position in a merge processing region. A predefined position may include at least one of a block at a top-left position, a block at a top-right position, a block at a bottom-left position, a block at a bottom-right position, a block at a central position, a block adjacent to the right boundary or a block adjacent to the lower boundary in a merge processing region. In an example, only the motion information of a block adjacent to a bottom-right corner in a merge processing region may be updated in a motion information table and the motion information of other blocks may not be updated in a motion information table.

Alternatively, after all blocks included in a merge processing region are decoded, a motion information candidate derived from the blocks may be added to a motion information table. In other words, while blocks included in a merge processing region are encoded/decoded, a motion information table may not be updated.

In an example, if motion compensation prediction is performed for blocks included in a merge processing region, a motion information candidate derived from the blocks may be added to a motion information table in the predefined order. In this connection, the predefined order may be determined in the scanning order of coding blocks in a merge processing region or a coding tree unit. The scanning order may be at least one of raster scanning, horizontal scanning, vertical scanning or zigzag scanning. Alternatively, the predefined order may be determined based on each block's motion information or the number of blocks with the same motion information.

Alternatively, a motion information candidate including a unidirectional motion information may be added to motion information table before a motion information candidate including bidirectional motion information. On the contrary, motion information candidate including bidirectional motion information may be added to a motion information table before a motion information candidate including unidirectional motion information.

Alternatively, a motion information candidate may be added to a motion information table in the order of high frequency of use or low frequency of use in a merge processing region or a coding tree unit.

When a current block is included in a merge processing region and the number of merge candidates included in a merge candidate list of the current block is less than the maximum number, a motion information candidate included in a motion information table may be added to the merge candidate list. In this connection, a motion information candidate derived from a block included in the same merge processing region as a current block may be set not to be added to the merge candidate list of the current block.

Alternatively, when a current block is included in a merge processing region, it may be set not to use a motion information candidate included in a motion information table. In other words, although the number of merge candidates included in a merge candidate list of the current block is less than the maximum number, a motion information candidate included in a motion information table may not be added to the merge candidate list.

In another example, a motion information table on a merge processing region or a coding tree unit may be configured. This motion information table plays a role of temporarily storing the motion information of blocks included in a merge processing region. To distinguish between a general motion information table and a motion information table for a merge processing region or a coding tree unit, the motion information table for the merge processing region or the coding tree unit is referred to as a temporary motion information table. And, a motion information candidate stored in the temporary motion information table is referred to as a temporary motion information candidate.

FIG. 22 is a diagram showing a temporary motion information table.

A temporary motion information table for a coding tree unit or a merge processing region may be configured. When motion compensation prediction is performed for a current block included in a coding tree unit or a merge processing region, the motion information of the block may not be added to a motion information table HmvpCandList. Instead, a temporary motion information candidate derived from the block may be added to a temporary motion information table HmvpMERCandList. In other words, a temporary motion information candidate added to a temporary motion information table may not be added to a motion information table. Accordingly, a motion information table may not include a motion information candidate derived based on motion information of blocks included in a coding tree unit or a merge processing region including a current block.

Alternatively, only the motion information of some blocks among blocks included in a merge processing region may be added to a temporary motion information table. In an example, only blocks at a predefined position in a merge processing region may be used to update a motion information table. A predefined position may include at least one of a block at a top-left position, a block at a top-right position, a block at a bottom-left position, a block at a bottom-right position, a block at a central position, a block adjacent to the right boundary or a block adjacent to the lower boundary in a merge processing region. In an example, only the motion information of a block adjacent to a bottom-right corner in a merge processing region may be added to a temporary motion information table and the motion information of other blocks may not be added to a temporary motion information table.

The maximum number of temporary motion information candidates which may be included by a temporary motion information table may be set the same as the maximum number of motion information candidates. Alternatively, the maximum of number temporary motion information candidates which may be included by a temporary motion information table may be determined according to a size of a coding tree unit or a merge processing region. Alternatively, the maximum number of temporary motion information candidates which may be included in a temporary motion information table may be set to be smaller than the maximum number of motion information candidates which may be included in a motion information table.

A current block included in a coding tree unit or a merge processing region may be set not to use a temporary motion information table on the corresponding coding tree unit or merge processing region. In other words, when the number of merge candidates included in the merge candidate list of the current block is less than the threshold, a motion information candidate included in a motion information table may be added to the merge candidate list and a temporary motion information candidate included in a temporary motion information table may not be added to the merge candidate list. Accordingly, the motion information of other block including in the same coding tree unit or the same merge processing region as the current block may not be used for the motion compensation prediction of the current block.

If the encoding/decoding of all blocks included in a coding tree unit or a merge processing region is completed, a motion information table and a temporary motion information table may be unified.

FIG. 23 is a diagram showing an example in which a motion information table and a temporary motion information table are unified.

If the encoding/decoding of all blocks included in a coding tree unit or a merge processing region is completed, a temporary motion information candidate included in a temporary motion information table may be updated in a motion information table as in an example shown in FIG. 23.

In this temporary connection, motion information candidates included in a temporary motion information table may be added to a motion information table in the order inserted in the temporary motion information table. (In other words, in the ascending order or the descending order of the index value)

In another example, temporary motion information candidates included in a temporary motion information table may be added to a motion information table in the predefined order. In this connection, the predefined order may be determined in the scanning order of coding blocks in a merge processing region or a coding tree unit. The scanning order may be at least one of raster scanning, horizontal scanning, vertical scanning or zigzag scanning. Alternatively, the predefined order may be determined based on the motion information of each block or the number of blocks with the same motion information.

Alternatively, a temporary motion information candidate including a unidirectional motion information may be added to a motion information table before a temporary motion information candidate including a bidirectional motion information. On the contrary, a temporary motion information candidate including a bidirectional motion information may be added to a motion information table before a temporary motion information candidate including a unidirectional motion information.

Alternatively, a temporary motion information candidate may be added to a motion information table in the order of high frequency of use or low frequency of use in a merge processing region or a coding tree unit.

In case that a temporary motion information candidate included in a temporary motion information table is added to a motion information table, a redundancy check for a temporary motion information candidate may be performed. In an example, when the same motion information candidate as a temporary motion information candidate included in a temporary motion information table is prestored in a motion information table, the temporary motion information candidate may not be added to the motion information table. In this connection, a redundancy check may be performed for a part of motion information candidates included in a motion information table. In an example, a redundancy check may be performed for motion information candidates with an index over or below the threshold. In an example, when a temporary motion information candidate is equal to a motion information candidate with an index over the predefined value, the temporary motion information candidate may not be added to a motion information table.

It may limit the use of a motion information candidate derived from a block included in the same coding tree unit or the same merge processing region as a current block as the merge candidate of the current block. For it, the address information of a block may be additionally stored for a motion information candidate. The address information of a block may include at least one of the position of the block, the address of the block, the index of the block, the position of a merge processing region in which the block is included, the address of a merge processing region in which the block is included, the index of a merge processing region in which the block is included, the position of a coding tree region in which the block is included, the address of a coding tree region in which the block is included or the index of a coding tree region in which the block is included.

A coding block may be partitioned into a plurality of prediction units and prediction may be performed for each of partitioned prediction units. In this case, a prediction unit represents a base unit for performing prediction.

A coding block may be partitioned by using at least one of a vertical line, a horizontal line, an oblique line or a diagonal line. Prediction units partitioned by a partitioning line may have a shape such as a triangle, a quadrangle, a trapezoid or a pentagon. In an example, a coding block may be partitioned into two triangular prediction units, two trapezoidal prediction units, two quadrangular prediction units or one triangular prediction unit and one pentagonal prediction unit.

Information for determining at least one of the number, an angle or a position of a line partitioning a coding block may be signaled in a bitstream. In an example, information representing one of partition type candidates of a coding block may be signaled in a bitstream or information specifying one of a plurality of line candidates partitioning a coding block may be signaled in a bitstream. In an example, index information indicating one of a plurality of line candidates may be signaled in a bitstream.

For each of a plurality of line candidates, at least one of an angle or a position may be different. The number of line candidates which is available for a current block may be determined based on a size or a shape of a current block, the number of available merge candidates or whether a neighboring block at a specific position is available as a merge candidate.

Alternatively, information for determining the number or a type of line candidates may be signaled in a bitstream. In an example, whether an oblique line with an angle greater than a diagonal line and/or an oblique line with an angle smaller than a diagonal line is available as a line candidate may be determined by using a 1-bit flag. The information may be signaled at a sequence, a picture or a sequence level.

Alternatively, based on at least one of an intra prediction mode or an inter prediction mode of a coding block, a position of an available merge candidate or a partitioning type of a neighboring block, at least one of the number, an angle or a position of a line partitioning a coding block may be adaptively determined.

When a coding block is partitioned into a plurality of prediction units, intra prediction or inter prediction may be performed for each partitioned prediction unit.

FIG. 24 is a diagram showing an example in which a coding block is partitioned into a plurality of prediction units by using a diagonal line.

As in an example shown in FIGS. 24(a) and (b), a coding block may be partitioned into two triangular prediction units by using a diagonal line.

FIGS. 24(a) and (b) showed that a coding block is partitioned into two prediction units by using a diagonal line connecting two vertexes of a coding block. But, a coding block may be partitioned into two prediction units by using an oblique line that at least one end of a line does not pass a vertex of a coding block.

FIG. 25 is a diagram showing an example in which a coding block is partitioned into two prediction units.

As in an example shown in FIGS. 25(a) and (b), a coding block may be partitioned into two prediction units by using an oblique line that both ends adjoin the upper and lower boundary of a coding block, respectively.

Alternatively, as in an example shown in FIGS. 25(c) and (d), a coding block may be partitioned into two prediction units by using an oblique line that both ends adjoin the left and right boundary of a coding block, respectively.

Alternatively, a coding block may be partitioned into two prediction units with a different size. In an example, a coding block may be partitioned into two prediction units with a different size by setting an oblique line partitioning a coding block to meet two boundaries forming one vertex.

FIG. 26 shows examples in which a coding block is partitioned into a plurality of different-sized prediction blocks.

As in an example shown in FIGS. 26(a) and (b), a coding block may be partitioned into two prediction units with different size by setting a diagonal line connecting the top-left and bottom-right of a coding block to pass the left boundary, the right boundary, the upper boundary or the lower boundary instead of a top-left corner or a bottom-right corner of a coding block.

Alternatively, as in an example shown in FIGS. 26(c) and (d), a coding block may be partitioned into two prediction units with a different size by setting a diagonal line connecting the top-right and the bottom-left of a coding block to pass the left boundary, the right boundary, the upper boundary or the lower boundary instead of a top-left corner or a bottom-right corner of a coding block.

Each of prediction units generated by partitioning a coding block is referred to as 'the N-th prediction unit'. In an example, in an example shown in FIG. 24 to FIG. 26, PU1 may be defined as the first prediction unit and PU2 may be defined as the second prediction unit. The first prediction unit may mean a prediction unit which includes a sample at a bottom-left position or a sample at a top-left position in a coding block and the second prediction unit may mean a prediction unit which includes a sample at a top-right position or a sample at a bottom-right position in a coding block.

Conversely, a prediction unit which includes a sample at a top-right position or a sample at a bottom-right position in a coding block may be defined as the first prediction unit and a prediction unit which includes a sample at a bottom-left position or a sample at a top-left position in a coding block may be defined as the second prediction unit.

When a coding block is partitioned by using a horizontal line, a vertical line, a diagonal line or an oblique line, it may be referred to as prediction unit partitioning. A prediction unit generated by applying the prediction unit partitioning may be referred to as a triangular prediction unit, a quadrangular prediction unit or a pentagonal prediction unit according to its shape.

In the embodiments in below, it will be assumed that a coding block is partitioned by using a diagonal line. In particular, when a coding block is partitioned into two prediction units by using a diagonal line, it is referred to as diagonal partitioning or triangular partitioning. But, even when a coding block is partitioned by using an oblique line with an angle different from a vertical line, a horizontal line or a diagonal line, prediction units may be encoded/decoded according to the below-described embodiments. In other words, matters related to the encoding/decoding of the below-described triangular prediction unit may be also applied to the encoding/decoding of a quadrangular prediction unit or a pentagonal prediction unit.

Whether prediction unit partitioning will be applied to a coding block may be determined based on at least one of a slice type, the maximum number of merge candidates which may be included in a merge candidate list, a size of a coding block, a shape of a coding block, a prediction encoding mode of a coding block or a partitioning aspect of a parent node.

In an example, whether prediction unit partitioning will be applied to a coding block may be determined based on whether a current slice is a B type. Prediction unit partitioning may be allowed only when a current slice is a B type.

Alternatively, whether prediction unit partitioning will be applied to a coding block may be determined based on whether the maximum number of merge candidates included in a merge candidate list is equal to or greater than 2. Prediction unit partitioning may be allowed only when the maximum number of merge candidates included in a merge candidate list is equal to or greater than 2.

Alternatively, when at least one of a width or a height is greater than 64, a disadvantage may be occurred during implementation of a hardware that a 64×64-sized data processing unit is redundantly accessed. Accordingly, when at least one of a width or a height of a coding block is greater than a threshold value, it may not be allowed to partition a coding block into a plurality of prediction units. In an example, when at least one of a width or a height of a coding block is greater than 64 (e.g., when at least one of a width or a height is 128), prediction unit partitioning may not be used.

Alternatively, by considering the maximum number of samples which may be simultaneously processed by implemented hardware, prediction unit partitioning may not be allowed for a coding block that the number of samples is greater than a threshold value. In an example, prediction unit partitioning may not be allowed for a coding tree block that the number of samples is greater than 4096.

Alternatively, prediction unit partitioning may not be allowed for a coding block that the number of samples included in a coding block is smaller than a threshold value. In an example, when the number of samples included in a coding block is smaller than 64, prediction unit partitioning may be set not to be applied to a coding block.

Alternatively, whether prediction unit partitioning will be applied to a coding block may be determined based on at least one of whether a width and height ratio of a coding block is smaller than the first threshold value or whether a width and height ratio of a coding block is greater than the second threshold value. In this case, a width and height ratio of a coding block, whRatio, may be determined as a ratio of a width CbW and a height CbH of a coding block as in the following Equation 2.

$$whRatio=abs(Log_2(CbW/CbH)) \quad \text{Equation 2}$$

Alternatively, when a width and height ratio of a coding block is smaller than the first threshold value or greater than the second threshold value, prediction unit partitioning may be applied to a coding block. In an example, when the first threshold value is 4, prediction unit partitioning may not be allowed for a 64×4 or 4×64-sized coding block.

Alternatively, based on a partitioning type of a parent node, whether prediction unit partitioning is allowed may be determined. In an example, when a coding block, a parent node, is partitioned based on quad tree partitioning, prediction unit partitioning may be applied to a coding block, a leaf node. On the other hand, when a coding block, a parent node, is partitioned based on binary tree or triple tree partitioning, prediction unit partitioning may be set to be unallowable for a coding block, a leaf node.

Alternatively, based on a prediction encoding mode of a coding block, whether prediction unit partitioning is allowed may be determined. In an example, prediction unit partitioning may be allowed only when a coding block is encoded by intra prediction, when a coding block is encoded by inter prediction or when a coding block is encoded by a predefined inter prediction mode. In this case, a predefined inter prediction mode may include at least one of a merge mode, a motion vector prediction mode, an affine merge mode or an affine motion vector prediction mode.

Alternatively, based on a size of a parallel processing region, whether prediction unit partitioning is allowed may be determined. In an example, when a size of a coding block is greater than that of a parallel processing region, prediction unit partitioning may not be used.

By considering two or more of the above-enumerated conditions, whether prediction unit partitioning will be applied to a coding block may be determined.

In another example, information representing whether prediction unit partitioning will be applied to a coding block may be signaled in a bitstream. The information may be signaled at a sequence, a picture, a slice or a block level. For example, a flag, triangle_partition flag, representing whether prediction unit partitioning is applied to a coding block, may be signaled at a coding block level.

When it is determined to apply prediction unit partitioning to a coding block, information representing the number of lines partitioning a coding block or a position of a line may be signaled in a bitstream.

In an example, when a coding block is partitioned by a diagonal line, information representing a direction of a diagonal line partitioning a coding block may be signaled in a bitstream. In an example, a flag, triangle_partition_type_flag, representing a direction of a diagonal line, may be signaled in a bitstream. The flag represents whether a coding block is partitioned by a diagonal line connecting a top-left and a bottom-right or whether a coding block is partitioned by a diagonal line connecting a top-right and a bottom-left. When a coding block is partitioned by a diagonal line connecting a top-left and a bottom-right, it may be referred to as a left triangular partition type and when a coding block is partitioned by a diagonal line connecting a top-right and a bottom-left, it may be referred to as a right triangular partition type. In an example, when a value of the flag is 0, it may represent that a partition type of a coding block is a left triangular partition type and when a value of the flag is 1, it may represent that a partition type of a coding block is a right triangular partition type.

In addition, information representing whether sizes of prediction units are the same or information representing a position of a diagonal line partitioning a coding block may be signaled in a example, bitstream. In an when information representing sizes of prediction units represents that sizes of prediction units are the same, the encoding of information representing a position of a diagonal line may be omitted and a coding block may be partitioned into two prediction units by using a diagonal line which passes two vertexes of a coding block. On the other hand, when information representing sizes of prediction units represents that sizes of prediction units are not the same, a position of a diagonal line partitioning a coding block may be determined based on information representing a position of a diagonal line. In an example, when a left triangular partition type is applied to a coding block, the position information may represent whether a diagonal line meets the left boundary and the lower boundary of a coding block or whether a diagonal line meets the upper boundary and the right boundary. Alternatively, when a right triangular partition type is applied to a coding block, the position information may represent whether a diagonal line meets the right boundary and the lower boundary of a coding block or whether a diagonal line meets the upper boundary and the left boundary.

Information representing a partition type of a coding block may be signaled at a coding block level. Accordingly, a partition type may be determined per coding block to which prediction unit partitioning is applied.

In another example, information representing a partition type for a sequence, a picture, a slice, a tile or a coding tree unit may be signaled. In this case, partition types of coding blocks to which diagonal partitioning is applied in a sequence, a picture, a slice, a tile or a coding tree unit may be set the same.

Alternatively, information for determining a partition type for the first coding unit to which prediction unit partitioning is applied in a coding tree unit may be encoded and signaled, and coding units to which prediction unit partitioning is applied for the second or later may be set to use the same partition type as the first coding unit.

In another example, a partition type of a coding block may be determined based on a partition type of a neighboring block. In this case, a neighboring block may include at least one of a neighboring block adjacent to the top-left corner of a coding block, a neighboring block adjacent to the top-right corner, a neighboring block adjacent to the bottom-left corner, a neighboring block positioned at the top or a neighboring block positioned at the left. In an example, a partition type of a current block may be set the same as a partition type of a neighboring block. Alternatively, a partition type of a current block may be determined based on whether a left triangular partition type is applied to a top-left neighboring block or whether a right triangular partition type is applied to a top-right neighboring block or a bottom-left neighboring block.

To perform motion prediction compensation for the first prediction unit and the second prediction unit, the motion information of each of the first prediction unit and the second prediction unit may be derived. In this case, the motion information of the first prediction unit and the second prediction unit may be derived from merge candidates included in a merge candidate list. To distinguish between a general merge candidate list and a merge candidate list used to derive the motion information of prediction units, a merge candidate list for deriving the motion information of prediction units is referred to as a partitioning mode merge candidate list or a triangular merge candidate list. In addition, a merge candidate included in a partitioning mode merge candidate list is referred to as a partitioning mode merge candidate or a triangular merge candidate. But, applying the above-described method of deriving a merge candidate and the above-described method of constituting a merge candidate list to derive a partitioning mode merge candidate and to constitute a partitioning mode merge candidate list is also included in a scope of the preset disclosure.

Information for determining the maximum number of partitioning mode merge candidates which may be included in a partitioning mode merge candidate list may be signaled in a bitstream. The information may represent a difference between the maximum number of merge candidates which may be included in a merge candidate list and the maximum number of partitioning mode merge candidates which may be included in a partitioning mode merge candidate list.

A partitioning mode merge candidate may be derived from a spatial neighboring block and a temporal neighboring block of a coding block.

FIG. 27 is a diagram showing neighboring blocks used to derive a partitioning mode merge candidate.

A partitioning mode merge candidate may be derived by using at least one of a neighboring block positioned at the top of a coding block, a neighboring block positioned at the left of a coding block or a collocated block included in a picture different from a coding block. A top neighboring block may include at least one of a block including a sample (xCb+CbW-1, yCb-1) positioned at the top of a coding block, a block including a sample (xCb+CbW, yCb-1) positioned at the top of a coding block or a block including a sample (xCb-1, yCb-1) positioned at the top of a coding block. A left neighboring block may include at least one of a block including a sample (xCb-1, yCb+CbH-1) positioned at the left of a coding block or a block including a sample (xCb-1, yCb+CbH) positioned at the left of a coding block. A collocated block may be determined as one of a block including a sample (xCb+CbW, yCb+CbH) adjacent to the top-right corner of a coding block or a block including a sample (xCb/2, yCb/2) positioned at the center of a coding block in a collocated picture.

Neighboring blocks may be searched in a predefined order, and a partitioning mode merge candidate list may be configured with partitioning mode merge candidates according to the predefined order. In an example, a partitioning mode merge candidate may be searched in the order of B1, A1, B0, A0, C0, B2 and C1 to configure a partitioning mode merge candidate list.

The motion information of prediction units may be derived based on the partitioning mode merge candidate list. In other words, prediction units may share a single partitioning mode merge candidate list.

To derive the motion information of a prediction unit, information for specifying at least one of partitioning mode merge candidates included in a partitioning mode merge candidate list may be signaled in a bitstream. In an example, index information, merge_triangle_idx, for specifying at least one of partitioning mode merge candidates may be signaled in a bitstream.

Index information may specify a combination of a merge candidate of the first prediction unit and a merge candidate of the second prediction unit. In an example, the following table 1 is an example representing a combination of merge candidates according to index information, merge_triangle_idx.

TABLE 1

| | merge_triangle_idx | | | | | | | | |
|---|---|---|---|---|---|---|---|---|---|
| | 0 | 1 | 2 | 3 | 4 | 5 | 6 | 7 | 8 |
| First Prediction Unit | 1 | 0 | 0 | 0 | 2 | 0 | 0 | 1 | 3 |
| Second Prediction Unit | 0 | 1 | 2 | 1 | 0 | 3 | 4 | 0 | 0 |

| | merge_triangle_idx | | | | | | | | |
|---|---|---|---|---|---|---|---|---|---|
| | 9 | 10 | 11 | 12 | 13 | 14 | 15 | 16 | 17 |
| First Prediction Unit | 4 | 0 | 1 | 1 | 0 | 0 | 1 | 1 | 1 |
| Second Prediction Unit | 0 | 2 | 2 | 2 | 4 | 3 | 3 | 4 | 4 |

| | merge_triangle_idx | | | | | | | | |
|---|---|---|---|---|---|---|---|---|---|
| | 18 | 19 | 20 | 21 | 22 | 23 | 24 | 25 | 26 |
| First Prediction Unit | 1 | 2 | 2 | 2 | 4 | 3 | 3 | 3 | 4 |
| Second Prediction Unit | 3 | 1 | 0 | 1 | 3 | 0 | 2 | 4 | 0 |

| | merge_triangle_idx | | | | | | | | |
|---|---|---|---|---|---|---|---|---|---|
| | 27 | 28 | 29 | 30 | 31 | 32 | 33 | 34 | 35 |
| First Prediction Unit | 3 | 2 | 4 | 4 | 2 | 4 | 3 | 4 | 3 |
| Second Prediction Unit | 1 | 3 | 1 | 1 | 3 | 2 | 2 | 3 | 1 |

| | merge_triangle_idx | | | |
|---|---|---|---|---|
| | 36 | 37 | 38 | 39 |
| First Prediction Unit | 2 | 2 | 4 | 3 |
| Second Prediction Unit | 4 | 4 | 2 | 4 |

When a value of index information, merge_triangle_idx, is 1, it represents that the motion information of the first prediction unit is derived from a merge candidate whose index is 1 and the motion information of the second prediction unit is derived from a merge candidate whose index is 0. A partitioning mode merge candidate for deriving the motion information of the first prediction unit and a partitioning mode merge candidate for deriving the motion information of the second prediction unit may be determined by index information, merge_triangle_idx. It is also possible to determine based on the index information a partition type of a coding block to which diagonal partitioning is applied. In other words, index information may specify a combination of a merge candidate of the first prediction unit, a merge candidate of the second prediction unit and a partitioning direction of a coding block. When a partition type of a coding block is determined by index information, information, triangle_partition_type_flag, representing a direction of a diagonal line partitioning a coding block may not be encoded. Table 2 represents a partition type of a coding block for index information, merge_triangle_idx.

TABLE 2

| | merge_triangle_idx | | | | | | | | |
|---|---|---|---|---|---|---|---|---|---|
| | 0 | 1 | 2 | 3 | 4 | 5 | 6 | 7 | 8 |
| TriangleDir | 0 | 1 | 1 | 0 | 0 | 1 | 1 | 1 | 0 |

TABLE 2-continued

| | merge_triangle_idx | | | | | | | | |
|---|---|---|---|---|---|---|---|---|---|
| | 9 | 10 | 11 | 12 | 13 | 14 | 15 | 16 | 17 |
| TriangleDir | 0 | 0 | 0 | 1 | 0 | 0 | 0 | 0 | 1 |

| | merge_triangle_idx | | | | | | | | |
|---|---|---|---|---|---|---|---|---|---|
| | 18 | 19 | 20 | 21 | 22 | 23 | 24 | 25 | 26 |
| TriangleDir | 1 | 1 | 1 | 0 | 0 | 1 | 1 | 1 | 1 |

| | merge_triangle_idx | | | | | | | | |
|---|---|---|---|---|---|---|---|---|---|
| | 27 | 28 | 29 | 30 | 31 | 32 | 33 | 34 | 35 |
| TriangleDir | 1 | 1 | 1 | 0 | 0 | 1 | 0 | 1 | 0 |

| | merge_triangle_idx | | | |
|---|---|---|---|---|
| | 36 | 37 | 38 | 39 |
| TriangleDir | 0 | 1 | 0 | 0 |

When a variable, TriangleDir, is 0, it represents that a left triangular partition type is applied to a coding block and when a variable, TriangleDir, is 1, it represents that a right triangular partition type is applied to a coding block. By combining Table 1 and Table 2, index information, merge_triangle_idx, may be set to specify a combination of a merge candidate of the first prediction unit, a merge candidate of the second prediction unit and a partitioning direction of a coding block. In another example, index information only for one of the first prediction unit and the second prediction unit may be signaled and an index of a merge candidate for the other of the first prediction unit and the second prediction unit may be determined based on the index information. In an example, a merge candidate of the first prediction unit may be determined based on index information, merge_triangle_idx, representing an index of one of partitioning mode merge candidates. And, a merge candidate of the second prediction unit may be specified based on the merge_triangle_idx. In an example, a merge candidate of the second prediction unit may be derived by adding or subtracting an offset to or from the index information, merge_triangle_idx. An offset may be an integer such as 1 or 2. In an example, a merge candidate of the second prediction unit may be determined as a partitioning mode merge candidate having a value obtained by adding 1 to merge_triangle_idx as an index. When merge_triangle_idx indicates a partitioning mode merge candidate with the largest index value among partitioning mode merge candidates, the motion information of the second prediction unit may be derived from a partitioning mode merge candidate whose index is 0 or a partitioning mode merge candidate having a value subtracting 1 from merge_triangle_idx as an index.

Alternatively, the motion information of the second prediction unit may be derived from a partitioning mode merge candidate with the same reference picture as a partitioning mode merge candidate of the first prediction unit specified by index information. In this case, a partitioning mode merge candidate with the same reference picture as a partitioning mode merge candidate of the first prediction unit may represent a partitioning mode merge candidate that at least one of a L0 reference picture or a L1 reference picture is the same as partitioning mode merge candidate of the first prediction unit. When there are a plurality of partitioning mode merge candidates with the same reference picture as a partitioning mode merge candidate of the first prediction unit, any one may be selected based on at least one of whether a merge candidate includes bi-directional motion information or a difference value between an index of a merge candidate and index information.

In another example, index information may be signaled for each of the first prediction unit and the second prediction unit. In example, an the first index information, 1st_merge_idx, for determining a partitioning mode merge candidate of the first prediction unit, and the second index information, 2nd_merge_idx, for determining a partitioning mode merge candidate of the second prediction unit, may be signaled in a bitstream. The motion information of the first prediction unit may be derived from a partitioning mode merge candidate determined based on the first index information, 1st_merge_idx, and the motion information of the second prediction unit may be derived from a partitioning mode merge candidate determined based on the second index information, 2nd_merge_idx.

The first index information, 1st_merge_idx, may represent an index of one of partitioning mode merge candidates included in a partitioning mode merge candidate list. A partitioning mode merge candidate of the first prediction unit may be determined as a partitioning mode merge candidate indicated by the first index information, 1st_merge_idx.

A partitioning mode merge candidate indicated by the first index information, 1st_merge_idx, may be set to be unavailable as a partitioning mode merge candidate of the second prediction unit. Accordingly, the second index information of the second prediction unit, 2nd_merge_idx, may represent an index of any one of remaining partitioning mode merge candidates except for a partitioning mode merge candidate indicated by the first index information. When a value of the second index information, 2nd_merge_idx, is smaller than that of the first index information, 1st_merge_idx, a partitioning mode merge candidate of the second prediction unit may be determined as a partitioning mode merge candidate having index information represented by the second index information, 2nd_merge_idx. On the other hand, when a value of the second index information, 2nd_merge_idx, is the same as or greater than that of the first index information, 1st_merge_idx, a partitioning mode merge candidate of the second prediction unit may be determined as a partitioning mode merge candidate having a value obtained by adding 1 to a value of the second index information, 2nd_merge_idx, as an index.

Alternatively, according to the number of partitioning mode merge candidates included in a partitioning mode merge candidate list, whether the second index information is signaled or not may be determined. In an example, when the maximum number of partitioning mode merge candidates which may be included in a partitioning mode merge candidate list does not exceed 2, the signaling of the second index information may be omitted. When the signaling of the second index information is omitted, the second partitioning mode merge candidate may be derived by adding or subtracting an offset to or from the first index information. In an example, when the maximum number of partitioning mode merge candidates which may be included in a partitioning mode merge candidate list is 2 and the first index information indicates an index of 0, the second partitioning mode merge candidate may be derived by adding 1 to the first index information. Alternatively, when the maximum number of partitioning mode merge candidates which may be included in a partitioning mode merge candidate list is 2 and the first index information indicates 1, the second partitioning mode merge candidate may be derived by subtracting 1 from the first index information.

Alternatively, when the signaling of the second index information is omitted, the second index information may be inferred as a default value. In this case, a default value may be 0. The second partitioning mode merge candidate may be derived by comparing the first index information with the second index information. In an example, when the second index information is smaller than the first index information, a merge candidate whose index is 0 may be set as the second partitioning mode merge candidate and when the second index information is the same as or greater than the first index information, a merge candidate whose index is 1 may be set as the second partitioning mode merge candidate.

When a partitioning mode merge candidate has unidirectional motion information, the unidirectional motion information of a partitioning mode merge candidate may be set as the motion information of a prediction unit. On the other hand, when a partitioning mode merge candidate has bidirectional motion information, only one of L0 motion information or L1 motion information may be set as the motion information of a prediction unit. Which of L0 motion information or L1 motion information will be taken may be determined based on an index of a partitioning mode merge candidate or the motion information of the other prediction unit.

In an example, when an index of a partitioning mode merge candidate is an even number, the L0 motion information of a prediction unit may be set to be 0 and the L1 motion information of a partitioning mode merge candidate may be set as the L1 motion information of a prediction unit. On the other hand, when an index of a partitioning mode merge candidate is an odd number, the L1 motion information of a prediction unit may be set to be 0 and the L0 motion information of a partitioning mode merge candidate may be set to be 0. Conversely, when an index of a partitioning mode merge candidate is an even number, the L0 motion information of a partitioning mode merge candidate may be set as the L0 motion information of a prediction unit and when an index of partitioning mode merge candidate is an odd number, the L1 motion information of a partitioning mode merge candidate may be set as the L1 motion information of a prediction unit. Alternatively, for a first prediction unit, the L0 motion information of a partitioning mode merge candidate may be set as the L0 motion information of the first prediction unit when a partitioning mode merge candidate for the first prediction unit is an even number, but, for a second prediction unit, the L1 motion information of a partitioning mode merge candidate may be set as the L1 motion information of the second prediction unit when a partitioning mode merge candidate for the second prediction unit is an odd number.

Alternatively, when the first prediction unit has L0 motion information, the L0 motion information of the second prediction unit may be set to be 0 and the L1 motion information of a partitioning mode merge candidate may be set as the L1 information of the second prediction unit. On the other hand, when the first prediction unit has L1 motion information, the L1 motion information of the second prediction unit may be set to be 0 and the L0 motion information of a partitioning mode merge candidate may be set as the L0 motion information of the second prediction unit.

A partitioning mode merge candidate list for deriving the motion information of the first prediction unit may be set to be different from a partitioning mode merge candidate list for deriving the motion information of the second prediction unit.

In an example, when a partitioning mode merge candidate for deriving the motion information of the first prediction unit in a partitioning mode merge candidate list is specified based on index information for the first prediction unit, the motion information of the second prediction unit may be derived by using a partitioning mode merge list including remaining partitioning mode merge candidates except for the partitioning mode merge candidate indicated by the index information. Concretely, the motion information of the second prediction unit may be derived from one of remaining partitioning mode merge candidates.

Accordingly, the maximum number of partitioning mode merge candidates included in a partitioning mode merge candidate list of the first prediction unit may be different from the maximum number of partitioning mode merge candidates included in a partitioning mode merge candidate list of the second prediction unit. In an example, when a partitioning mode merge candidate list of the first prediction unit includes M merge candidates, a partitioning mode merge candidate list of the second prediction unit may include M−1 merge candidates except for the partitioning mode merge candidate indicated by the index information of the first prediction unit.

In another example, the availability of a neighboring block may be determined by deriving a merge candidate of each prediction unit based on neighboring blocks adjacent to a coding block, but by considering a shape or a position of a prediction unit.

FIG. 28 is a diagram for explaining an example in which the availability of a neighboring block is determined per prediction unit.

A neighboring block which is not adjacent to the first prediction unit may be set to be unavailable for the first prediction unit and a neighboring block which is not adjacent to the second prediction unit may be set to be unavailable for the second prediction unit.

In an example, as in an example shown in FIG. 28(a), when a left triangular partition type is applied to a coding block, blocks A1, A0 and A2 adjacent to the first prediction unit among neighboring blocks adjacent to a coding block may be determined to be available for the first prediction unit, but blocks B0 and B1 may be determined to be unavailable for the first prediction unit. Accordingly, a partitioning mode merge candidate list for the first prediction unit may include partitioning mode merge candidates derived from blocks A1, A0 and A2, but it may not include partitioning mode merge candidates derived from blocks B0 and B1.

As in an example shown in FIG. 28(b), when a left triangular partition type is applied to a coding block, blocks B0 and B1 adjacent to the second prediction unit may be determined to be available for the second prediction unit, but blocks A1, A0 and A2 may be determined to be unavailable for the second prediction unit. Accordingly, a partitioning mode merge candidate list for the second prediction unit may include partitioning mode merge candidates derived from blocks B0 and B1, but it may not include partitioning mode merge candidates derived from blocks A1, A0 and A2.

Accordingly, the number of partitioning mode merge candidates which may be used by a prediction unit or a range of partitioning mode merge candidates may be determined based on at least one of a position of a prediction unit or a partition type of a coding block.

In another example, a merge mode may be applied to only one of the first prediction unit and the second prediction unit. And, the motion information of the other of the first prediction unit and the second prediction unit may be set the same as the motion information of a prediction unit to which the merge mode is applied or may be derived by refining the motion information of a prediction unit to which the merge mode is applied.

In an example, a motion vector and a reference picture index of the first prediction unit may be derived based on a partitioning mode merge candidate, and a motion vector of the second prediction unit may be derived by refining a motion vector of the first prediction unit. In an example, a motion vector of the second prediction unit may be derived by adding or subtracting a refine motion vector {Rx, Ry} to or from a motion vector of the first prediction unit, {mvD1LXx, mvD1LXy}. A reference picture index of the second prediction unit may be set the same as a reference picture index of the first prediction unit.

Information for determining a refine motion vector representing a difference between a motion vector of the first prediction unit and a motion vector of the second prediction unit may be signaled in a bitstream. The information may include at least one of information representing a size of a refine motion vector or information representing a sign of a refine motion vector.

Alternatively, a sign of a refine motion vector may be derived based on at least one of a position or an index of a prediction unit or a partition type which is applied to a coding block.

In another example, a motion vector and a reference picture index of one of the first prediction unit and the second prediction unit may be signaled. A motion vector of the other of the first prediction unit and the second prediction unit may be derived by refining the signaled motion vector.

In an example, based on information signaled in a bitstream, a motion vector and a reference picture index of the first prediction unit may be determined. And, a motion vector of the second prediction unit may be derived by refining a motion vector of the first prediction unit. In an example, a motion vector of the second prediction unit may be derived by adding or subtracting a refine motion vector {Rx, Ry} to or from a motion vector of the first prediction unit, {mvD1LXx, mvD1LXy}. A reference picture index of the second prediction unit may be set the same as a reference picture index of the first prediction unit.

In another example, a merge mode may be applied to only one of the first prediction unit and the second prediction unit. And, the motion information of the other of the first prediction unit and the second prediction unit may be derived based on the motion information of a prediction unit to which the merge mode is applied. In an example, a symmetric motion vector of a motion vector of the first prediction unit may be set as a motion vector of the second prediction unit. In this case, a symmetric motion vector may mean a motion vector which has the same magnitude as a motion vector of the first prediction unit, but has at least one opposite sign of an x-axis or a y-axis component, or a motion vector which has the same magnitude as a scaled vector obtained by scaling a motion vector of the first prediction unit, but has at least one opposite sign of an x-axis or a y-axis component. In an example, when a motion vector of the first prediction unit is (MVX, MVy), a motion vector of the second prediction unit may be set to be (MVx, −MVy), (−MVx, MVy) or (−MVx, −MVy) which is a symmetric motion vector of the motion vector.

A reference picture index of a prediction unit to which a merge mode is not applied among the first prediction unit and the second prediction unit may be set the same as a reference picture index of a prediction unit to which a merge mode is applied. Alternatively, a reference picture index of a prediction unit to which a merge mode is not applied may be set as a predefined value. In this case, a predefined value may be the smallest index or the largest index in a reference picture list. Alternatively, information specifying a reference picture index of a prediction unit to which a merge mode is not applied may be signaled in a bitstream. Alternatively, a reference picture of a prediction unit to which a merge mode is not applied may be selected from a reference picture list different from a reference picture list to which a reference picture of a prediction unit to which a merge mode is applied belongs. In an example, when a reference picture of a prediction unit to which a merge mode is applied is selected from an L0 reference picture list, a reference picture of a prediction unit to which a merge mode is not applied may be selected from an L1 reference picture list. In this case, a reference picture of a prediction unit to which a merge mode is not applied may be derived based on a picture order count (POC) difference between a reference picture of a prediction unit to which a merge mode is applied and a current picture. In an example, when a reference picture of a prediction unit to which a merge mode is applied is selected from a L0 reference picture list, a reference picture that a difference value with a current picture in a L1 reference picture list is the same as or similar to a difference value between a reference picture of a prediction unit to which a merge mode is applied and a current picture may be selected as a reference picture of a prediction unit to which a merge mode is not applied.

When a picture order count difference value between a reference picture of the first prediction unit and a current picture is different from a picture order count difference value between a reference picture of the second prediction unit and a current picture, a symmetric motion vector of a scaled motion vector of a prediction unit to which a merge mode is applied may be set as a motion vector of a prediction unit to which a merge mode is not applied. In this case, scaling may be performed based on a picture order count difference value between each reference picture and a current picture.

In another example, after deriving a motion vector of each of the first prediction unit and the second prediction unit, a refine vector may be added to or subtracted from a derived motion vector. In an example, a motion vector of the first prediction unit may be derived by adding or subtracting the first refine vector to or from the first motion vector derived based on the first merge candidate and a motion vector of the second prediction unit may be derived by adding or subtracting the second refine vector to or from the second motion vector derived based on the second merge candidate. Information for determining at least one of the first refine vector or the second refine vector may be signaled in a bitstream. The information may include at least one of information for determining a magnitude of a refine vector or information for determining a sign of a refine vector.

The second refine vector may be a symmetric motion vector of the first refine vector. In this case, information for determining a refine vector may be signaled only for one of the first refine vector and the second refine vector. In an example, when the first refine vector is determined to be (MVDx, MVDy) by information signaled in a bitstream, (−MVDx, MVDy), (MVDx, −MVDy) or (−MVDx, −MVDy) which is a symmetric motion vector of the first refine vector may be set as the second refine vector. According to the picture order count of a reference picture of each prediction unit, a symmetric motion vector of a scaled motion vector obtained by scaling the first refine vector may be set as the second refine vector.

In another example, information of one of the first prediction unit and the second prediction unit may be derived based on a merge candidate and the motion information of the other may be determined based on information signaled in a bitstream. In an example, a merge index may be signaled for the first prediction unit and at least one of information for determining a motion vector and information for determining a reference picture may be signaled for the second prediction unit. The motion information of the first prediction unit may be set the same as the motion information of a merge candidate specified by a merge index. The motion information of the second prediction unit may be specified by at least one of information for determining a motion vector signaled in a bitstream and information for determining a reference picture.

A motion prediction compensation prediction for each coding block may be performed based on the motion information of the first prediction unit and the motion information of the second prediction unit. In this case, quality degradation may be generated on the boundary of the first prediction unit and the second prediction unit. In an example, quality continuity may deteriorate around an edge on the boundary of the first prediction unit and the second prediction unit. To reduce quality degradation on the boundary, a prediction sample may be derived by a smoothing filter or a weighted prediction.

A prediction sample in a coding block to which diagonal partitioning is applied may be derived based on a weighted sum operation of the first prediction sample obtained based on the motion information of the first prediction unit and the second prediction sample obtained based on the motion information of the second prediction unit. Alternatively, a prediction sample of the first prediction unit may be derived from the first prediction block determined based on the motion information of the first prediction unit and a prediction sample of the second prediction unit may be derived from the second prediction block determined based on the motion information of the second prediction unit, but a prediction sample on the boundary region of the first prediction unit and the second prediction unit may be derived based on a weighted sum operation of the first prediction sample included in the prediction block and the second prediction sample included in the second prediction block. In an example, the following Equation 3 represents an example of deriving a prediction sample of the first prediction unit and the second prediction unit.

$$P(x,y)=w1*P1(xy)+(1-w1)*P2(x,y) \quad \text{Equation 3}$$

In the Equation 3, P1 represents the first prediction sample and P2 represents the second prediction sample. w1 represents a weight which is applied to the first prediction sample and (1−w1) represents a weight which is applied to the second prediction sample. As in an example shown in Equation 3, a weight which is applied to the second prediction sample may be derived by subtracting a weight which is applied to the first prediction sample from a constant value.

When a left triangular partition type is applied to a coding block, a boundary region may include prediction samples with the same x-axis coordinate and y-axis coordinate. On the other hand, when a right triangular partition type is applied to a coding block, a boundary region may include prediction samples that a sum of an x-axis coordinate and a y-axis coordinate is equal to or greater than the first threshold value and is equal to or less than the second threshold value.

A size of a boundary region may be determined based on at least one of a size of a coding block, a shape of a coding block, the motion information of prediction units, a motion vector difference value of prediction units, a picture order count of a reference picture or a difference value between the first prediction sample and the second prediction sample on a diagonal boundary.

FIGS. 29 and 30 are diagrams showing an example in which a prediction sample is derived based on a weighted sum operation of the first prediction sample and the second prediction sample. FIG. 29 illustrates a case in which a left triangular partition type is applied to a coding block and FIG. 30 illustrates a case in which a right triangular partition type is applied to a coding block. In addition, FIG. 29(a) and FIG. 30(a) are diagrams representing a prediction aspect for a luma component and FIG. 29(b) and the FIG. 30(b) are diagrams representing a prediction aspect for a chroma component.

In shown diagrams, a number marked on a prediction sample around the boundary of the first prediction unit and the second prediction unit represents a weight which is applied to the first prediction sample. In an example, when a number marked on a prediction sample is N, the prediction sample may be derived by applying a weight of N/8 to the first prediction sample and applying a weight of (1−(N/8)) to the second prediction sample.

In a non-boundary region, the first prediction sample or the second prediction sample may be determined as a prediction sample. Looking at an example in FIG. 29, the first prediction sample derived based on the motion information of the first prediction unit may be determined as a prediction sample in a region belonging to the first prediction unit. On the other hand, the second prediction sample derived based on the motion information of the second prediction unit may be determined as a prediction sample in a region belonging to the second prediction unit.

Looking at an example in FIG. 30, the first prediction sample derived based on the motion information of the first prediction unit may be determined as a prediction sample in a region where a sum of an x-axis coordinate and a y-axis coordinate is smaller than the first threshold value. On the other hand, the second prediction sample derived based on the motion information of the second prediction unit may be determined as a prediction sample in a region where a sum of an x-axis coordinate and a y-axis coordinate is greater than the second threshold value.

A threshold value determining a non-boundary region may be determined based on at least one of a size of a coding block, a shape of a coding block or a color component. In an example, when a threshold value for a luma component is set to be N, a threshold value for a chroma component may be set to be N/2.

Prediction samples included in a boundary region may be derived based on a weighted sum operation of the first prediction sample and the second prediction sample. In this case, weights applied to the first prediction sample and the second prediction sample may be determined based on at least one of a position of a prediction sample, a size of a coding block, a shape of a coding block or a color component.

In an example, as in an example shown in FIG. 29(a), prediction samples with the same x-axis coordinate and y-axis coordinate may be derived by applying the same weight to the first prediction sample and the second prediction sample. Prediction samples that an absolute value of a difference between an x-axis coordinate and a y-axis coordinate is 1 may be derived by setting a weight ratio applied to the first prediction sample and the second prediction sample as (3:1) or (1:3). In addition, prediction samples that an absolute value of a difference between an x-axis coordinate and a y-axis coordinate is 2 may be derived by setting a weight ratio applied to the first prediction sample and the second prediction sample as (7:1) or (1:7).

Alternatively, as in an example shown in FIG. 29(b), prediction samples with the same x-axis coordinate and y-axis coordinate may be derived by applying the same weight to the first prediction sample and the second prediction sample and prediction samples that an absolute value of a difference between an x-axis coordinate and a y-axis coordinate is 1 may be derived by setting a weight ratio applied to the first prediction sample and the second prediction sample as (7:1) or (1:7).

In an example, as in an example shown in FIG. 30(a), prediction samples that a sum of an x-axis coordinate and a y-axis coordinate is smaller than a width or a height of a coding block by 1 may be derived by applying the sample weight to the first prediction sample and the second prediction sample. Prediction samples that a sum of an x-axis coordinate and a y-axis coordinate is the same as or smaller than a width or a height of a coding block by 2 may be derived by setting a weight ratio applied to the first prediction sample and the second prediction sample as (3:1) or (1:3). Prediction samples that a sum of an x-axis coordinate and a y-axis coordinate is greater than a width or a height of a coding block by 1 or smaller than a width or a height of a coding block by 3 may be derived by setting a weight ratio applied to the first prediction sample and the second prediction sample as (7:1) or (1:7).

Alternatively, as in an example shown in FIG. 30(b), prediction samples that a sum of an x-axis coordinate and a y-axis coordinate is smaller than a width or a height of a coding block by 1 may be derived by applying the sample weight to the first prediction sample and the second prediction sample. Prediction samples that a sum of an x-axis coordinate and a y-axis coordinate is the same as or smaller than a width or a height of a coding block by 2 may be derived by setting a weight ratio applied to the first prediction sample and the second prediction sample as (7:1) or (1:7).

In another example, a weight may be determined by considering a position of a prediction sample or a shape of a coding block. Equation 4 to Equation 6 represent an example in which a weight is derived when a left triangular partition type is applied to a coding block. Equation 4 represents an example of deriving a weight applied to the first prediction sample when a coding block is square.

$$w1=(x-y+4)/8 \qquad \text{Equation 4}$$

In Equation 4, x and y represent a position of a prediction sample. When a coding block is non-square, a weight applied to the first prediction sample may be derived as in the following Equation 5 or Equation 6. Equation 5 represents a case in which a width of a coding block is greater than a height and Equation 6 represents a case in which a width of a coding block is smaller than a height.

$$w1=((x/\text{whRatio})-y+4)/8 \qquad \text{Equation 5}$$

$$w1=(x-(x*\text{whRatio})+4)/8 \qquad \text{Equation 6}$$

When a right triangular partition type is applied to a coding block, a weight applied to the first prediction sample may be determined as in Equation 7 to Equation 9. Equation 7 represents an example of deriving a weight applied to the first prediction sample when a coding block is square.

$$w1=(ChW-1-x-y+4)/8 \qquad \text{Equation 7}$$

In Equation 7, CbW represents a width of a coding block. When a coding block is non-square, a weight applied to the first prediction sample may be derived as in the following Equation 8 or Equation 9. Equation 8 represents a case in which a width of a coding block is greater than a height and Equation 9 represents a case in which a width of a coding block is smaller than a height.

$$w1=(CbH-1-(x/\text{whRatio})-y+4)/8 \qquad \text{Equation 8}$$

$$w1=(CbW-1-x-(y*\text{whRatio})+4)/8 \qquad \text{Equation 9}$$

In Equation 8, CbH represents a height of a coding block.

As in a shown example, prediction samples included in the first prediction unit among prediction samples in a boundary region may be derived by giving a larger weight to the first prediction sample than the second prediction sample and prediction samples included in the second prediction unit among prediction samples in the boundary region may be derived by giving a larger weight to the second prediction sample than the first prediction sample.

When diagonal partitioning is applied to a coding block, a combined prediction mode that an intra prediction mode and a merge mode are combined may be set not to be applied to a coding block.

When encoding/decoding of a coding block is completed, the motion information of a coding block that encoding/decoding is completed may be stored for the encoding/decoding of a subsequent coding block. Motion information may be stored in a unit of a sub-block with a preset size. In an example, a sub-block with a preset size may have a 4×4 size. Alternatively, according to a size or a shape of a coding block, a size or a shape of a sub-block may be differently determined.

When a sub-block belongs to the first prediction unit, the motion information of the first prediction unit may be stored as the motion information of a sub-block. On the other hand, when a sub-block belongs to the second prediction unit, the motion information of the second prediction unit may be stored as the motion information of a sub-block.

When a sub-block is on the boundary of the first prediction unit and the second prediction unit, any one of the motion information of the first prediction unit and the motion information of the second prediction unit may be set as the motion information of a sub-block. In an example, the motion information of the first prediction unit may be set as the motion information of a sub-block or the motion information of the second prediction unit may be set as the motion information of a sub-block.

In another example, when a sub-block is on the boundary of the first prediction unit and the second prediction unit, any one of L0 motion information and L1 motion information of a sub-block may be derived from the first prediction unit and the other of L0 motion information and L1 motion information of a sub-block may be derived from the second prediction unit. In an example, the L0 motion information of the first prediction unit may be set as the L0 motion information of a sub-block and the L1 motion information of the second prediction unit may be set as the L1 motion information of a sub-block. But, when the first prediction unit and the second prediction unit have only L0 motion information or only L1 motion information, the motion information of a sub-block may be determined by selecting any one of the first prediction unit or the second prediction unit. Alternatively, a motion vector average value of the first prediction unit and the second prediction unit may be set as a motion vector of a sub-block.

The motion information of a coding block that encoding/decoding is completed may be updated in a motion information table. In this case, the motion information of a coding block to which prediction unit partitioning is applied may be set not to be added to a motion information table.

Alternatively, only the motion information of any one of a plurality of prediction units generated by partitioning a coding block may be added to a motion information table. In an example, while the motion information of the first prediction unit may be added to a motion information table, the motion information of the second prediction unit may not be added to a motion information table. In this case, a prediction unit which will be added to a motion information table may be selected based on at least one of a size of a coding block, a shape of a coding block, a size of a prediction unit, a shape of a prediction unit or whether a bidirectional prediction is performed for a prediction unit.

Alternatively, the motion information of each of a plurality of prediction units generated by partitioning a coding block may be added to a motion information table. In this case, the adding order for a motion information table may be predefined in an encoding device and a decoding device. In an example, the motion information of a prediction unit including a top-left sample or a bottom-left corner sample may be added to a motion information table before the motion information of the other prediction unit. Alternatively, the adding order for a motion information table may be determined based on at least one of a merge index or a reference picture index of each prediction unit or a magnitude of a motion vector.

Alternatively, motion information combining the motion information of the first prediction unit and the motion information of the second prediction unit may be added to a motion information table. Any one of L0 motion information and L1 motion information of combined motion information may be derived from the first prediction unit and the other of L0 motion information and L1 motion information may be derived from the second prediction unit.

Alternatively, based on whether a reference picture of the first prediction unit is the same as a reference picture of the second prediction unit, motion information which will be added to a motion information table may be determined. In an example, when a reference picture of the first prediction unit is different from a reference picture of the second prediction unit, the motion information of any one of the first prediction unit and the second prediction unit or motion information combining the first prediction unit and the second prediction unit may be added to a motion information table. On the other hand, when a reference picture of the first prediction unit is the same as a reference picture of the second prediction unit, an average of a motion vector of the first prediction unit and a motion vector of the second prediction unit may be added to a motion information table.

Alternatively, based on a size of a coding block, a shape of a coding block or a partitioning shape of a coding block, a motion vector which will be added to a motion information table may be determined. In an example, when right triangular partitioning is applied to a coding block, the motion information of the first prediction unit may be added to a motion information table. On the other hand, when left triangular partitioning is applied to a coding block, the motion information of the second prediction unit may be added to a motion information table or motion information combining the motion information of the first prediction unit and the motion information the of second prediction unit may be added to a motion information table.

A motion information table for storing the motion information of a coding block to which prediction unit partitioning is applied may be separately defined. In an example, the motion information of a coding block to which prediction unit partitioning is applied may be stored in a partitioning mode motion information table. A partitioning mode motion information table may be referred to as a triangular motion information table. In other words, the motion information of a coding block to which prediction unit partitioning is not applied may be stored in a general motion information table and the motion information of a coding block to which prediction unit partitioning is applied may be stored in a partitioning mode motion information table. Embodiments that motion information of a coding block to which prediction unit partitioning described above is applied is added to a motion information table may be applied for updating a partitioning mode motion information table. In an example, the motion information of the first prediction unit, the motion information of the second prediction unit, motion information combining the motion information of the first prediction unit and the motion information of the second prediction unit and motion information averaging a motion vector of the first prediction unit and a motion vector of the second prediction unit may be added to a partitioning mode motion information table.

When prediction mode partitioning is not applied to a coding block, a merge candidate may be derived by using a general motion information table. On the other hand, when prediction mode partitioning is applied to a coding block, a merge candidate may be derived by using a partitioning mode motion information table.

Intra-prediction is a method for performing prediction on a current block by using a reconstructed sample that has been already encoded/decoded and which is around the current block. In this connection, a reconstructed sample before applying an in-loop filter may be used for intra-prediction of the current block.

An intra-prediction method includes intra-prediction based on a matrix and intra-prediction according to a direction with a neighboring reconstruction sample. Information indicating an intra-prediction method of a current block may be signaled in a bitstream. The information may be a 1-bit flag. Alternatively, an intra-prediction of a current block may be determined on the basis of at least one of a position of the current block, a size of the current block, a shape of the current block, or an intra-prediction method of a neighboring block. In an example, when a current block is present crossing a picture boundary, it may be set such that an intra-prediction method based on a matrix is not applied to the current block.

An intra-prediction method based on a matrix is a method of obtaining a prediction block of a current block on the basis of a matrix product of a matrix stored in the encoder and the decoder, and reconstruction samples around the current block. Information for specifying any one of a plurality of prestored matrices may be signaled in a bitstream. The decoder may determine a matrix for performing intra-prediction on a current block on the basis of the above information and a size of the current block.

Information representing whether matrix-based intra-prediction is applied to a current block may be signaled in a bitstream. In an example, a flag, intra_mip_flag, may be signaled in a bitstream. When a syntax, intra_mip_flag, is 1, it represents that matrix-based intra-prediction is applied. When a syntax, intra_mip_flag, is 0, it represents that matrix-based intra-prediction is not applied.

FIGS. 31 to 34 are diagrams showing an implementation aspect of matrix-based intra-prediction according to a size of a current block.

As in an example shown in FIGS. 31 to 34, boundary smoothing samples may be derived by subsampling reference samples adjacent to a current block or performing an average operation for every preset number of reference samples. In an example, N top boundary smoothing samples may be derived by subsampling top reference samples of a current block or performing an average operation for the preset number of top reference samples. In addition, M left boundary smoothing samples may be derived by subsampling left reference samples of a current block or performing an average operation for the preset number of left reference samples.

According to a size or a shape of a current block, a sampling rate or the number of reference samples used to perform an average operation may be set differently. In this case, a size of a current block may represent at least one of a width, a height or the number of samples. In an example, when a width or a height of a current block is 4, one of two reference samples may be set as a boundary smoothing sample, or an average of two reference samples may be set as a boundary smoothing sample. Alternatively, when a width or a height of a current block is 16, one of four reference samples may be set as a boundary smoothing sample, or an average of four reference samples may be set as a boundary smoothing sample.

Alternatively, a sampling rate for top reference samples or the number of reference samples used in the average operation for top reference samples may be determined based on a width of a current block and a sampling rate for left reference samples or the number of reference samples used in an average operation for left reference samples may be determined based on a height of a current block.

According to a size of a current block, subsampling may be omitted. In an example, when a current block has a 4×8 size, subsampling for top reference samples may be omitted. Alternatively, when a current block has an 8×4 size, subsampling for left reference samples may be omitted. When subsampling is omitted, a reference sample may be set as a boundary smoothing reference sample.

A boundary smoothing reference sample array may be generated by arranging top boundary smoothing reference samples and left boundary smoothing reference samples in a line. In this case, information representing the array order of boundary smoothing reference samples may be signaled in a bitstream. In an example, a flag, is_transposed_flag, representing the array order of boundary smoothing reference samples may be signaled in a bitstream. When a syntax, is_transposed_flag, is true, left boundary smoothing reference samples may be arranged before top boundary smoothing reference samples. When a syntax, is_transposed_flag, is false, top boundary smoothing reference samples may be arranged before left boundary smoothing reference samples.

Subsampled prediction samples of a current block may be obtained by using a matrix and a boundary smoothing reference sample array. In an example, Equation 10 shows an example in which a subsampled prediction sample is obtained.

$$PredMip[x][y] = \left( \sum_{i=k}^{InputSize-1} mWeight[iMode][j][y*predSize + x] * Bdry[j] \right) + Offset$$

Equation 10

In the Equation 10, predMip[x][y] represents a subsampled prediction sample. Bdry[j] represents the j-th component of a boundary smoothing reference sample array. mWeight[iMode][j][y*predSize+x] represents the j-th row and the (y*predSize+x)-th column component in a matrix specified by an intra-prediction mode of a current block, iMode. Offset represents an offset. According to an intra-prediction mode of a current block, an offset may be set differently.

A variable, predSize, may be determined based on a size of a current block. In an example, predSize may represent the minimum value of a width and a height of a current block. When the minimum value of a width and a height is greater than 8, predSize may be set to be 8.

A subsampled prediction sample may be derived by inputting a boundary smoothing reference sample difference array, which is derived based on a difference value with an initial boundary reference sample, instead of a boundary smoothing reference sample array. In an example, Equation 11 represents an example in which a subsampled prediction sample is derived by using a boundary smoothing reference sample difference array, DBdry[j].

$$PredMip[x][y] = \left( \sum_{j=0}^{inputSize-1} mWeight[iMode][j][y*predSize + x] * DBdry[j] \right) + Offset$$

Equation 11

The j-th component of a boundary smoothing reference sample difference array, DBdry[j], may represent a difference between an initial boundary smoothing reference sample and the j-th boundary smoothing reference sample or a difference between an initial boundary smoothing reference sample and the j+1-th boundary smoothing reference sample. An initial boundary smoothing reference sample may represent the 0-th boundary smoothing reference sample of a boundary smoothing reference sample array.

Prediction samples of a current block may be obtained by upsampling a subsampled prediction sample. In this case, upsampling may be performed in the order of a horizontal direction and a vertical direction. Alternatively, upsampling may be performed in the order of a vertical direction and a horizontal direction.

Alternatively, prediction samples of a current block may be obtained by using linear interpolation of subsampled prediction samples. In this case, at least one of a coefficient, a tap size or a strength of an interpolation filter may be different according to a size or a shape of a current block or a position of a prediction sample.

Matrixes for intra-prediction may be prestored in an encoding device and a decoding device. In this case, the number of matrixes which may be used by a current block may be variably determined according to a size of a current block. In an example, when a size of a current block is 4×4, the number of matrixes which may be used by a current block may be 15. When a size of a current block is 4×8 or 8×4, the number of matrixes which may be used by a current block may be 7. When a size of a current block is 8×8 or more, the number of matrixes which may be used by a current block may be 5.

Alternatively, a matrix of a current block may be determined based on an intra-prediction mode of a current block. An intra-prediction mode of a current block may be determined based on at least one of an intra-prediction mode of neighboring blocks adjacent to a current block or information signaled in a bitstream.

A look-up table representing a corresponding relationship between an intra-prediction mode and a matrix may be prestored in an encoding device and a decoding device. In an example, four consecutive intra-prediction modes may be mapped to one matrix. In an example, when an intra-prediction mode of a current block is 0 to 3, the first matrix, MWeight[0], may be applied to a current block and when an intra-prediction mode of a current block is 4 to 7, the second matrix, MWeight[1], may be applied to a current block.

A matrix corresponding to an intra-prediction mode derived from a look-up table may be determined after deriving an intra-prediction mode of a current block based on MPM candidates of a current block.

Alternatively, information representing an intra-prediction mode of a current block may be signaled in a bitstream. The information may be index information for identifying any one of matrixes which may be used by a current block. In an example, an index, intra_mip_mode, may be signaled in a bitstream.

The maximum number of bits of a syntax, intra_mip_mode, may be different according to a size of a current block. In an example, when a size of a current block is 4×4, the maximum bit length of a syntax, intra_mip_mode, may be 15. When a size of a current block is 4×8 or 8×4, the maximum bit length of a syntax, intra_mip_mode, may be 7. When a size of a current block is 8×8 or more, the maximum bit length of a syntax, intra_mip_mode, may be 5.

General intra-prediction is a method of obtaining a prediction block of a current block on the basis of a non-directional intra-prediction mode or directional intra-prediction mode. Hereinafter, with reference to the figure, a process of intra-prediction based on general intra-prediction will be described.

FIG. 35 is a view of a flowchart showing an intra-prediction method according to an embodiment of the present disclosure.

A reference sample line of a current block may be determined S3501. The reference sample line means a group of reference samples included in a k-th spaced apart line from the top and/or the left of the current block. The reference sample may be derived from a reconstructed sample around the current block which has been already encoded/decoded.

Index information identifying a reference sample line for the current block among the plurality of reference sample lines may be signaled in a bitstream. In an example, index information, intra_luma_ref_idx, for specifying the reference sample line for the current block may be signaled in a bitstream. The index information may be signaled on a coding block basis.

A plurality of reference sample lines may include at least one of a first line, a second line, or a third line from a top and/or a left of the current block. A reference sample line consisted of a row adjacent to a top of the current block and a column adjacent to a left of the current block among the plurality of reference sample lines may be referred to as an adjacent reference sample line, and remaining reference sample lines may be referred to as non-adjacent reference sample lines.

Table 3 shows an index assigned to each of the candidate reference sample lines.

TABLE 3

| Index (intra_luma_ref_idx) | Reference sample line |
| --- | --- |
| 0 | Adjacent reference sample line |
| 1 | First non-adjacent reference sample line |
| 2 | Second non-adjacent reference sample line |

Based on at least one of the position, the size, the shape of a current block or the prediction encoding mode of a neighboring block thereto, the reference sample line for the current block may be determined. In one example, when the current block adjoins a boundary of a picture, a tile, a slice or a coding tree unit, the adjacent reference sample line may be determined as the reference sample line for the current block. The reference sample line may include top reference samples located at the top of the current block and left reference samples located at the left of the current block. Top reference samples and left reference samples may be derived from reconstructed samples around the current block. The reconstructed samples may be in a state before the in-loop filter is applied.

Next, the intra prediction mode for the current block may be determined S3502. In this connection, at least one of a non-directional intra prediction mode or a directional intra prediction mode may be determined as the intra prediction mode for the current block. The non-directional intra prediction mode includes a planar mode and a DC mode. The directional intra prediction mode includes 33 or 65 modes from a left-bottom diagonal direction to a right-top diagonal direction.

FIG. 36 is a diagram showing intra prediction modes.

FIG. 36(a) shows 35 intra prediction modes. FIG. 36(b) shows 67 intra prediction modes.

The larger or smaller number of intra prediction modes than the number of those shown in FIG. 36 may be defined.

Based on an intra-prediction mode of a neighboring block adjacent to a current block, an MPM (Most Probable Mode) may be set. In this connection, a neighboring block may include a left neighboring block adjacent to the left of the current block and a top neighboring block adjacent to the top of the current block.

The number of MPMs included in an MPM list may be preset in an encoding device and a decoding device. In an example, the number of MPMs may be 3, 4, 5, or 6. Alternatively, information representing the number of MPMs may be signaled in a bitstream. Alternatively, the number of MPMs may be determined based on at least one of a prediction encoding mode of a neighboring block, a size, a shape or a reference sample line index of a current block. In an example, while N MPMs may be used when an adjacent reference sample line is determined as a reference sample line of a current block, M MPMs may be used when a non-adjacent reference sample line is determined as a reference sample line of a current block. As M is a natural number smaller than N, in an example, N may be 6 and M may be 5, 4, or 3. Accordingly, while an intra-prediction mode of a current block may be determined as any one of 6 candidate intra-prediction modes when an index of a reference sample line of a current block is 0 and an MPM flag is true, an intra-prediction mode of a current block may be determined as any one of 5 candidate intra-prediction modes when an index of a reference sample line of a current block is greater than 0 and an MPM flag is true.

Alternatively, the fixed number (e.g., 6 or 5) of MPM candidates may be used regardless of an index of a reference sample line of a current block.

When matrix-based intra-prediction is applied to a neighboring block, an intra-prediction mode of a neighboring block may be considered as a Planar and an MPM candidate may be derived.

When intra BDPCM is applied to a neighboring block, an intra-prediction mode of a neighboring block may be considered as a default mode and an MPM candidate may be derived. In this case, a default mode may be at least one of a DC, a Planar, a vertical direction or a horizontal direction.

Alternatively, based on an intra BDPCM application direction of a neighboring block, an intra-prediction mode of a neighboring block may be determined. In an example, when intra BDPCM in a horizontal direction is applied to a neighboring block, an intra-prediction mode of a neighboring block may be considered to have a horizontal direction. On the other hand, when intra BDPCM in a vertical direction is applied to a neighboring block, an intra-prediction mode of a neighboring block may be considered to have a vertical direction.

An MPM list including a plurality of MPMs may be generated and information representing whether the same MPM as an intra-prediction mode of a current block is included in an MPM list may be signaled in a bitstream. As the information is a 1-bit flag, it may be referred to as an MPM flag. When the MPM flag represents that the same MPM as a current block is included in an MPM list, index information identifying one of MPMs may be signaled in a bitstream. In an example, index information, mpm_idx, specifying any one of a plurality of MPMs may be signaled in a bitstream. An MPM specified by the index information may be set as an intra-prediction mode of a current block. When the MPM flag represents that the same MPM as current block is not included in an MPM list, remaining mode information indicating any one of remaining intra-prediction modes excluding MPMs may be signaled in a bitstream. Remaining mode information indicates an index value corresponding to an intra-prediction mode of a current block among remaining intra-prediction modes in which indexes are reassigned excluding MPMs. The decoding device arranges MPMs in ascending order, and determine an intra-prediction mode of a current block by comparing remaining mode information with MPMs. In an example, when remaining mode information is the same as or smaller than an MPM, an intra-prediction mode of a current block may be derived by adding 1 to residual mode information.

When an intra-prediction mode of a current block is derived, a comparison between part of MPMs and remaining mode information may be omitted. In an example, MPMs which are a non-directional intra-prediction mode among MPMs may be excluded from a comparison target. When non-directional intra-prediction modes are set as MPMs, it is clear that remaining mode information indicates a directional intra-prediction mode, so an intra-prediction mode of a current block may be derived by comparing remining MPMs excluding nondirectional intra-prediction modes with residual mode information. Instead of excluding non-directional intra-prediction modes from a comparison target, the number of non-directional intra-prediction modes may be added to remining mode information to compare a result value thereon with remining MPMs.

Instead of setting a default mode as an MPM, information representing whether an intra-prediction mode of a current block is a default mode may be signaled in a bitstream. The information may be a 1-bit flag and the flag may be referred to as a default mode flag. The default mode flag may be signaled only when an MPM flag represents that the same MPM as a current block is included in an MPM list. As mentioned above, a default mode may include at least one of a Planar, a DC, a vertical direction mode or a horizontal direction mode. In an example, when a planar is set as a default mode, a default mode flag may indicate whether an intra-prediction mode of a current block is a planar. When a default mode flag indicates that an intra-prediction mode of a current block is not a default mode, one of MPMs indicated by index information may be set as an intra-prediction mode of a current block.

When a default mode flag is used, the same intra-prediction mode as a default mode may be set not to be set as an MPM. In an example, when a default mode flag indicates whether an intra-prediction mode of a current block is a planar, an intra-prediction mode of a current block may be derived by using 5 MPMs excluding an MPM corresponding to a planar.

When a plurality of intra-prediction modes are set as default modes, index information indicating any one of default modes may be further signaled. An intra-prediction mode of a current block may be set as a default mode indicated by the index information.

When an index of a reference sample line of a current block is not 0, it may be set not to use a default mode. In an example, when a non-adjacent reference sample line is determined as a reference sample line of a current block, it may be set not to use a non-directional intra-prediction mode such as a DC mode or a planar mode. Accordingly, when an index of a reference sample line is not 0, a default mode flag may not be signaled and a value of the default mode flag may be inferred as a predefined value (i.e., false).

When an intra-prediction mode for the current block is determined, prediction samples for the current block may be obtained based on the determined intra-prediction mode S3503.

In case that the DC mode is selected, prediction samples for a current block are generated based on the average value of the reference samples. In detail, values of all of samples within the prediction block may be generated based on an average value of the reference samples. An average value may be derived using at least one of top reference samples adjacent to the top of the current block, and left reference samples adjacent to the left of the current block.

The number or a range of the reference samples used when deriving an average value may vary based on the shape of the current block. In an example, when a current block is a non-square block where a width is greater than a height, an average value may be calculated by using top reference samples. To the contrary, when a current block is a non-square block where a width is smaller than a height, an average value may be calculated by using left reference samples. In other words, when a width and a height of the current block are different, reference samples adjacent to the greater length may be used so as to calculate an average value. Alternatively, whether to calculate an average value by using top reference samples or by using left reference samples may be determined on the basis of a ratio between a width and a height of the current block.

When a planar mode is selected, a prediction sample may be obtained by using a horizontal directional prediction sample and a vertical directional prediction sample. In this connection, the horizontal directional prediction sample may be obtained on the basis of a left reference sample and a right reference sample which are positioned at the same horizontal line with the prediction sample, and the vertical directional prediction sample may be obtained on the basis of an top reference sample and a bottom reference sample which are positioned at the same vertical line with the prediction sample. In this connection, the right reference sample may be generated by copying a reference sample adjacent to the top-right corner of the current block, and the bottom reference sample may be generated by copying a reference sample adjacent to the lower-left corner of the current block. The horizontal directional prediction sample may be obtained on the basis of a weighted sum of the left reference sample and the right reference sample, and the vertical directional prediction sample may be obtained on the basis of a weighted sum of the top reference sample and the bottom reference sample. In this connection, a weighting factor assigned to each reference sample may be determined according to a position of the prediction sample. The prediction sample may be obtained on the basis of an average or a weighted sum of the horizontal directional prediction sample and the vertical directional prediction sample. When a weighted sum is used, a weighting factor assigned to the horizontal directional prediction sample and the vertical directional prediction sample may be determined on the basis of a position of the prediction sample.

When a directional prediction mode is selected, a parameter representing a prediction direction (or prediction angle) of the selected directional prediction mode may be determined. Table 4 below represents an intra directional parameter of intraPredAng for each intra-prediction mode.

TABLE 4

| PredModeIntra | | | | | | | |
|---|---|---|---|---|---|---|---|
| | 1 | 2 | 3 | 4 | 5 | 6 | 7 |
| IntraPredAng | — | 32 | 26 | 21 | 17 | 13 | 9 |
| PredMode Intra | | | | | | | |
| | 8 | 9 | 10 | 11 | 12 | 13 | 14 |
| IntraPredAng | 5 | 2 | 0 | −2 | −5 | −9 | −13 |
| PredModeIntra | | | | | | | |
| | 15 | 16 | 17 | 18 | 19 | 20 | 21 |
| IntraPredAng | −17 | −21 | −26 | −32 | −26 | −21 | −17 |
| PredMode Intra | | | | | | | |
| | 22 | 23 | 24 | 25 | 26 | 27 | 28 |
| IntraPredAng | −13 | −9 | −5 | −2 | 0 | 2 | 5 |
| PredModeIntra | | | | | | | |
| | 29 | 30 | 31 | 32 | 33 | 34 | |
| IntraPredAng | 9 | 13 | 17 | 21 | 26 | 32 | |

Table 4 represents an intra directional parameter of each intra-prediction mode where an index thereof is one of 2 to 34 when 35 intra-prediction modes are defined. When directional intra-prediction modes are defined more than 33, an intra directional parameter of each intra-prediction mode may be set by subdividing Table 4. Top reference samples and left reference samples for the current block are arranged in a line, and then a prediction sample may be obtained on the basis of a value of an intra directional parameter. In this connection, when a value of the intra directional parameter is a negative value, left reference samples and top reference samples may be arranged in a line.

FIGS. 37 and 38 are a diagram showing an example of a one-dimensional array which arranges reference samples in a line.

FIG. 37 shows an example of a one-dimensional array in a vertical direction which reference samples are arranged in a vertical direction and FIG. 38 shows an example of a one-dimensional array in a horizontal direction which reference samples are arranged in a horizontal direction. An embodiment of FIGS. 37 and 38 is described by assuming a case in which 35 intra-prediction modes are defined.

When an intra-prediction mode index is any one of 11 to 18, a one-dimensional array in a horizontal direction which rotates top reference samples counterclockwise may be applied and when an intra-prediction mode index is any one of 19 to 25, a one-dimensional array in a vertical direction which rotates left reference samples clockwise may be applied. In arranging reference samples in a line, an intra-prediction mode angle may be considered.

Based on an intra directional parameter, a reference sample determination parameter may be determined. A reference sample determination parameter may include a reference sample index for specifying a reference sample and a weight parameter for determining a weight applied to a reference sample.

A reference sample index, iIdx, and a weighting factor parameter, ifact, may be respectively obtained through Equations 12 and 13 below.

$$iIdx = (y+1)*P_{ang}/32 \quad \text{Equation 12}$$

$$i_{fact} = [(y+1)*P_{ang}]\&31 \quad \text{Equation 13}$$

In Equations 12 and 13, $P_{ang}$ represents an intra directional parameter. A reference sample specified by a reference sample index of iIdx corresponds to an integer pel.

In order to derive a prediction sample, at least one reference sample may be specified. In detail, according to a slope of a prediction mode, a position of a reference sample used for deriving a prediction sample may be specified. In an example, a reference sample used for deriving a prediction sample may be specified by using a reference sample index of iIdx.

In this connection, when a slope of an intra-prediction mode is not represented by one reference sample, a prediction sample may be generated by performing interpolation on a plurality of reference samples. In an example, when a slope of an intra-prediction mode is a value between a slope between a prediction sample and a first reference sample, and a slope between the prediction sample and a second reference sample, the prediction sample may be obtained by performing interpolation on the first reference sample and the second reference sample. In other words, when an angular line according to an intra-prediction angle does not pass a reference sample positioned at an integer pel, a prediction sample may be obtained by performing interpolation on reference samples positioned adjacent to the left and the right, or the top and the bottom of the position where the angular line passes.

Equation 14 below represents an example of obtaining a prediction sample on the basis of reference samples.

$$P(x,y)=((32-i_{fact})/32)*\text{Ref\_1}D(x+\text{iIdr}+1)+(i_{fact}/32)\\ *\text{Ref\_1}D(x+\text{iIdx}+2) \qquad \text{Equation 14}$$

In Equation 14, P represents a prediction sample, and Ref_1D represents any one of reference samples that are arranged in a line. In this connection, a position of the reference sample may be determined by a position (x, y) of the prediction sample and a reference sample index of iIdx.

When a slope of an intra-prediction mode is possibly represented by one reference sample, a weighting factor parameter of ifact is set to 0. Accordingly, Equation 14 may be simplified as Equation 15 below.

$$P(x,y)=\text{Ref\_1}D(x+\text{iIdx}+1) \qquad \text{Equation 15}$$

Based on a plurality of intra-prediction modes, intra-prediction for a current block may be performed. In an example, an intra-prediction mode may be derived per prediction sample and a prediction sample may be derived based on an intra-prediction mode assigned thereto.

Alternatively, an intra-prediction mode may be derived per region and intra-prediction for each region may be performed based on an intra-prediction mode assigned thereto. In this case, the region may include at least one sample. At least one of a size or a shape of the region may be adaptively determined based on at least one of a size or a shape of a current block or an intra-prediction mode. Alternatively, at least one of a size or a shape of a region may be predefined independently in an encoding device and a decoding device regardless of a size or a shape of a current block.

FIG. 39 is a diagram illustrating an angle formed by directional intra-prediction modes with a straight line parallel to an x-axis.

As in an example shown in FIG. 39, directional prediction modes may exist between a bottom-left diagonal direction and a top-right diagonal direction. As described by an angle formed by an x-axis and a directional prediction mode, directional prediction modes may exist between 45 degrees (a bottom-left diagonal direction) and −135 degrees (a top-right diagonal direction).

When a current block is a non-square, a case may be present where a prediction sample is derived by using, among reference samples positioned at the angular line according to an intra-prediction angle, a reference sample that is positioned farther than a reference sample close to a prediction sample according to an intra-prediction mode for the current block.

FIG. 40 is a diagram showing an aspect in which a prediction sample is obtained when a current block has a non-square shape.

In an example, as in an example shown in FIG. 40(a), it is assumed that a current block has a non-square shape whose width is greater than a height and an intra-prediction mode of a current block is a directional intra-prediction mode with an angle from 0 degrees to 45 degrees. In this case, when a prediction sample A near a right column of a current block is derived, there may occur a case in which a left reference sample L far from the prediction sample is used instead of a top reference sample T close to the prediction sample among reference samples positioned in an angular mode following the angle.

In another example, as in an example shown in FIG. 40(b), it is assumed that a current block has a non-square shape whose height is greater than a width and an intra-prediction mode of a current block is a directional intra-prediction mode from −90 degrees to −135 degrees. In the case, when a prediction sample A near a bottom row of a current block is derived, there may occur a case in which a top reference sample T far from the prediction sample is used instead of a left reference sample L close to the prediction sample among reference samples positioned in an angular mode following the angle.

To solve the above problem, when a current block is a non-square, an intra-prediction mode for the current block may be substituted with an intra-prediction mode in opposite direction. Accordingly, for a non-square block, directional prediction modes having angles greater or smaller than those of directional prediction modes shown in FIG. 36 may be used. The above directional intra-prediction mode may be defined as a wide angle intra-prediction mode. A wide angle intra-prediction mode represents a directional intra-prediction mode that does not belong to a range of 45 degrees to −135 degrees.

FIG. 41 is a view showing wide angle intra-prediction modes.

In an example show in FIG. 41, intra-prediction modes having indices from −1 to −14 and intra-prediction modes having indices from 67 to 80 represent wide angle intra-prediction modes.

In FIG. 41, 14 wide angle intra-prediction modes (from −1 to −14) which are greater in angle than 45 degrees and 4 wide angle intra-prediction modes (from 67 to 80) which are smaller in angle than −135 degrees are shown. However, more or fewer number of wide angle intra-prediction modes may be defined.

When a wide angle intra-prediction mode is used, length of top reference samples may be set to 2W+1, and a length of left reference samples may be set to 2H+1.

As a wide angle intra-prediction mode is used, a sample A shown in FIG. 41(a) may be predicted by using a reference sample T and a sample A shown in FIG. 41(b) may be predicted by using a reference sample L.

A total of 67+N intra-prediction modes may be used constituted with the existing intra-prediction modes in addition to N wide angle intra-prediction modes. In an example, Table 5 represents an intra directional parameter of intra-prediction modes when 20 wide angle intra-prediction modes are defined.

TABLE 5

| | PredMode Intra | | | | | | | |
| --- | --- | --- | --- | --- | --- | --- | --- | --- |
| | −10 | −9 | −8 | −7 | −6 | −5 | −4 | −3 | −2 |
| intraPredAngle | 114 | 93 | 79 | 68 | 60 | 54 | 49 | 45 | 39 |
| | PredMode Intra | | | | | | | |
| | −1 | 2 | 3 | 4 | 5 | 6 | 7 | 8 | 9 |
| intraPredAngle | 35 | 32 | 29 | 26 | 23 | 21 | 19 | 17 | 15 |

TABLE 5-continued

| | \multicolumn{8}{c}{PredMode Intra} |
|---|---|---|---|---|---|---|---|---|
| | 10 | 11 | 12 | 13 | 14 | 15 | 16 | 17 | 18 |
| intraPredAngle | 13 | 11 | 9 | 7 | 5 | 3 | 2 | 1 | 0 |

| | \multicolumn{8}{c}{PredModeIntra} |
|---|---|---|---|---|---|---|---|---|
| | 19 | 20 | 21 | 22 | 23 | 24 | 25 | 26 | 27 |
| intraPredAngle | −1 | −2 | −3 | −5 | −7 | −9 | −11 | −13 | −15 |

| | \multicolumn{8}{c}{PredModeIntra} |
|---|---|---|---|---|---|---|---|---|
| | 28 | 29 | 30 | 31 | 32 | 33 | 34 | 35 | 36 |
| intraPredAngle | −17 | −19 | −21 | −23 | −26 | −29 | −32 | −29 | −26 |

| | \multicolumn{8}{c}{PredMode Intra} |
|---|---|---|---|---|---|---|---|---|
| | 37 | 38 | 39 | 40 | 41 | 42 | 43 | 44 | 45 |
| intraPredAngle | −23 | −21 | −19 | −17 | −15 | −13 | −11 | −9 | −7 |

| | \multicolumn{8}{c}{PredModeIntra} |
|---|---|---|---|---|---|---|---|---|
| | 46 | 47 | 48 | 49 | 50 | 51 | 52 | 53 | 54 |
| intraPredAngle | −5 | −3 | −2 | −1 | 0 | 1 | 2 | 3 | 5 |

| | \multicolumn{8}{c}{PredMode Intra} |
|---|---|---|---|---|---|---|---|---|
| | 55 | 56 | 57 | 58 | 59 | 60 | 61 | 62 | 63 |
| intraPredAngle | 7 | 9 | 11 | 13 | 15 | 17 | 19 | 21 | 23 |

| | \multicolumn{8}{c}{PredMode Intra} |
|---|---|---|---|---|---|---|---|---|
| | 64 | 65 | 66 | 67 | 68 | 69 | 70 | 71 | 72 |
| intraPredAngle | 26 | 29 | 32 | 35 | 39 | 45 | 49 | 54 | 60 |

| | \multicolumn{4}{c}{PredModeIntra} |
|---|---|---|---|---|
| | 73 | 74 | 75 | 76 |
| intraPredAngle | 68 | 79 | 93 | 114 |

When a current block is non-square and an intra-prediction mode of a current block obtained in S2502 belongs to a conversion range, an intra-prediction mode of a current block may be converted into a wide angle intra-prediction mode. The conversion range may be determined based on at least one of a size or a shape or a ratio of a current block. In this connection, the ratio may represent a ratio between a width and a height of a current block. When a current block has a non-square shape whose a width is greater than a height, a conversion range may be set from an intra-prediction mode index in a top-right diagonal direction (e.g., 66) to (subtracting N from an index of an intra-prediction mode in a top-right diagonal direction). In this case, N may be determined based on a ratio of a current block. When an intra-prediction mode of a current block belongs to a conversion range, the intra-prediction mode may be converted into a wide angle intra-prediction mode. The conversion may be performed by subtracting a predefined value from the intra-prediction mode, and the predefined value may be a total number of intra-prediction modes excluding wide angle intra-prediction modes (e.g., 67).

By the embodiment, each of intra-prediction modes between No. 66 to No. 53 may be converted into wide angle intra-prediction modes between No. −1 to No. −14, respectively.

When a current block has a non-square shape whose height is greater than a width, a conversion range may be set from an intra-prediction mode index in a bottom-left diagonal direction (e.g., 2) to (an index of an intra-prediction mode in a bottom-left diagonal direction+M). In this case, M may be determined based on a ratio of a current block. When an intra-prediction mode of a current block belongs to a conversion range, the intra-prediction mode may be converted into a wide angle intra-prediction mode. The conversion may be performed by adding a predefined value to the intra-prediction mode, and the predefined value may be a total number of directional intra-prediction modes excluding wide angle intra-prediction modes (e.g., 65).

By the embodiment, each of intra-prediction modes between No. 2 to No. 15 may be converted into wide angle intra-prediction modes between No. 67 to No. 80, respectively.

Hereinafter, intra-prediction modes belonging to a conversion range are referred to as a wide angle replaced intra-prediction mode.

A conversion range may be determined based on a ratio of a current block. In an example, Table 6 and Table 7 represent a conversion range when 35 intra-prediction modes are defined and when 67 intra-prediction modes are defined excluding a wide angle intra-prediction mode, respectively.

TABLE 6

| Condition | Replaced Intra Prediction Modes |
|---|---|
| W/H = 2 | Modes 2, 3, 4 |
| W/H > 2 | Modes 2, 3, 4, 5, 6 |
| W/H = 1 | None |
| H/W = ½ | Modes 32, 33, 34 |
| H/W < ½ | Modes 30, 31, 32, 33, 34 |

TABLE 7

| Condition | Replaced Intra Prediction Modes |
|---|---|
| W/H = 2 | Modes 2, 3, 4, 5, 6, 7 |
| W/H > 2 | Modes 2, 3, 4, 5, 6, 7, 8, 9, 10, 11 |
| W/H = 1 | None |
| H/W = ½ | Modes 61, 62, 63, 64, 65, 66 |
| H/W < ½ | Modes 57, 58, 59, 60, 61, 62, 63, 64, 65, 66 |

As in an example shown in Table 6 and Table 7, according to a ratio of a current block, the number of wide angle replaced intra-prediction modes included in a conversion range may vary. A conversion range may be further subdivided as in Table 8 below by subdividing a ratio of a current block.

TABLE 8

| Condition | Replaced Intra Prediction Modes |
|---|---|
| W/H = 16 | Modes 12, 13, 14, 15 |
| W/H = 8 | Modes 12, 13 |
| W/H = 4 | Modes 2, 3, 4, 5, 6, 7, 8, 9, 10, 11 |
| H/W = 2 | Modes 2, 3, 4, 5, 6, 7 |
| H/W = 1 | None |
| W/H = ½ | Modes 61, 62, 63, 64, 65, 66 |
| W/H = ¼ | Modes 57, 58, 59, 60, 61, 62, 63, 64, 65, 66 |
| W/H = ⅛ | Modes 55, 56 |
| H/W = 1/16 | Modes 53, 54, 55, 56 |

When a non-adjacent reference sample line is determined as a reference sample line of a current block, or when a multi-line intra-prediction encoding method selecting any one of a plurality of reference sample lines is used, it may be set not to use a wide angle intra-prediction mode. In other words, although a current block is non-square and an intra-prediction mode of a current block belongs to a conversion range, an intra-prediction mode of a current block may not be converted into a wide angle intra-prediction mode. Alternatively, when an intra-prediction mode of a current block is determined as a wide angle intra-prediction mode, it may set to make non-adjacent reference sample lines unavailable as a reference sample line of a current block, or not to use a multi-line intra-prediction encoding method selecting any one of a plurality of reference sample lines. When a multi-line intra-prediction encoding method is not used, an adjacent reference sample line may be determined as a reference sample line of a current block.

When a wide angle intra-prediction mode is not used, refW and refH may be set as a sum of nTbW and nTbH. Accordingly, a non-adjacent reference sample whose distance with a current block is i may include (nTbW+nTbH+offsetX[i]) top reference samples and (nTbW+nTbH+offsetY[i]) left reference samples except a top-left reference sample. In other words, a non-adjacent reference sample whose distance with a current block is i may include (2nTbW +2nTbH+offsetX[i]+offsetY[i]+1) reference samples. For example, when a value of whRatio is greater than 1, a value of offsetX may be set to be larger than that of offsetY. In an example, a value of offsetX may be set to be 1 and a value of offsetY may be set to be 0. On the other hand, when a value of whRatio is smaller than 1, a value of offsetY may be set to be larger than that of offsetX. In an example, a value of offsetX may be set to be 0 and a value of offsetY may be set to be 1.

As wide angle intra-prediction modes are used in addition to the existing intra-prediction modes, a resource needed to encode wide angle intra-prediction modes may be increased and encoding efficiency may be reduced. Accordingly, instead of encoding wide angle intra-prediction modes as they are, replaced intra-prediction modes for wide angle intra-prediction modes may be encoded to improve encoding efficiency.

In an example, when a current block is encoded by using a wide angle intra-prediction mode of No. 67, No. 2, a wide angle replaced intra-prediction mode of No. 67, may be encoded as an intra-prediction mode of a current block. In addition, when a current block is encoded as a wide angle intra-prediction mode of No. −1, No. 66, an wide angle replaced intra-prediction mode of No. −1, may be encoded as an intra-prediction mode of a current block.

A decoding device may decode an intra-prediction mode of a current block and judge whether a decoded intra-prediction mode is included in a conversion range. When a decoded intra-prediction mode is a wide angle replaced intra-prediction mode, an intra-prediction mode may be converted into a wide angle intra-prediction mode.

Alternatively, when a current block is encoded as a wide angle intra-prediction mode, a wide angle intra-prediction mode may be encoded as it is.

Encoding of an intra prediction mode may be performed based on the above-described MPM list. Concretely, when a neighboring block is encoded as a wide angle intra-prediction mode, an MPM may be set based on a wide angle replaced intra-prediction mode corresponding to the wide angle intra prediction mode.

A coding block or a transform block may be partitioned into a plurality of sub-blocks (or sub-partitions). When a coding block or a transform block is partitioned into a plurality of sub-blocks, prediction, transform and quantization may be performed for each sub-block. Partitioning a coding block or a transform block into a plurality of sub-blocks may be defined as a sub-partition intra encoding method.

Information representing whether a sub-partition intra encoding method is applied may be signaled in a bitstream. The information may be a 1-bit flag. In an example, a syntax element, 'intra_subpartitions_mode_flag', representing whether a coding block or a transform block is partitioned into a plurality of sub-blocks may be signaled in a bitstream.

Alternatively, a sub-partition whether intra encoding method is applied may be determined based on at least one of a size, a shape or an intra-prediction mode of a coding block or a transform block. In an example, when an intra-prediction mode of a coding block is a non-directional intra-prediction mode (e.g., a planar or a DC) or a predefined directional intra-prediction mode (e.g., an intra-prediction mode in a horizontal direction, an intra-prediction mode in a vertical direction or an intra-prediction mode in a diagonal direction), it may set not to apply a sub-partition intra encoding method. Alternatively, when a size of a coding block is smaller than a threshold value, it may set not to apply a sub-partition intra encoding method.

Alternatively, when intra-prediction for a sub-block is performed based on an intra-prediction mode of a coding block, whether a sub-partition intra encoding method is applied may be determined based on whether a reconstructed sample included in a neighboring sub-block should be used as a reference sample for intra-prediction of a sub-block. In an example, when an intra-prediction mode of a coding block is an intra-prediction mode in a diagonal direction or a wide angle intra-prediction mode and a neighboring sub-block cannot be utilized as a reference sample in performing intra-prediction for a sub-block based on the intra-prediction mode, it may set not to use a sub-partition intra encoding method.

Alternatively, when a height and width ratio of a coding block is equal to or greater than a threshold value or equal to or less than a threshold value, it may set not to use a sub-partition intra encoding method. Alternatively, when at least one of a height or a width of a coding block is equal to or less than a threshold value, it may set not to use a sub-partition intra encoding method. In an example, when a width or a height of a coding block is equal to or less than a threshold value or when both a height and a width of a coding block is equal to or less than a threshold value, a sub-partition intra encoding method may not be used. Alternatively, when the number of samples included in a coding block is equal to or less than a threshold value, a sub-partition intra encoding method may not be used. A threshold value may have a predefined value in an encoding device and a decoding device. Alternatively, information for determining a threshold value may be signaled in a bitstream.

Alternatively, whether to signal a flag indicating whether a sub-partition intra encoding method is applied or not may be determined based on at least one of a size, a shape or an intra-prediction mode of a coding block or a transform block. In an example, only when both a height and a width of a coding block is equal to or less than a threshold value and/or when a size of a coding block is equal to or greater than a threshold value, a flag indicating whether a sub-partition intra encoding method is applied or not may be encoded and signaled. When a flag indicating whether a sub-partition intra encoding method is applied or not is not encoded, a sub-partition intra encoding method may not be applied.

When a sub-partition intra encoding method is not used, signaling of a syntax element, intra_subpartitions_mode_flag, may be omitted. When signaling of the flag is omitted, the flag may be considered to indicate that a sub-partition intra encoding method is not applied.

When a sub-partition intra encoding method is applied, a partitioning type of a coding block or a transform block may be determined. In this case, a partitioning type represents a partitioning direction of a coding block or a transform block. In an example, partitioning in a vertical direction may mean that a coding block or a transform block is partitioned by using at least one vertical line and partitioning in a horizontal direction may mean that a coding block or a transform block is partitioned by using at least one horizontal line.

FIG. 42 is a diagram showing an example of vertical directional partitioning and horizontal directional partitioning.

FIG. 42(a) represents an example in which a coding block is partitioned into 2 sub-blocks and FIG. 42(b) represents an example in which a coding block is partitioned into 4 sub-blocks.

Information for determining a partitioning type of a coding block or a transform block may be signaled in a bitstream. In an example, information representing whether vertical directional partitioning is applied to a coding block or a transform block or whether horizontal directional partitioning is applied to a coding block or a transform block may be signaled. The information may be a 1-bit flag, intra_subpart_type_flag. When a value of the flag is 1, it represents that a coding block or a transform block is partitioned in a horizontal direction and when a value of the flag is 0, it represents that a coding block or a transform block is partitioned in a vertical direction.

Alternatively, a partitioning type of a coding block or a transform block may be determined based on a size, a shape or an intra-prediction mode of a coding block or a transform block. In an example, a partitioning type of a coding block may be determined based on a width and height ratio of a coding block. For example, when a value of whRatio representing a height and width ratio of a coding block is equal to or greater than the first threshold value, vertical directional partitioning may be applied to a coding block. Otherwise, horizontal directional partitioning may be applied to a coding block.

FIG. 43 is a diagram showing an example in which a partitioning type of a coding block is determined.

For convenience of description, it is assumed that the first threshold value is 2. In an example shown in FIG. 43(a), whRatio of a coding block is 1, which is smaller than the first threshold value. Accordingly, encoding of information representing a partitioning type of a coding block may be omitted and horizontal directional partitioning may be applied to a coding block.

In an example shown in FIG. 43(b), whRatio of a coding block is 2, which is the same as the first threshold value. Accordingly, encoding of information representing a partitioning type of a coding block may be omitted and vertical directional partitioning may be applied to a coding block.

A partitioning type of a coding block may be determined by using the second threshold value whose sign is opposite to the first threshold value. In an example, when a value of whRatio is equal to or less than the second threshold value, horizontal directional partitioning may be applied to a coding block and otherwise, vertical directional partitioning may be applied to a coding block. An absolute value of the first threshold value and the second threshold value may be the same and their signs may be different. In an example, when the first threshold value is N (in this case, N is an integer such as 1, 2, 4, etc.), the second threshold value may be −N.

FIG. 44 is a diagram showing an example in which a partitioning type of a coding block is determined.

For convenience of description, it is assumed that the second threshold value is −2. In an example shown in FIG. 44(a), whRatio of a coding block is −1, which is greater than the second threshold value. Accordingly, encoding of information representing a partitioning type of a coding block may be omitted and vertical directional partitioning may be applied to a coding block.

In an example shown in FIG. 44(b), whRatio of a coding block is −2, which is the same as the second threshold value. Accordingly, encoding of information representing a partitioning type of a coding block may be omitted and horizontal directional partitioning may be applied to a coding block.

Alternatively, a partitioning type of a coding block may be determined based on the first threshold value and the second threshold value. In an example, when a value of whRatio is equal to or greater than the first threshold value, horizontal directional partitioning may be applied to a coding block and when a value of whRatio is equal to or less than the second threshold value, vertical directional partitioning may be applied to a coding block. When a value of whRatio exists between the first threshold value and the second threshold value, a partitioning type of a coding block may be determined by parsing information in a bitstream.

The first threshold value and the second threshold value may be predefined in an encoding device and a decoding device. Alternatively, the first threshold value and the second threshold value may be defined per sequence, picture or slice.

Alternatively, a partitioning type may be determined based on a size of a coding block or a transform block. In an example, when a size of a coding block is N×n, vertical directional partitioning may be applied and when a size of a coding block is n×N, horizontal directional partitioning may be applied. In this case, n may be a natural number smaller than N. N and/or n may be a predefined value in an encoding device and a decoding device. Alternatively, information for determining N and/or n may be signaled in a bitstream. In an example, N may be 32, 64, 128 or 256, etc. Accordingly, when a size of a coding block is 128×n (in this case, n is a natural number such as 16, 32 or 64, etc.), vertical directional partitioning may be applied and when a size of a coding block is n×128, horizontal directional partitioning may be applied.

Alternatively, a partitioning type of a coding block or a transform block may be determined based on an intra-prediction mode of a coding block or a transform block. In an example, when an intra-prediction mode of a coding block has a horizontal direction or has a direction similar to the horizontal direction, vertical directional partitioning may be applied to a coding block. In this case, an intra-prediction mode having a direction similar to the horizontal direction represents an intra-prediction mode (e.g., INTRA_ANGULAR18±N) that an index difference value with an intra-prediction mode in a horizontal direction (e.g., INTRA_ANGULAR18 shown in FIG. 36(b)) is equal to or less than a threshold value. On the other hand, when an intra-prediction mode of a coding block has a vertical direction or has a direction similar to the vertical direction, horizontal directional partitioning may be applied to a coding block. In this case, an intra-prediction mode having a direction similar to the vertical direction represents an intra-prediction mode (e.g., INTRA_ANGULAR50±N) that an index difference value with an intra-prediction mode in a vertical direction (e.g., INTRA_ANGULAR50 shown in FIG. 36(b)) is equal to or less than a threshold value. In this case, a threshold value N may be a predefined value in an encoding device and a decoding device. Alternatively, information for determining a threshold value N may be signaled in a sequence level, a picture level or a slice level.

FIG. 45 is a diagram showing an example in which a partitioning type of a coding block is determined based on an intra-prediction mode of a coding block.

As in an example shown in FIG. 45(a), when an intra-prediction mode of a coding block has a direction similar to a vertical direction, horizontal directional partitioning may be applied to a coding block.

On the other hand, as in an example shown in FIG. 45(b), when an intra-prediction mode of a coding block has a direction similar a horizontal to direction, vertical directional partitioning may be applied to a coding block.

Contrary to a shown example, when an intra-prediction mode of a coding block has a horizontal direction or has a direction similar to a horizontal direction, horizontal directional partitioning may be applied, and when an intra-prediction mode of a coding block has a vertical direction or has a direction similar to a vertical direction, vertical directional partitioning may be applied.

When vertical directional partitioning or horizontal directional partitioning is applied, a partitioning type of a coding block or a transform block may be determined based on whether at least one of a width or a height of a sub-block generated by partitioning a coding block or a transform block is smaller than a threshold value. In this case, a threshold value may be an integer such as 2, 4, or 8, etc.

FIG. 46 is a diagram for describing a partitioning aspect of a coding block.

If horizonal directional partitioning is applied to a 4×8 sized coding block shown in FIG. 46(a), the coding block is partitioned into 2×8 sized sub-blocks. In this case, a width of a sub-block is smaller than a threshold value, so horizontal directional partitioning may be unavailable for the coding block. On the other hand, if vertical directional partitioning is applied to a 4×8 sized coding block, the coding block is partitioned into 4×4 sized sub-blocks. As both a width and a height of a sub-block are equal to or greater than a threshold value, vertical directional partitioning may be available for the coding block. As only vertical directional partitioning is available for the coding block, encoding of information representing a partitioning type for the coding block may be omitted and vertical directional partitioning may be applied to the coding block.

If vertical directional partitioning is applied to an 8×4 sized coding block shown in FIG. 46(b), the coding block is partitioned into 8×2 sized sub-blocks. In this case, a height of a sub-block is smaller than a threshold value, so vertical directional partitioning may be unavailable for the coding block. On the other hand, if horizontal directional partitioning is applied to an 8×4 sized coding block, the coding block is partitioned into 4×4 sized sub-blocks. As both a width and a height of a sub-block are equal to or greater than a threshold value, horizontal directional partitioning may be available for the coding block. As only horizontal directional partitioning is available for the coding block, encoding of information representing a partitioning type for the coding block may be omitted and vertical directional partitioning may be applied to the coding block.

If both vertical directional partitioning and horizontal directional partitioning are available, a partitioning type of a coding block may be determined by parsing information indicating a partitioning type of a coding block.

The number of sub-blocks may be determined based on at least one of a size or a shape of a coding block or a transform block. In an example, when one of a width or a height of a coding block is 8 and the other is 4, a coding block may be partitioned into 2 sub-blocks. On the other hand, when both a width and a height of a coding block is 8 or more or when one of a width or a height of a coding block is greater than 8, a coding block may be partitioned into 4 sub-blocks. In summary, when a coding block has a 4×4 size, a coding block may not be partitioned into sub-blocks. When a coding block has a 4×8 or 8×4 size, a coding block may be partitioned into 2 sub-blocks. Otherwise, a coding block may be partitioned into 4 sub-blocks.

Alternatively, information representing a size or a shape of a sub-block or the number of sub-blocks may be signaled in a bitstream. A size or a shape of sub-blocks may be determined by information representing the number of sub-blocks. Alternatively, the number of sub-blocks may be determined by information representing a size or a shape of sub-blocks.

When a sub-partition intra encoding method is applied, sub-blocks generated by partitioning a coding block or a transform block may use the same intra-prediction mode. In an example, MPMs for a coding block may be derived based on an intra-prediction mode of neighboring blocks adjacent to a coding block and an intra-prediction mode for a coding block may be determined based on derived MPMs. When an intra-prediction mode of a coding block is determined, each sub-block may perform intra-prediction by using a determined intra-prediction mode.

When a sub-partition intra encoding method is applied, one of MPMs may be determined as an intra-prediction mode of a coding block. In other words, when a sub-partition intra encoding method is applied, an MPM flag may be inferred to be true although the MPM flag is not signaled.

Alternatively, when a sub-partition intra encoding method is applied, one of predefined candidate intra-prediction modes may be determined as an intra-prediction mode of a coding block. In an example, one of an intra-prediction mode has a horizontal direction, an intra-prediction mode has a vertical direction, an intra-prediction mode has a diagonal direction (e.g., at least one of a top-left intra-prediction mode, a top-right intra-prediction mode or a bottom-left intra-prediction mode) or a non-directional intra-prediction mode (e.g., at least one of a planar or a DC) may be determined as an intra-prediction mode of a coding block. Index information specifying one of pre-defined candidate intra-prediction modes may be signaled in a bitstream. Alternatively, according to a partitioning direction of a coding block, the number and/or type of candidate intra-prediction modes may be different. In an example, when horizontal directional partitioning is applied to a coding block, at least one of a non-directional intra-prediction mode, an intra-prediction mode has a vertical direction, an intra-prediction mode has a top-left diagonal direction or an intra-prediction mode has a top-right diagonal direction may be set as a candidate intra-prediction mode. On the other hand, when vertical directional partitioning is applied to a coding block, at least one of a non-directional intra-prediction mode, an intra-prediction mode has a horizontal direction, an intra-prediction mode has a top-left diagonal direction or an intra-prediction mode has a bottom-left diagonal direction may be set as a candidate intra-prediction mode.

According to an embodiment of the present disclosure, at least one intra-prediction mode of sub-blocks may be set differently from other sub-blocks. In an example, an intra-prediction mode of the N-th sub-block may be derived by adding or subtracting an offset to or from an intra-prediction mode of the (N−1)-th sub-block. An offset may be pre-defined in an encoding device and a decoding device. Alternatively, an offset may be derived based on at least one of a size, a shape or an intra-prediction mode of a coding block, a size or a shape of a sub-block, the number of sub-blocks or a partitioning direction of a coding block. Alternatively, information for deriving an offset may be signaled in a bitstream.

Alternatively, when an intra-prediction mode of the (N−1)-th sub-block is a non-directional mode, an intra-prediction mode of the N-th sub-block may be also set the same as an intra-prediction mode of the (N−1)-th sub-block, and when an intra-prediction mode of the (N−1)-th sub-block is a directional mode, an intra-prediction mode derived by adding or subtracting an offset to or from an intra-prediction mode of the (N−1)-th sub-block may be set as an intra-prediction mode of the N-th sub-block.

Alternatively, a directional intra-prediction mode may be applied to part of a plurality of sub-blocks and a non-directional intra-prediction mode may be applied to the rest. A sub-block to which a non-directional intra-prediction mode is applied may be determined by considering at least one of a size, a shape or a position of a sub-block or the number of sub-blocks.

Alternatively, only when a directional intra-prediction mode applied to one of a plurality of sub-blocks is a predefined value, a non-directional intra-prediction mode may be applied to another.

Alternatively, an intra-prediction mode of each sub-block may be derived from MPMs. For it, index information specifying any one of MPMs may be signaled for each sub-block.

Alternatively, an intra-prediction mode of each sub-block may be derived from predefined candidate intra-prediction modes. For it, index information specifying any one of predefined candidate intra-prediction modes may be signaled for each sub-block. The number and/or type of candidate intra-prediction modes may be set differently per sub-block.

Alternatively, information representing whether an intra-prediction mode of sub-blocks is set the same may be signaled in a bitstream.

A quantization parameter of sub-blocks may be individually determined. Accordingly, a value of a quantization parameter of each sub-block may be set differently. Information representing a difference value with a quantization parameter of a previous sub-block may be encoded to determine a quantization parameter of each sub-block. In an example, for the N-th sub-block, a different value between a quantization parameter of the N-th sub-block and a quantization parameter of the (N−1)-th sub-block may be encoded.

Intra-prediction of a sub-block may be performed by using a reference sample. In this case, a reference sample may be derived from a reconstructed sample of a neighboring block adjacent to a sub-block. When a neighboring block adjacent to a sub-block is another sub-block included in the same coding block as the sub-block, a reference sample of the sub-block may be derived based on a reconstructed sample of the other sub-block. In an example, when the first sub-block is positioned at the left or the top of the second sub-block, a reference sample of the second sub-block may be derived from a reconstructed sample of the first sub-block. For it, parallel intra-prediction may not be applied between sub-blocks. In other words, encoding/decoding may proceed sequentially f sub-blocks included in a coding block. Accordingly, after encoding/decoding of the first sub-block is completed, intra-prediction for the second sub-block may be performed.

When a sub-partition intra encoding method is applied, it may be set not to use a multi-line intra-prediction encoding method selecting any one of a plurality of reference sample line candidates. When a multi-line intra-prediction encoding method is not used, an adjacent reference sample line adjacent to each sub-block may be determined as a reference sample line of each sub-block. Alternatively, when an index of a reference sample line of a current block is greater than 0, encoding of a syntax element, intra_subpartitions_mode_flag, representing a whether sub-partition intra encoding method is applied, may be omitted. When encoding of a syntax, intra_subpartitions_mode_flag, is omitted, a sub-partition intra encoding method may not be applied.

Alternatively, although a sub-partition intra encoding method is applied, a multi-line intra-prediction encoding method may be used. For it, index information for specifying a reference sample line may be signaled for each sub-block. Alternatively, index information for specifying a reference sample line may be signaled only for any one of a plurality of sub-blocks and the index information may also be applied to remaining sub-blocks. Alternatively, index information for specifying a reference sample line may be signaled for a coding block and a plurality of sub-blocks included in the coding block may share the index information.

Alternatively, a multi-line intra-prediction encoding method may be used only for a sub-block at a pre-defined position or a sub-block having a predefined partition index among sub-blocks. In an example, index information specifying any one of reference sample line candidates may be signaled only for a sub-block whose partition index is 0 or a sub-block adjoining a top boundary or a left boundary of a coding block among a plurality of sub-blocks. A multi-line intra-prediction encoding method may not be applied to remaining sub-blocks. Accordingly, remaining sub-blocks may perform intra-prediction by using an adjacent reference sample line.

A prediction encoding mode may be set differently per sub-block. In an example, intra-prediction may be applied to some sub-blocks and an inter-prediction, current picture referencing or combined prediction may be applied to other sub-blocks.

FIG. 47 is a diagram showing an example in which a prediction encoding mode is differently set per sub-block.

An intra-prediction mode or a prediction encoding mode may be set differently for each sub-block. For instance, an example shown in FIG. 47 showed that intra-prediction is applied to a sub-block 0 and a sub-block 1, and current picture referencing is applied to a sub-block 1 and a sub-block 2.

When current picture referencing is used, a prediction block of a sub-block may be derived from an already-decoded region of a current picture or a slice (or a tile group). When current picture referencing is applied, a motion vector may be derived to specify a prediction block of a sub-block. A motion vector under current picture referencing may be referred to as 'a block vector'.

A motion vector may be derived based on a motion vector of a neighboring block adjacent to a coding block or a sub-block. Alternatively, information for determining a motion vector may be signaled in a bitstream.

In this case, the maximum value of a motion vector of a sub-block may be determined according to a size of a sub-block, or a size of a coding block or a transform block to which a sub-block belongs. In an example, a motion vector of a sub-block may be set not to be out of the boundary of a coding block or a transform block to which a sub-block belongs. In other words, a prediction block of a sub-block may be derived from a region which is encoded/decoded before the sub-block in a coding block to which a sub-block belongs.

Instead of a motion vector, index information representing any one of pre-decoded sub-blocks in a coding block may be encoded and signaled. A prediction block of a sub-block may be determined as a pre-decoded sub-block specified by index information.

In another example, a motion vector of a sub-block may be allowed to be out of the boundary of a coding block or a transform block to which a sub-block belongs.

When a prediction block is generated as a result of intra-prediction, prediction samples may be updated based on each position of prediction samples included in a prediction block. Such an update method may be referred to as a sample position-based intra weighting prediction method (or, Position Dependent Prediction Combination, PDPC).

Whether PDPC is used may be determined considering a size, a shape or an intra-prediction mode of a current block, a reference sample line of a current block, a size of a current block or a color component. In an example, PDPC may be used when the intra-prediction mode of a current block is at least one of a planar, DC, a vertical direction, a horizontal direction, a mode with an index value smaller than a vertical direction or a mode with an index value larger than a horizontal direction. Alternatively, PDPC may be used only when at least one of a width or height of a current block is greater than 4. Alternatively, PDPC may be used only when the index of a reference picture line of a current block is 0. Alternatively, PDPC may be used only when the index of a reference picture line of a current block is over the pre-defined value. Alternatively, PDPC may be used only for a luminance component. Alternatively, Whether PDPC is used may be determined according to whether more than 2 of the above-enumerated conditions are satisfied.

Alternatively, based on whether a sub-partition intra encoding method is used or not, whether PDPC is used or not may be determined. In an example, when a sub-partition intra encoding method is applied to a coding block or a transform block, PDPC may be set not to be used. Alternatively, when a sub-partition intra encoding method is applied to a coding block or a transform block, PDPC may be applied to at least one of a plurality of sub-blocks. In this case, a sub-block which is a target of PDPC may be determined based on at least one of a size, a shape, a position, an intra-prediction mode or a reference sample line index of a coding block or a sub-block. In an example, PDPC may be applied to a sub-block adjacent to the top and/or left boundary of a coding block, or a sub-block adjacent to the bottom and/or right boundary of a coding block. Alternatively, based on a size or a shape of a sub-block, it may be set to apply PDPC to all sub-blocks included in a coding block, or not to apply PDPC to all sub-blocks included in a coding block. In an example, when at least one of a width or a height of a sub-block is smaller than a threshold value, application of PDPC may be omitted. In another example, PDPC may be applied to all sub-blocks in a coding block.

Alternatively, based on whether at least one of a size, a shape, an intra-prediction mode or a reference picture index of sub-blocks generated by partitioning a coding block or a transform block satisfies a preset condition or not, whether PDPC is applied or not may be determined for each sub-block. In an example, when at least one of a width or a height of a sub-block is greater than 4, PDPC may be applied to a sub-block.

In another example, information showing whether PDPC is applied may be signaled in a bitstream.

Alternatively, based on at least one of a size, a shape or an intra-prediction mode of a current block, or a position of a prediction sample, a region to which PDPC is applied may be determined. In an example, when an intra-prediction mode of a current block has an index greater than a vertical direction, a prediction sample that at least one of an x-axis coordinate or a y-axis coordinate is greater than a threshold value may not be corrected and only a prediction sample that an x-axis coordinate or a y-axis coordinate is equal to or less than a threshold value may be corrected. Alternatively, when an intra-prediction mode of a current block has an index smaller than a horizontal direction, a prediction sample that at least one of an x-axis coordinate or a y-axis coordinate is greater than a threshold value may not be corrected and only a prediction sample that an x-axis coordinate or a y-axis coordinate is equal to or less than a threshold value may be corrected. In this case, a threshold t value may be determined based on at least one of a size, a shape or an intra-prediction mode of a current block.

When a prediction sample is obtained through an intra-prediction sample, a reference sample used to correct the prediction sample may be determined based on the position of the obtained prediction sample. For the convenience of explanation, a reference sample used to correct a prediction sample is referred to as a PDPC reference sample in the embodiment described later. In addition, a prediction sample obtained by intra-prediction is referred to as a first prediction sample and a prediction sample obtained by correcting the first prediction sample is referred to as a second prediction sample.

FIG. 48 is a diagram showing the application aspect of PDPC.

With at least one PDPC reference sample, the first prediction sample may be corrected. A PDPC reference sample may include at least one of a reference sample adjacent to the left-top corner of a current block, a top reference sample positioned at the top of a current block or a left reference sample positioned at the left of a current block.

At least one of reference samples belonging to the reference sample line of a current block may be set as a PDPC reference sample. Alternatively, regardless of a reference sample line of a current block, at least one of reference samples belonging to a reference sample line that an index is 0 may be set as a PDPC reference sample. In an example, although the first prediction sample is obtained by using a reference sample included in a reference sample line that an index is 1 or 2, the second prediction sample may be obtained by using a reference sample included in a reference sample line that an index is 0.

The number or position of PDPC reference samples used to correct the first prediction sample may be determined considering at least one of intra-prediction mode of a current block, a size of a current block, a shape of a current block or a position of the first prediction sample.

In an example, when the intra-prediction mode of a current block is a planar or a DC mode, the second prediction sample may be obtained by using a top reference sample and a left reference sample. In this connection, a top reference sample may be a reference sample vertical to the first prediction sample (e.g. a reference sample with the same x-coordinate) and a left reference sample may be a reference sample horizontal to the first prediction sample (e.g. a reference sample with the same y-coordinate).

When the intra-prediction mode of a current block is a horizontal directional intra-prediction mode, the second prediction sample may be obtained by using a top reference sample. In this connection, a top reference sample may be a reference sample vertical to the first prediction sample.

When the intra-prediction mode of a current block is a vertical directional intra-prediction mode, the second prediction sample may be obtained by using a left reference sample. In this connection, a left reference sample may be a reference sample horizontal to the first prediction sample.

When the intra-prediction mode of a current block is a left-bottom diagonal directional or a right-top diagonal directional intra-prediction mode, the second prediction sample may be obtained based on a left-top reference sample, a top reference sample and a left reference sample. A left-top reference sample may be a reference sample adjacent to the left-top corner of a current block (e.g. a reference sample positioned at (−1, −1)). A top reference sample may be a reference sample positioned at the right-top diagonal direction of the first prediction sample and a left reference sample may be a reference sample positioned at the left-bottom diagonal direction of the first prediction sample.

In summary, when the first prediction sample is positioned at (x, y), R (−1, −1) may be set as a left-top reference sample and R (x+y+1, −1) or R(x, −1) may be set as a top reference sample. In addition, R (−1, x+y+1) or R (−1, y) may be set as a left reference sample.

After performing intra-prediction for a current block, a residual sample may be obtained by subtracting a prediction sample from an original sample of a current block. In this case, a derived difference may be encoded after deriving a difference between a residual sample and a neighboring residual sample, instead of encoding the residual sample as it is.

For example, after subtracting a residual sample which belongs to the first line and a residual sample which belongs to the second line, then the subtracted residual value may be encoded instead of encoding the residual which belongs to the second line at it is. In this case, for the first line and the second line, at least one of an x-axis coordinate or a y-axis coordinate may be different. An encoding device may encode a residual difference value or a transform coefficient generated by transforming a residual difference value.

A decoding device may set a residual sample which belongs to the first line as a residual prediction value for the second residual sample and derive the second residual sample by adding a decoded residual difference value to a residual prediction value.

As above, performing encoding/decoding based on a residual difference value after subtracting residual samples may be referred to as intra BDPCM (Block-based Delta Pulse Code Modulation). Intra BDPCM may be used only when a prediction encoding mode of a current block is determined by intra-prediction.

When intra BDPCM is applied, a prediction sample of a current block may be set to be 0. In other words, when intra BDPCM is applied, a residual sample may be set as a reconstructed sample.

Alternatively, when intra BDPCM is applied, a prediction sample of a current block may be derived based on intra-prediction. In this case, an intra-prediction mode of a current block may be determined according to an intra BDPCM direction. In an example, when an intra BDPCM direction is horizontal, a prediction sample may be obtained based on an intra-prediction mode of a horizontal direction. When an intra BDPCM direction is vertical, a prediction sample may be obtained based on an intra-prediction mode of a vertical direction.

Alternatively, a prediction sample of a current block may be derived by using a default intra-prediction mode. A default intra-prediction mode may be one of a DC, a planar, a horizontal or a vertical direction. A default intra-prediction mode may be predefined in an encoding device and a decoding device. Alternatively, an intra-prediction mode may be derived from one of a plurality of MPM candidates.

When intra BDPCM is applied to a current block, it may be forced to use an adjacent reference sample line. In other words, signaling of index information specifying one of reference sample lines may be omitted and a prediction sample may be obtained by using an adjacent reference sample line.

When an intra BDPCM method is applied, information for determining an intra BDPCM direction may be signaled in a bitstream. In an example, a flag, intra_bdpcm_dir_flag, representing an intra BDPCM direction may be signaled in a bitstream. When a syntax, intra_bdpcm_dir_flag, is 0, it represents that BDPCM in a horizontal direction is applied and when a syntax, intra_bdpcm_dir_flag, is 1, it represents that BDPCM in a vertical direction is applied.

Alternatively, based on a size or a shape of a current block, an intra BDPCM direction may be determined. In an example, when a current block has a non-square shape whose a width is greater than a height, BDPCM in a horizontal direction may be applied. On the other hand, when a current block has a non-square shape whose a height is greater than a width, BDPCM in a vertical direction may be applied.

Alternatively, an intra BDPCM direction may be determined based on intra-prediction modes of neighboring blocks adjacent to a current block. In an example, when an intra-prediction mode of at least one of left and top blocks of a current block has a horizontal direction or has a direction similar to it, BDPCM in a horizontal direction may be applied to a current block. In this case, a direction similar to a horizontal direction means an intra-prediction mode that a difference with an intra-prediction mode of a horizontal direction is equal to or less than a threshold value. Alternatively, when an intra-prediction mode of at least one of left and top blocks of a current block has a vertical direction or has a direction similar to it, BDPCM in a vertical direction may be applied to a current block. In this case, a direction similar to a vertical direction means an intra-prediction mode that a difference with an intra-prediction mode of a vertical direction is equal to or less than a threshold value.

When BDPCM in a horizontal direction is applied, a difference value between a residual sample and a neighboring residual sample adjacent to the top of the residual sample may be encoded. A decoding device may derive a residual sample by adding a top residual sample to a decoded difference value.

When BDPCM in a vertical direction is applied, a difference value between a residual sample and a neighboring residual sample adjacent to the left of the residual sample may be encoded. A decoding device may derive a residual sample by adding a left residual sample to a decoded difference value.

Alternatively, non-directional BDPCM may be applied. In an example, DC BDPCM represents that a difference between a neighboring residual sample and an average value of residual samples is encoded/decoded. Planar BDPCM represents that a result of an average or a weighted sum of a horizontal directional difference value which represents a difference between a residual sample and a residual sample positioned in a horizontal direction of the residual sample, and a vertical directional difference value which represents a difference between a residual sample and a residual sample positioned in a vertical direction of the residual sample, is encoded/decoded.

Information for specifying an available BDPCM mode may be signaled in a bitstream. The information may be information representing whether non-directional BDPCM is applied or information for specifying any one of a plurality of BDPCM candidates which may be applied to a current block.

Information representing whether intra BDPCM will be applied to a current block may be signaled in a bitstream. In an example, a flag, intra_bdpcm_flag, may be signaled in a bitstream. When a syntax, intra_bdpcm_flag, is 1, it represents that intra BDPCM is applied to a current block. When a syntax, intra_bdpcm_flag, is 0, it represents that intra BDPCM is not applied to a current block.

Information representing availability of intra BDPCM may be signaled in a picture level or a sequence level. In an example, a flag, sps_intra_bdpcm_flag, representing availability of intra BDPCM, may be signaled in a sequence parameter set (SPS). When a syntax, sps_intra_bdpcm_flag, is 1, it represents that pictures referring to a sequence parameter set may use intra BDPCM. When a syntax, sps_intra_bdpcm_flag, is 0, it represents that pictures referring to a sequence parameter set may not use intra BDPCM. intra_bdpcm_flag representing whether intra BDPCM is applied to a current block may be signaled only when sps_intra_bdpcm_flag is 1.

When intra BDPCM is applied to a current block, it may be set not to use PDPC.

When intra BDPCM is applied to a current block, it may be forced to skip a transform. In other words, when intra BDPCM is applied to a current block, although transform_skip_flag indicating whether transform skip is applied is not signaled, a value of it may be inferred to be 1.

A flag representing whether a regular intra mode is used may be signaled in a bitstream. Under a regular intra-prediction mode, at least one of whether matrix-based intra-prediction is used, an index of a reference sample line, whether intra BDPCM is used, whether a sub-partition intra encoding method is used or an intra-prediction mode may be set as a default value. Accordingly, when a regular intra-prediction mode is applied to a current block, encoding/decoding at one a of least of flag, intra_mip_flag, representing whether matrix-based intra-prediction is used, an index, intra_luma_ref_idx, representing an index of a reference sample line, a flag, intra_bdpcm_flag, representing whether intra BDPCM is used, a flag, intra_subpartitions_mode_flag, representing whether a sub-partition intra encoding method is used, or a flag, mpm_flag, for determining an intra-prediction mode may be omitted.

Concretely, a case which corresponds to at least one of a case in which matrix-based intra-prediction is not applied, a case in which a sub-partition intra encoding method is not applied, a case in which intra BDPCM is not applied, a case in which only an adjacent reference sample line is used or a case in which a predefined intra-prediction mode is used may be defined as a regular intra mode.

In an example, general intra-prediction that matrix-based intra-prediction and a sub-partition intra encoding method are not applied and an adjacent reference sample line is used may be defined as a regular intra mode. In this case, under a regular intra mode, one of 67 intra-prediction modes is selectively used.

In addition, when it is determined to apply a regular intra mode to a current block, encoding/decoding of a flag, intra_mip_flag, representing whether matrix-based intra-prediction is used, an index, intra_luma_ref_idx, representing an index of a reference sample line, and a flag, intra_subpartitions_mode_flag, representing whether a sub-partition intra encoding method is used may be omitted and a value thereof may be set to 0.

Table 9 represents a syntax table including a flag, regular_intra_flag, representing whether a regular intra mode is applied.

TABLE 9

|  | Descriptor |
|---|---|
| coding_unit( x0, y0, cbWidth, cbHeight, treeType ) { <br> ... <br> if ( CuPredMode[ x0 ][ y0 ] = = MODE_INTRA ) { <br>   if( sps_pcm_enabled_flag && <br>     cbWidth >= MinIpcmCbSizeY && cbWidth <- MaxIpcmCbSizeY && <br>     cbHeight >= MinIpcmCbSizeY && cbHeight <= MaxIpcmCbSizeY ) <br>     pcm_flag[ x0 ][ y0 ] | ae(v) |
|   if( pcm_flag[ x0 ] [ y0 ] ) <br>     while ( !byte_aligned ( ) ) <br>       pcm_alignment_zero_bit | f(1) |
|     pcm_sample ( cbWidth, cbHeight, treeType) <br>   } else { <br>     if ( treeType = = SINGLE_TREE \|\| treeType = = DUAL_TREE_LUMA ) { <br>       regular_intra_flag[ x0 ][ y0 ] | ae(v) |
|       if (regular_intra_flag) { <br>         intra_luma_mpm_flag[ x0 ] [ y0 ] | ae(v) |
|         if( intra_luma_mpm_flag[ x0 ][ y0 ] ) { <br>           intra_luma_not_planar_flag[ x0 ][ y0 ] | ae(v) |
|           if( intra_luma_not_planar_flag[ x0 ][ y0 ] ) <br>             intra_luma_mpm_idx[ x0 ][ y0 ] | ae(v) |
|         } else <br>           intra_luma_mpm_remainder[ x0 ][ y0 ] | ae(v) |
|       } <br>       else { <br>         if( cbWidth <= 32 && cbHeight <= 32 ) <br>           intra_bdpcm_flag[ x0 ][ y0 ] | ae(v) |
|         if( intra_bdpcm_flag[ x0 ][ y0 ] ) <br>           intra_bdpcm_dir_flag [ x0 ][ y0 ] | ae(v) |
|         else { <br>           if( ( Abs( Log2( cbWidth ) - Log2( cbHeight ) ) <= 2 ) && <br>             cbWidth <= MaxTbSizeY && cbHeight <= MaxTbSizeY ) <br>             intra_mip_flag[ x0 ][ y0 ] | ae(v) |
|           if ( intra_mip_flag[ x0 ] [ y0 ] ) { <br>             intra_mip_mpm_flag[ x0 ] [ y0 ] | ae(v) |
|             if( intra_mip_mpm_flag[ x0 ] [ y0 ] ) <br>               intra_mip_mpm_idx[ x0 ][ y0 ] | ae(v) |
|             else <br>               intra_mip_mpm_remainder[ x0 ][ y0 ] | ae(v) |
|           } else { <br>             if ( sps_mrl_enabled_flag && ( ( y0 % CtbSizeY ) > 0 ) ) <br>               intra_luma_ref_flag[ x0 ][ y0 ] | u(1) |
|             if ( sps_isp_enabled_flag && intra_luma_ref_idx[ x0 ][ y0 ] = = 0 && <br>               ( cbWidth <= MaxTbSizeY && cbHeight <= MaxTbSizeY ) && <br>               ( cbWidth * cbHeight > MinTbSizeY * MinTbSizeY ) ) <br>                 intra_subpartitions_mode_flag[ x0 ][ y0 ] | ae(v) |
|             if ( intra_subpartitions_mode_flag[ x0 ][ y0 ] = = 1 && <br>               cbWidth <= MaxTbSizeY && cbHeight <= MaxTbSizeY ) <br>               intra_subpartitions_split_flag[ x0 ] [ y0 ] | ae(v) |
| ... <br>       } <br>     } <br> ... <br>   } <br> ... <br> } | |

When a syntax, regular_intra_flag, is 1, it represents that a regular intra mode is applied to a current block. When a syntax, regular_intra_flag, is 0, it represents that a regular intra mode is not applied to a current block.

Only when a syntax, regular_intra_flag, is 0, intra_mip_flag, intra_luma_ref_idx and/or intra_subpartitions_mode_flag may be signaled.

In another example, matrix-based intra-prediction and intra-prediction which does not use intra BDPCM may be defined as a regular intra mode. In this case, under a regular intra mode, one of 67 intra-prediction modes may be selectively used, one of a plurality of reference sample lines may be selectively used and a sub-partition intra encoding method may be selectively applied.

In addition, when a regular intra mode is determined to be applied to a current block, encoding/decoding of a flag, intra_mip_flag, representing whether matrix-based intra-prediction is used may be omitted and a value thereof may be set to 0.

Table 10 represents a syntax table including a flag, regular_intra_flag, representing whether a regular intra mode is applied.

TABLE 10

| | Descriptor |
|---|---|
| coding_unit( x0, y0, cbWidth, cbHeight, treeType ) { <br> ... <br>   if ( CuPredMode[ x0 ][ y0 ] = = MODE_INTRA ) { <br>     if( sps_pcm_enabled_flag && <br>       cbWidth >= MinIpcmCbSizeY && cbWidth <= MaxIpcmCbSizeY && <br>       cbHeight >= MinIpcmCbSizeY && cbHeight <= MaxIpcmCbSizeY ) <br>       pcm_flag[ x0 ][ y0 ] | ae(v) |
|     if( pcm_flag[ x0 ][ y0 ] ) { <br>       while ( !byte_aligned ( ) ) <br>         pcm_alignment_zero_bit | f (1) |
|       pcm_sample ( cbWidth, cbHeight, treeType) <br>     } else { <br>       if ( treeType = = SINGLE_TREE \|\| treeType = = DUAL_TREE_LUMA ) { <br>         regular_intra_flag[ x0 ][ y0 ] | ae(v) |
|         if (regular_intra_flag) { <br>           if ( sps_mrl_enabled_flag && ( ( y0 % CtbSizeY ) > 0 ) ) <br>             intra_luma_ref_idx[ x0 ][ y0 ] | ae(v) |
|           if ( sps_isp_enabled_flag && intra_luma_ref_idx[ x0 ][ y0 ] = = 0 && <br>             ( cbWidth <= MaxTbSizeY && cbHeight <= MaxTbSizeY ) && <br>             ( cbWidth * cbHeight > MinTbSizeY * MinTbSizeY ) ) <br>             intra_subpartitions_mode_flag[ x0 ][ y0 ] | ae(v) |
|           if ( intra subpartitions mode flag[ x0 ] [ y0 ] = = 1 && <br>             cbWidth <= MaxTbSizeY && cbHeight <= MaxTbSizeY ) <br>             intra_subpartitions_split_flag[ x0 ][ y0 ] | ae(v) |
|           if( intra_luma_ref_idx[ x0 ][ y0 ] = = 0 && <br>             intra_subpartitions_mode_flag[ x0 ][ y0 ] = = 0 ) <br>             intra_luma_mpm_flag[ x0 ][ y0 ] | ae(v) |
|           if( intra_luma_mpm_flag[ x0 ][ y0 ] ) { <br>             if( intra_luma_ref_idx[ x0 ][ y0 ] = = 0 ) <br>               intra_luma_not_planar_flag[ x0 ][ y0 ] | ae(v) |
|             if ( intra_luma_not_planar_flag[ x0 ][ y0 ] ) <br>               intra_luma_mpm_idx[ x0 ][ y0 ] | ae(v) |
|           } else <br>             intra_luma_mpm_remainder[ x0 ][ y0 ] | ae(v) |
|         } else { <br>           if ( treeType = = SINGLE_TREE \|\| treeType = = DUAL_TREE_LUMA ) <br>             if( cbWidth <= 32 && cbHeight <= 32 ) <br>               intra_bdpcm_flag[ x0 ][ y0 ] | ae(v) |
|             if( intra_bdpcm_flag[ x0 ][ y0 ] ) <br>               intra_bdpcm_dir_flag [ x0 ] [ y0 ] | ae (v) |
|           } else { <br>             if( sps_mip_enabled_flag && <br>             ( Abs( Log2( cbWidth ) – Log2 ( cbHeight ) ) <= 2 ) && <br>             cbwidth <= MaxTbSizeY && cbHeight <= MaxTbSizeY ) <br>               intra_mip_flag[ x0 ][ y0 ] | ae(v) |
|             if ( intra_mip_flag[ x0 ][ y0 ] ) { <br>               intra_mip_mpm_flag[ x0 ] [ y0 ] | ae(v) |
|               if ( intra_mip_mpm_flag[ x0 ] [ y0 ] ) <br>                 intra_mip_mpm_idx[ x0 ][ y0 ] | ae(v) |
|               else <br>                 intra_mip_mpm_remainder [ x0 ] [ y0 ] | ae(v) |
|             } <br>         } <br>       } <br> ... <br>     } <br>   } <br> ... <br> } | |

When a regular intra mode is applied to a current block, encoding/decoding of a flag, intra_bdpcm_flag, representing whether intra BDPCM is used may be also omitted.

Table 11 represents a syntax table including a flag, regular_intra_flag, representing whether a regular intra mode is applied.

TABLE 11

|  | Descriptor |
|---|---|
| coding_unit( x0, y0, cbWidth, cbHeight, treeType ) { | |
| ... | |
|   if ( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ] [ y0 ] | ae(v) |
|     if( pcm_flag[ x0 ][ y0 ] ) { | |
|       while ( !byte_aligned( ) ) | |
|         pcm_alignment_zero_bit | f(1) |
|       pcm_sample( cbWidth, cbHeight, treeType) | |
|     } else { | |
|       if ( treeType = = SINGLE TREE || treeType = DUAL_TREE_LUMA } { | |
|         regular intra flag[ x0 ]{ y0 ] | ae(v) |
|         if (regular_intra_flag) { | |
|           if ( sps_mrl_enabled_flag && ( ( y0 % CtbSizeY ) > 0 ) ) | |
|             intra_luma_ref_idx[ x0 ][ y0 ] | ae(v) |
|           if ( sps_isp_enabled_flag && intra_luma_ref_idx[ x0 ][ y0 ] = = 0 && | |
|             ( cbWidth <= MaxTbSizeY && cbHeight <= MaxTbSizeY ) && | |
|             ( cbWidth * cbHeight > MinTbSizeY * MinTbSizeY ) ) | |
|             intra_subpartitions_mode_flag[ x0 ][ y0 ] | ae(v) |
|           if( intra_subpartitions_mode_flag[ x0 ][ y0 ] = = 1 && | |
|             cbWidth <= MaxTbSizeY && cbHeight <= MaxTbSizeY ) | |
|             intra_subpartitions_split_flag[ x0 ][ y0 ] | ae(v) |
|           if ( intra_luma_ref_idx[ x0 ][ y0 ] = = 0 && | |
|             intra_subpartitions_mode_flag[ x0 ][ y0 ] = = 0 ) | |
|             intra_luma_mpm_flag[ x0 ][ y0 ] | ae(v) |
|           if( intra_luma_mpm_flag[ x ][ y0 ] ) { | |
|             if ( intra_luma_ref_idx[ x0 ][ y0 ] = = 0 ) | |
|               intra_luma_not_planar_flag[ x0 ][ y0 ] | ae(v) |
|             if ( intra_luma_not_planar_flag[ x0 ][ y0 ] ) | |
|               intra_luma_mpm_idx[ x0 ][ y0 ] | ae(v) |
|           } else | |
|             intra_luma_mpm_remainder[ x0 ][ y0 ] | ae(v) |
|         } else { | |
|           if ( sps_mip_enabled_flag && | |
|           ( Abs( Log2( cbWidth ) − Log2( cbHeight ) ) <= 2 ) && | |
|           cbWidth <= MaxTbSizeY && cbHeight <= MaxTbSizeY ) | |
|             intra_mip_flag[ x0 ] [ y0 ] | ae(v) |
|           if ( intra_mip_flag[ x0 ][ y0 ] ) { | |
|             intra_mip_mpm_flag[ x0 ] [ y0 ] | ae(v) |
|             if ( intra_mip_mpm_flag[ x0 ] [ y0 ] ) | |
|               intra_mip_mpm_idx[ x0 ] [ y0 ] | ae(v) |
|             else | |
|               intra_mip_mpm_remainder[ x0 ][ y0 ] | ae(v) |
|         } else { | |
|           if ( treeType = = SINGLE_TREE || treeType = = DUAL_TREE_LUMA ) { | |
|             if( cbWidth <= 32 && cbHeight <= 32 ) | |
|               intra_bdpcm_flag[ x0 ][ y0 ] | ae(v) |
|             if( intra_bdpcm_flag[ x0 ][ y0 ] ) | |
|               intra_bdpcm_dir_flag [ x0 ][ y0 ] | ae(v) |
|         } | |
| ... | |
|     } | |
|   } | |
| ... | |
|   } | |
| ... | |
| } | |

Based on at least one of a size or a shape of a current block, availability of a regular intra mode may be determined. In an example, only when a current block is non-square and/or when a size of a current block is equal to or less than a threshold value, a regular intra mode may be determined to be available. When a regular intra mode is available for a current block, a syntax, regular_intra_flag, may be signaled in a bitstream. On the other hand, when a current block may not use a regular intra mode, signaling of a syntax, regular_intra_flag, may be omitted and a value thereof may be set to 0.

A residual image may be derived by subtracting a prediction image from an original image. In this connection, when the residual image is converted into a frequency domain, even though high frequency components are removed from frequency components, subjective image quality of the image does not drop significantly. Accordingly, when values of high frequency components are transformed into small values, or when values of high frequency components are set to 0, compression efficiency may be increased without causing large visual distortion. Reflecting the above feature, transform may be performed on a current block so as to decompose a residual image to two-dimensional frequency components. The transform may be performed by using transform methods such as DCT (discrete cosine transform), DST (discrete sine transform), etc.

DCT is to decompose (or transform) a residual image into a two-dimensional frequency component by using cosine transform and DST is to compose (or transform) a residual image into a two-dimensional frequency component by using sine transform. As a result of transforming a residual image, frequency components may be represented as a base image. In an example, when DCT transform is performed for a N×N sized block, $N^2$ basic pattern components may be obtained. A size of each of basic pattern components included in a N×N sized block may be obtained through transform. According to a used transform method, a size of a basic pattern component may be referred to as a DCT coefficient or a DST coefficient.

A transform method DCT is mainly used to transform an image that a lot of non-zero low frequency components are distributed. A transform method DST is mainly used for an image that a lot of high frequency components are distributed.

It is also possible to transform a residual image by using a transform method other than DCT or DST.

Hereinafter, transforming a residual image into two-dimensional frequency components is referred to as two-dimensional image transform. In addition, a size of basic pattern components obtained by transform is referred to as a transform coefficient. In an example, a transform coefficient may mean a DCT coefficient or a DST coefficient. When both the after-described first transform and second transform are applied, a transform coefficient may mean a basic pattern component generated by a result of the second transform. In addition, a residual sample to which transform skip is applied is also referred to as a transform coefficient.

A transform method may be determined in a unit of a block. A transform method may be determined based on at least one of a prediction encoding mode of a current block, a size of a current block or a shape of a current block. In an example, when a current block is encoded by an intra-prediction mode and a size of a current block is smaller than N×N, transform may be performed by using a DST transform method. On the other hand, when the condition is not satisfied, transform may be performed by using a DCT transform method.

Two-dimensional image transform may not be performed for some blocks of a residual image. Not performing two-dimensional image transform may be referred to as transform skip. When transform skip is applied, quantization may be applied to residual values for which transform is not performed.

Whether transform skip is allowed for a current block may be determined based on at least one of a size or a shape of a current block. In an example, only when a size of a current block is smaller than a threshold value, transform skip may be applied. The threshold value is related to at least one of a width, a height or the number of samples of a current block, and may be defined as 32×32, etc. Alternatively, transform skip may be allowed only for a square block. In an example, transform skip may be allowed for a 32×32, 16×16, 8×8 or 4×4 sized square block. Alternatively, only when a sub-partition intra encoding method is not used, transform skip may be allowed.

After performing transform on a current block by using DCT or DST, transform may be performed again on the transformed current block. In this connection, transform based on DCT or DST may be defined as first transform, and performing transform again on a block to which first transform is applied may be defined as second transform.

First transform may be performed by using any one of a plurality of transform core candidates. In an example, first transform may be performed by using any one of DCT2, DCT8, or DST7.

Different transform cores may be used for a horizontal direction and a vertical direction. Information representing a combination of a transform core of a horizontal direction and a transform core of a vertical direction may be signaled in a bitstream.

A processing unit of first transform may differ with second transform. In an example, first transform may be performed on an 8×8 block, and second transform may be performed on a 4×4 sized sub-block within the transformed 8×8 block. Alternatively, the second transform may be performed for transform coefficients which belong to three 4×4 sized sub-blocks. The three sub-blocks may include a sub-block positioned at the top-left of a current block, a sub-block neighboring the right of the sub-block and a sub-block neighboring the bottom of the sub-block. Alternatively, the second transform may be performed for an 8×8 sized block.

It is also possible that transform coefficients in a remaining region on which the second transform is not performed may be set to 0.

Alternatively, first transform may be performed on a 4×4 block, and second transform may be performed on a region having an 8×8 size including the transformed 4×4 block.

Information representing whether or not to perform second transform may be signaled in a bitstream. In an example, a flag representing whether the second transform is performed or not, or index information specifying whether the second transform is performed or not and a transform kernel used for the second transform may be signaled. In an example, when the index information is 0, it represents that the second transform is not performed for a current block. On the other hand, when the index information is greater than 0, a transform kernel for the second transform may be determined by the index information.

Alternatively, whether to perform the second transform may be determined based on whether a horizontal directional transform core and a vertical directional transform core are identical with each other. In one example, the second transform may be performed only when the horizontal directional transform core and the vertical directional transform core are identical with each other. Alternatively, the second transform may be performed only when the horizontal directional transform core and the vertical directional transform core are different from each other.

Alternatively, the second transform may be allowed only when a predefined transform core is used for the horizontal directional transform and the vertical directional transform. In one example, when a DCT2 transform core is used for in the horizontal directional transform and the vertical directional transform, the second transform may be allowed. Alternatively, when a sub-partition intra encoding method is applied to a current block, the second transform may be allowed only when a DCT2 transform core is used for a horizontal directional transform and a vertical directional transform.

Alternatively, it may be determined whether to perform the second transform based on the number of non-zero transform coefficients of the current block. In one example, when the number of the non-zero transforms coefficient of the current block is smaller than or equal to a threshold, the prediction method may be configured not to use the second transform. When the number of the non-zero transform coefficients of the current block is greater than the threshold, the prediction method may be configured to use the second transform. As long as the current block is encoded using intra prediction, the prediction method may be configured to use the second transform.

Alternatively, whether the second transform is performed or not may be determined based on a position of the last non-zero transform coefficient of a current block. In an example, when at least one of an x-axis coordinate or a y-axis coordinate of the last non-zero transform coefficient of a current block is greater than a threshold value, or when at least one of an x-axis coordinate or a y-axis coordinate of a sub-block to which the last non-zero transform coefficient of a current block belongs is greater than a threshold value, the second transform may not be performed. In this case, a threshold value may be predefined in an encoding device and a decoding device. Alternatively, a threshold value may be determined based on a size or a shape of a current block.

Alternatively, when only a transform coefficient of a DC component exists in a current block, it may be set not to perform the second transform. In this case, a DC component represents a transform coefficient at a top-left position in a current block.

Alternatively, when matrix-based intra-prediction is applied to a current block, it may be set not to perform the second transform.

Information representing a transform type of a current block may be signaled in a bitstream. The information may be index information, tu_mts_idx, representing one of combinations of a transform type for a horizontal direction and a transform type for a vertical direction.

Based on transform type candidates specified by index information, tu_mts_idx, a transform core for a vertical direction and a transform core for a horizontal direction may be determined. Table 12 and Table 13 represent transform type combinations according to tu_mts_idx.

TABLE 12

| tu_mts_idx | transform type | |
|---|---|---|
| | horizontal | vertical |
| 0 | SKIP | SKIP |
| 1 | DCT-II | DCT-II |
| 2 | DST-VII | DST-VII |
| 3 | DCT-VIII | DST-VII |
| 4 | DST-VII | DCT-VIII |
| 5 | DCT-VIII | DCT-VIII |

TABLE 13

| tu_mts_idx | transform type | |
|---|---|---|
| | horizontal | vertical |
| 0 | DCT-II | DCT-II |
| 1 | SKIP | SKIP |
| 2 | DST-VII | DST-VII |
| 3 | DCT-VIII | DST-VII |

TABLE 13-continued

| tu_mts_idx | transform type | |
|---|---|---|
| | horizontal | vertical |
| 4 | DST-VII | DCT-VIII |
| 5 | DCT-VIII | DCT-VIII |

A transform type may be determined as one of DCT2, DST7, DCT8 or transform skip. Alternatively, a transform type combination candidate may be configured by using only transform cores excluding transform skip.

If it is assumed that Table 12 is used, when tu_mts_idx is 0, transform skip may be applied in a horizontal direction and a vertical direction. When tu_mts_idx is 1, DCT2 may be applied in a horizontal direction and a vertical direction. When tu_mts_idx is 3, DCT8 may be applied in a horizontal direction and DCT7 may be applied in a vertical direction.

If it is assumed that Table 13 is used, when th_mts_idx is 0, DCT2 may be applied in a horizontal direction and a vertical direction. When tu_mts_idx is 1, transform skip may be applied in a horizontal direction and a vertical direction. When tu_mts_idx is 3, DCT8 may be applied in a horizontal direction and DCT7 may be applied in a vertical direction.

Whether index information is encoded or not may be determined based on at least one of a size or a shape of a current block, the number of non-zero coefficients, whether the second transform is performed or whether a sub-partition intra encoding method is applied. In an example, when a sub-partition intra encoding method is applied to a current block, or when the number of non-zero coefficients is equal to or smaller than a threshold value, signaling of index information may be omitted. When signaling of index information is omitted, a default transform type may be applied to a current block.

A default transform type may include at least one of DCT2 or DST7. When there are a plurality of default transform types, one of a plurality of default transform types may be selected by considering at least one of a size, a shape or an intra-prediction mode of a current block, whether the second transform is performed or whether a sub-partition intra encoding method is applied. In an example, one of a plurality of transform types may be determined as a horizontal directional transform type based on whether a width of a current block is in a preset range, and one of a plurality of transform types may be determined as a vertical directional transform type based on whether a height of a current block is in a preset range. Alternatively, a default mode may be determined differently according to a size, a shape or an intra-prediction mode of a current block or whether the second transform is performed.

Alternatively, when only a transform coefficient of a DC component exists in a current block, a horizontal directional transform type and a vertical directional transform type may be set as a default transform type. In an example, when only a transform coefficient of a DC component exists in a current block, a horizontal directional transform type and a vertical directional transform type may be set as DCT2.

A threshold value may be determined based on a size or a shape of a current block. In an example, when a size of a current block is equal to or smaller than 32×32, a threshold value may be set to be 2, and when a current block is greater than 32×32 (e.g., when a current block is a 32×64 or 64×32 sized coding block), a threshold value may be set to be 4.

A plurality of look-up tables may be prestored in an encoding device/a decoding device. At least one of an index value assigned to transform type combination candidates, a type of transform type combination candidates or the number of transform type combination candidates may be different for each of the plurality of look-up tables.

Based on at least one of a size, a shape or an intra-prediction mode of a current block, whether the second transform is applied or not, or whether transform skip is applied to a neighboring block, a look-up table for a current block may be selected.

In an example, when a size of a current block is equal to or less than 4×4, or when a current block is encoded by inter-prediction, a look-up table in Table 12 may be used and when a size of a current block is greater than 4×4, or when a current block is encoded by intra-prediction, a look-up table in Table 13 may be used.

Alternatively, information indicating one of a plurality of look-up tables may be signaled in a bitstream. A decoding device may select a look-up table for a current block based on the information.

In another example, an index assigned to a transform type combination candidate may be adaptively determined based on at least one of a size, a shape, a prediction encoding mode or an intra-prediction mode of a current block, whether the second transform is applied or not, or whether transform skip is applied to a neighboring block. In an example, an index assigned to transform skip when a size of a current block is 4×4 may be smaller than an index assigned to transform skip when a size of a current block is greater than 4×4. Concretely, when a size of a current block is 4×4, an index 0 may be assigned to transform skip and when a current block is greater than 4×4 and equal to or less than 16×16, an index greater than 0 (e.g., an index 1) may be assigned to transform skip. When a current block is greater than 16×16, the maximum value (e.g., 5) may be assigned to an index of transform skip.

Alternatively, when a current block is encoded by inter-prediction, an index 0 may be assigned to transform skip. When a current block is encoded by intra-prediction, an index greater than 0 (e.g., an index 1) may be assigned to transform skip.

Alternatively, when a current block is a 4×4 sized block encoded by inter-prediction, an index 0 may be assigned to transform skip. On the other hand, when a current block is not encoded by inter-prediction, or when a current block is greater than 4×4, an index greater than 0 (e.g., an index 1) may be assigned to transform skip.

It is also possible to use transform type combination candidates different from transform type combination candidates enumerated in Table 12 and Table 13. In an example, a transform type combination candidate which is consisted of transform skip applied to one of a horizontal directional transform or a vertical directional transform and a transform core such as DCT2, DCT8 or DST7, etc. applied to the other can be used. In this case, whether transform skip will be used as a transform type candidate for a horizontal direction or a vertical direction may be determined based on at least one of a size (e.g., a width and/or a height), a shape, a prediction encoding mode or an intra-prediction mode of a current block.

Information representing whether index information for determining a transform type of a current block is explicitly signaled may be signaled in a bitstream. In an example, sps_explicit_intra_mts_flag, information representing whether an explicit transform type determination is allowed for a block encoded by intra-prediction, and/or sps_explicit_inter_mts_flag, information representing whether an explicit transform type determination is allowed for a block encoded by inter-prediction, may be signaled at a sequence level.

When an explicit transform type determination is allowed, a transform type of a current block may be determined based on index information, tu_mts_idx, signaled in a bitstream. On the other hand, when an explicit transform type determination is not allowed, a transform type may be determined based on at least one of a size or a shape of a current block, whether it is allowed to perform transform in a unit of a sub-block, a position of a sub-block including a non-zero transform coefficient, whether the second transform is performed or not, or whether a sub-partition intra encoding method is applied or not. In an example, a horizontal directional transform type of a current block may be determined based on a width of a current block and a vertical directional transform type of a current block may be determined based on a height of a current block. For example, when a width of a current block is smaller than 4 or greater than 16, a horizontal directional transform type may be determined as DCT2. Otherwise, a horizontal directional transform type may be determined as DST7. When a height of a current block is smaller than 4 or greater than 16, a vertical directional transform type may be determined as DCT2. Otherwise, a vertical directional transform type may be determined as DST7. In this case, a threshold value which is to be compared with a width and a height may be determined based on at least one of a size, a shape or an intra-prediction mode of a current block to determine a horizontal directional transform type and a vertical directional transform type.

Alternatively, when a current block has a square shape whose height and width are the same, a horizontal directional transform type and a vertical directional transform type may be set the same, but when a current block has a non-square shape whose height and width are different from each other, a horizontal directional transform type and a vertical directional transform type may be set differently. In an example, when a width of a current block is greater than a height, a horizontal directional transform type may be determined as and a vertical DST7 directional transform type may be determined as DCT2. When a height of a current block is greater than a width, a vertical directional transform type may be determined as DST7 and a horizontal directional transform type may be determined as DCT2.

The number and/or type of transform type candidates or the number and/or type of transform type combination candidates may be different according to whether an explicit transform type determination is allowed or not. In an example, when an explicit transform type determination is allowed, DCT2, DST7 and DCT8 may be used as transform type candidates. Accordingly, each of a horizontal directional transform type and a vertical directional transform type may be set as DCT2, DST8 or DCT8. When an explicit transform type determination is not allowed, only DCT2 and DST7 may be used as a transform type candidate. Accordingly, each of a horizontal directional transform type and a vertical directional transform type may be determined as DCT2 or DST7.

A coding block or a transform block may be partitioned into a plurality of sub-blocks and transform may be performed only for part of a plurality of sub-blocks. Applying transform to only part of a plurality of sub-blocks may be defined as a sub-transform block encoding method.

FIGS. 49 and 50 are diagrams showing an application aspect of a sub-transform block encoding method.

FIG. 49 is a diagram showing an example in which transform is performed only for one of 4 sub-blocks and FIG. 50 is a diagram showing an example in which transform is performed only for any one of 2 sub-blocks. In FIGS. 49 and 50, it is assumed that transform is performed only for a sub-block on which 'Target' is marked.

As in an example shown in FIG. 49, after a coding block is partitioned into 4 sub-blocks by using a vertical line and a horizontal line which are mutually orthogonal, transform and quantization may be performed only for one of them. Transform coefficients in a sub-block on which transform is not performed may be set to 0.

Alternatively, as in an example shown in FIG. 50, after a coding block is partitioned into 2 sub-blocks by using a vertical line or a horizontal line, transform and quantization may be performed only for one of them. Transform coefficients in a sub-block on which transform is not performed may be set to 0.

Information representing whether a sub-transform block encoding method is applied to a coding block may be signaled in a bitstream. The information may be a 1-bit flag, cu_sbt_flag. When the flag is 1, it represents that transform is performed only for part of a plurality of sub-blocks generated by partitioning a coding block or a transform block, and when the flag is 0, it represents that transform is performed without partitioning a coding block or a transform block into sub-blocks.

Whether a sub-transform block encoding method may be used for a coding block may be determined based on at least one of a size, a shape or a prediction encoding mode of a coding block, or whether a combined prediction mode is used for a coding block. In an example, when at least one of a case in which at least one of a width or a height of a coding block is equal to or greater than a threshold value, a case in which inter-prediction is applied to a coding block, or a case in which a combined prediction mode is not applied to a coding block is satisfied, a sub-transform block encoding method may be available for a coding block. In this case, a threshold value may be a natural number such as 4, 8, or 16, etc.

When intra-prediction is applied to a coding block or when an intra block copy mode is applied, a sub-transform block encoding method may be determined to be unavailable.

Alternatively, whether a sub-transform block encoding method is available for a coding block may be determined based on whether a sub-partition intra encoding method is applied to a coding block. In an example, when a sub-partition intra encoding method is applied, a sub-transform block encoding method may be determined to be available.

When a sub-transform block encoding method is determined to be available for a coding block, a syntax, cu_sbt_flag, may be signaled in a bitstream. According to a value of parsed cu_sbt_flag, whether a sub-transform block encoding method is applied may be determined.

On the other hand, when a sub-transform block encoding method is determined to be unavailable for a coding block, signaling of a syntax, cu_sbt_flag, may be omitted. When signaling of a syntax, cu_sbt_flag, is omitted, it may be determined not to apply a sub-transform block encoding method to a coding block.

When a sub-transform encoding method is applied to a coding block, information representing a partitioning shape of a coding block may be signaled in a bitstream. Information representing a partitioning shape of a coding block may include at least one of information representing whether a coding block is partitioned into 4 sub-blocks, information representing a partitioning direction of a coding block or information representing the number of sub-blocks.

In an example, when a syntax, cu_sbt_flag, is 1, a flag, cu_sbt_quadtree_flag, representing whether a coding block is partitioned into 4 sub-blocks may be signaled. When a syntax, cu_sbt_quadtree_flag, is 1, it represents that a coding block is partitioned into 4 sub-blocks. In an example, a coding block may be partitioned into 4 sub-blocks by using 3 vertical lines or 3 horizontal lines, or a coding block may be partitioned into 4 sub-blocks by using 1 vertical line and 1 horizontal line. Partitioning a coding block into 4 sub-blocks may be referred to as quad tree partitioning.

When a syntax, cu_sbt_quadtree_flag, is 0, it represents that a coding block is partitioned into 2 sub-blocks. In an example, a coding block may be partitioned into 2 sub-blocks by using 1 vertical line or 1 horizontal line. Partitioning a coding block into 2 sub-blocks may be referred to as binary tree partitioning.

In addition, a flag representing a partitioning direction of a coding block may be signaled in a bitstream. In an example, a flag, cu_sbt_horizontal_flag, representing whether horizontal directional partitioning is applied to a coding block may be encoded and signaled. When a value of cu_sbt_horizontal_flag is 1, it represents that horizontal directional partitioning using at least one partitioning line parallel to a top side and a bottom side of a coding block is applied. When a value of cu_sbt_horizontal_flag is 0, it represents that vertical directional partitioning using at least one partitioning line parallel to a left side and a right side of a coding block is applied.

According to a size or a shape of a coding block, a partitioning shape of a coding block may be determined. In an example, quad tree partitioning may be available when at least one of a width or a height of a coding block is equal to or greater than the first threshold value. In an example, the first threshold value may be a natural number such as 4, 8, or 16. The first threshold value may be referred to as a quad tree threshold value.

When quad tree partitioning is determined to be available, a syntax, cu_sbt_quadtree_flag, may be signaled in a bitstream. According to a value of parsed cu_sbt_quadtree_flag, whether quad tree partitioning is applied to a coding block may be determined.

When quad tree partitioning is determined to be unavailable, signaling of a syntax, cu_sbt_quadtree_flag, may be omitted. When signaling of a syntax, cu_sbt_quadtree_flag, is omitted, it may be determined to apply binary tree partitioning to a coding block.

Table 14 illustrates a syntax structure for determining whether a syntax, cu_sbt_quadtree_flag, is parsed or not.

TABLE 14

| | Descriptor |
|---|---|
| coding_unit ( x0, y0, cbWidth, cbHeight, treeType ) [ <br> ... <br>   if( !pcm_flag[ x0 ][ y0 ] ) { <br>     if ( CuPredMode [ x0 ][ y0 ] != MODE_INTRA && | |

TABLE 14-continued

| | Descriptor |
|---|---|
| ```
merge_flag[ x0 ] [ y0 ] = = 0 )
    cu_cbf
  if ( cu_cbf ) {
    if ( CuPredMode[ x0 ] [ y0 ] MODE_INTER &&
sps_sbt_enabled_flag &&
      !ciip_flag[ x0 ][ y0 ] ) {
      if( cbWidth <= MaxSbtSize && cbHeight <= MaxSbtSize )
{
        allowSbtVerH = cbWidth >= 8
        allowSbtVerQ = cbWidth >= 16
        allowSbtHorH = cbHeight >= 8
        allowSbtHorQ = cbHeight >= 16
        if( allowSbtVerH || allowSbtHorH ||
  allowSbtVerQ || allowSbtHorQ )
cu_sbt_flag
      }
      if ( cu_sbt_flag ) {
        if( ( allowSbtVerH || allowSbtHorH ) & &
( allowSbtVerQ && allowSbtHorQ) )
          cu_sbt_quad_flag
        if( ( cu_sbt_quad_flag && allowSbtVerQ &&
allowSbtHorQ ) ||
          ( !cu_sbt_quad_flag && allowSbtVerH &&
allowSbtHorH ) )
          cu_sbt_horizontal_flag
          cu_sbt_pos_flag
      }
    }
    transform_tree( x0, y0, cbWidth, cbHeight, treeType )
  }
 }
}
``` | ae(v)<br><br><br><br><br><br><br><br><br><br><br><br>ae(v)<br><br><br><br>ae(v)<br><br><br><br><br>ae(v)<br>ae(v) |

In Table 14, variables, allowSbtVerQ and allowSbtHorQ, are determined based on a quad tree threshold value. In an example, when a quad tree threshold value is 16, allowSbtVerQ represents a variable which is determined based on whether a width of a coding block is 16 or greater than 16, and allowSbtHorQ represents a variable which is determined based on whether a height of a coding block is 16 or greater than 16.

As in an example shown in Table 14, when both variables, allowSbtVerQ and allowSbtHorQ, are true, a syntax, cu_sbt_quad_flag, may be parsed in a bitstream. In an example, when a coding block is 16×8, a variable, allowSbtHorQ, is set to be false, so parsing of a syntax, cu_sbt_quad_flag, may be omitted. Alternatively, when a coding block is 8×16, a variable, allowSbtVerQ, is set to be false, so parsing of a syntax, cu_sbt_quad_flag, may be omitted. When parsing of a syntax, cu_sbt_quad_flag, is omitted, binary tree partitioning may be applied to a coding block.

Table 14 illustrated that quad tree partitioning is available only when both a width and a height of a coding block is equal to or greater than a quad tree threshold value. Unlike illustrated, quad tree partitioning may be set to be available when any one of a width and a height of a coding block is equal to or greater than a quad tree threshold value.

Alternatively, although any one of a width or a height of a coding block is equal to or greater than the first threshold value, quad tree partitioning of a cording block may be determined to be unavailable when the other of a width or a height of a coding block is equal to or less than the second threshold value. In this case, the second threshold value may have a value smaller than the first threshold value. In an example, the second threshold value may be a natural number such as 2, 4, or 8.

Binary tree partitioning in a horizontal direction may be set to be available when a height of a coding block is equal to or greater than a threshold value. Binary tree partitioning in a vertical direction may be set to be available when a width of a coding block is equal to or greater than a threshold value. In this case, a threshold value may be a natural number such as 4, 8, or 16.

When both binary tree partitioning in a horizontal direction and binary tree partitioning in a vertical direction are available, a syntax, cu_sbt_horizontal_flag, may be signaled in a bitstream. On the other hand, when only any one of binary tree partitioning in a horizontal direction and binary tree partitioning in a vertical direction is available, signaling of a syntax, cu_sbt_horizontal_flag, may be omitted. When signaling of a syntax, cu_sbt_horizontal_flag, is omitted, available one among binary tree partitioning in a horizontal direction and binary tree partitioning in a vertical direction may be applied to a coding block.

Alternatively, whether quad tree partitioning is allowed may be determined based on a shape of a coding block. In an example, availability of binary tree partitioning in a horizontal direction and binary tree partitioning in a vertical direction may be determined based on whether a width and height ratio of a coding block is greater than a threshold value. A threshold value may be a natural number such as 2, 3, or 4, etc.

Table 15 shows an example in which whether binary tree partitioning in a horizontal direction or binary tree partitioning in a vertical direction is allowed is determined according to a shape of a coding block.

TABLE 15

| | Descriptor |
|---|---|
| coding_unit ( x0, y0, cbWidth, cbHeight, treeType ) { <br> ... <br>   if ( !pcm_flag[ x0 ][ y0 ] ) { <br>     if ( CuPredMode[ x0 ][ y0 ] != MODE_INTRA && merge_flag[ x0 ][ y0 ] = = 0 ) <br>       cu_cbf | ae(v) |
|   if ( cu_cbf ) { <br>     if ( CuPredMode[ x0 ][ y0 ] = = MODE_INTER && sps_sbt_enabled_flag && <br>       !ciip_flag[ x0 ][ y0 ] ) { <br>       if ( cbWidth <= MaxSbtSize && cbHeight <= MaxSbtSize ) <br> { <br>         allowSbtVerH = cbWidth >= 8 <br>         allowSbtVerQ = cbWidth >= 16 <br>         allowSbtHorH = cbHeight >= 8 <br>         allowSbtHorQ = cbHeight >= 16 <br>         if (cbWidth > 2*cbHeight) <br>           allowSbtHorQ = false <br>         if (cbHeight > 2*cbWidth) <br>           allowSbtVerQ = false <br>         if( allowSbtVerH \|\| allowSbtHorH \|\|    allowSbtVerQ \|\| allowSbtHorQ ) <br>           cu_sbt_flag | ae(v) |
|       } <br>       if ( cu_sbt_flag ) { <br>         if( ( allowSbtVerH \|\| allowSbtHorH ) && ( allowSbtVerQ && allowSbtHorQ) ) <br>           cu_sbt_quad_flag | ae(v) |
|         if ( ( cu_sbt_quad_flag && allowSbtVerQ && allowSbtHorQ ) \|\| <br>           ( !cu_sbt_quad_flag && allowSbtVerH && allowSbtHorH ) ) <br>           cu_sbt_horizontal_flag <br>         cu_sbt_pos_flag | ae(v) <br> ae(v) |
|       } <br>     } <br>     transform_tree ( x0, y0, cbWidth, cbHeight, treeType ) <br>   } <br> } <br> } | |

In Table 15, a variable, allowSbtHorQ, represents whether binary tree partitioning in a horizontal direction is allowed or not, and a variable, allowSbtVerQ, represents whether binary tree partitioning in a vertical direction is allowed or not. When a width of a coding block is greater than twice a height, a virable, allowSbtHorQ, may be set to false. In other words, when a width of a coding block is greater than twice a height, binary tree partitioning in a horizontal direction may not be allowed. When a height of a coding block is greater than twice a width, a variable, allowSbtVerQ, may be set to false. In other words, when a height of a coding block is greater than twice a width, binary tree partitioning in a vertical direction may not be allowed.

When binary tree partitioning in a horizontal direction or binary tree partitioning in a vertical direction is unavailable, signaling of a syntax, cu_sbt_horizontal_flag, may be omitted. When signaling of a syntax, cu_sbt_horizontal_flag, is omitted and a variable, allowSbtHorQ, is true, binary tree partitioning in a horizontal direction may be applied to a coding block. When signaling of a syntax, cu_sbt_horizontal_flag, is omitted and a variable, allowSbtVerQ, is true, binary tree partitioning in a vertical direction may be applied to a coding block.

Information for specifying a sub-block which is a target of a transform among a plurality of sub-blocks may be signaled in a bitstream. In an example, a syntax, cu_sbt_pos_flag, may be signaled in a bitstream. A syntax, cu_sbt_pos_flag, represents whether a transform target is the first sub-block in a coding block. In an example, when binary tree partitioning in a horizontal direction is applied to a coding block, a left sub-block is determined as a transform target if cu_sbt_flag is 1 and a right sub-block is determined as a transform target if cu_sbt_flag is 0. When binary tree partitioning in a vertical direction is applied to a coding block, a top sub-block is determined as a transform target if cu_sbt_flag is 1 and a bottom sub-block is determined as a transform target if cu_sbt_flag is 0.

When quad tree partitioning is applied to a coding block, an index, cu_sbt_pos_idx, specifying one of 4 sub-blocks may be signaled, instead of a flag, cu_sbt_pos_flag. A syntax, cu_sbt_pos_idx, may have a value from 0 to 3 and a sub-block having an index indicated by cu_sbt_pos_idx may be determined as a transform target.

Alternatively, when quad tree partitioning is applied, a sub-block which is a target of a transform may be determined by using a syntax, cu_sbt_horizontal_flag, and a syntax, cu_sbt_pos_flag. For it, although quad tree partitioning is applied, a syntax, cu_sbt_horizontal_flag, may be signaled. In an example, when a syntax, cu_sbt_horizontal_flag, is 1, it represents that one of 2 top sub-blocks or 2 left sub-blocks may be selected as a transform target and when a syntax, cu_sbt_horizontal_flag, is 0, it represents that one of 2 bottom sub-blocks or 2 right sub-blocks may be selected as a transform target. When a syntax, cu_sbt_flag, is 1, it represents that the first sub-block of 2 sub-blocks is selected as a transform target and when a syntax, cu_sbt_flag, is 0, it represents that the second sub-block of 2 sub-blocks is selected as a transform target.

Alternatively, when a coding block is partitioned into 4 sub-blocks, a plurality of sub-blocks may be selected as a transform target. A plurality of sub-blocks may neighbor to each other in a horizontal or vertical direction.

A transform type of a sub-block may be determined by considering a partitioning direction of a coding block and a position of a sub-block. In an example, when a coding block is partitioned in a vertical direction and transform is performed for a sub-block at a left position among sub-blocks, a transform horizontal directional type and a vertical directional transform type may be set differently.

FIGS. 51 and 52 show a horizontal directional transform type and a vertical directional transform type according to a position of a sub-block which is a target of a transform.

In an example shown in FIG. 51, when a sub-block which is a target of a transform includes a top-left sample or a bottom-right sample of a coding block, a horizontal directional transform type and a vertical directional transform type may be set the same. In an example, an example shown in FIG. 51 illustrated that when a sub-block which is a target of a transform includes a top-left sample of a coding block, a horizontal directional transform type and a vertical directional transform type are set as DCT8 and when a sub-block which is a target of a transform includes a bottom-right sample of a coding block, a horizontal directional transform type and a vertical directional transform type are set as DST7.

When a sub-block which is a target of a transform includes a top-right sample or a bottom-left sample of a coding block, a horizontal directional transform type and a vertical directional transform type may be set differently. In an example, an example shown in FIG. 51 illustrated that when a sub-block which is a target of transform includes a top-right sample of a coding block, a horizontal directional transform type is set as DST7 and a vertical directional transform type is set as DCT8. When a sub-block which is a target of a transform includes a bottom-left sample of a coding block, a horizontal directional transform type is set as DCT8 and a vertical directional transform type is set as DST7.

Unlike an example shown in FIG. 51, when a sub-block including a top-left sample or a sub-block including a bottom-right sample in a coding block is determined as a transform target, a horizontal directional transform type and a vertical directional transform type may be set differently and when a sub-block including a top-right sample or a sub-block including a bottom-left sample in a coding block is determined as a transform target, a horizontal directional transform type and a vertical directional transform type may be set the same.

In an example shown in FIG. 52, when a sub-block which is a target of a transform includes a top-left sample of a coding block, a horizontal directional transform type and a vertical directional transform type may be set differently. In an example, in an example shown in FIG. 52, when binary tree partitioning in a horizontal direction is applied and a top sub-block is determined as a transform target, a horizontal directional transform type may be set as DST7 and a vertical directional transform type may be set as DCT7. When binary tree partitioning in a vertical direction is applied and a left sub-block is determined as a transform target, a horizontal directional transform type may be set as DCT8 and a vertical directional transform type may be set as DST7.

Unlike an example shown in FIG. 52, when a sub-block which is a target of a transform includes a top-left sample of a coding block, a horizontal directional transform type and a vertical directional transform type may be set the same, and when a sub-block which is a target of a transform includes a bottom-right sample of a coding block, a horizontal directional transform type and a vertical directional transform type may be set differently.

sub-block which is a target of a transform includes a bottom-right sample of a coding block, a horizontal directional transform type and a vertical directional transform type may be set the same. In an example, in an example shown in FIG. 52, when binary tree partitioning in a horizontal direction is applied and a bottom sub-block is determined as a transform target, a horizontal directional transform type and a vertical directional transform type may be set as DST7. When binary tree partitioning in a vertical direction is applied and a right sub-block is determined as a transform target, a horizontal directional transform type and a vertical directional transform type may be set as DST7.

As in the above-mentioned example, whether a horizontal directional transform type and a vertical directional transform type are set the same may be determined according to a position of a sub-block which is a target of a transform in a coding block. In addition, a horizontal directional transform type and a vertical directional transform type may be determined according to a position of a sub-block which is a target of a transform in a coding block.

For sub-blocks, encoding of information representing whether there is a non-zero coefficient, e.g., CBF, may be omitted. When encoding of CBF is omitted, whether a non-zero residual coefficient is included in each sub-block may be determined based on a position of a block that transform is performed. In an example, when a sub-block at a right or bottom position in a coding block to which binary tree partitioning is applied is determined as a transform target, a CBF value for a sub-block at a left or top position may be inferred to 0 and a CBF value for a sub-block at a right or bottom position may be inferred to 1. Alternatively, when a sub-block at a left or bottom position in a coding block to which binary tree partitioning is applied is determined as a transform target, a CBF value of a sub-block at a left or top position may be inferred to 1 and a CBF value of a sub-block at a right or bottom position may be inferred to 0.

A reconstructed sample of a sub-block that transform is performed may be derived by a sum of a prediction sample and a residual sample. On the other hand, a prediction sample may be set as a reconstructed sample in a sub-block that transform is omitted. Quantization is to reduce energy of a block, and a quantization process includes a process dividing a transform coefficient by a specific constant value. The constant value may be derived by a quantization parameter and a quantization parameter may be defined as a value from 1 to 63.

When transform and quantization are performed in an encoding device, a decoding device may obtain a residual block through dequantization and inverse transform. A reconstructed block for a current block may be obtained by adding a prediction block and a residual block in a decoding device.

When the reconstructed block of the current block is obtained, loss of information as occurring in the process of the quantization and encoding may be reduced via the in-loop filtering. The in-loop filter may include at least one of a deblocking filter, a sample adaptive offset filter (SAO), or an adaptive loop filter (ALF). Hereinafter, a reconstructed block before an in-loop filter is applied is referred to as the first reconstructed block and a reconstructed block after an in-loop filter is applied is referred to as the second reconstructed block.

The second reconstructed block may be obtained by applying at least one of a deblocking filter, SAO or ALF to the first reconstructed block. In this case, SAO or ALF may be applied after a deblocking filter is applied.

Applying the embodiments as described about the decoding process or the encoding process to the encoding process or the decoding process respectively may be included in the scope of the present disclosure. Within the scope of the present disclosure, the embodiments in which operations occur in a predetermined order may be modified to embodiments in which the operations occur in a different order from the predetermined order.

Although the above-described embodiment is described based on a series of the operations or the flowchart, the embodiment does not limit a time-series order of the operations of the method thereto. In another example, the operations may be performed simultaneously or in a different order therefrom as necessary. Further, in the above-described embodiment, each of the components (for example, a unit, a module, etc.) constituting the block diagram may be implemented in a form of a hardware device or software. A plurality of components may be combined with each other into a single component which may be implemented using a single hardware device or software. The above-described embodiment may be implemented using program instructions that may be executed via various computer components. The instructions may be recorded in a computer-readable storage medium. The computer-readable storage medium may contain therein program instructions, data files, data structures, or the like alone or in combination with each other. Examples of the computer-readable storage media include magnetic media such as hard disks, floppy disks, and magnetic tapes, optical storage media such as CD-ROMs, DVDs, and magneto-optical media such as floptical disks, and hardware devices such as ROM, RAM, flash memory, and the like specifically configured to store therein and execute the program instructions. The hardware device may be configured to operate as one or more software modules to perform processing according to the present disclosure, and vice versa.

Industrial Availability

The present disclosure may be applied to an electronic device that encodes/decodes video.

What is claimed is:

1. A video decoding method comprising:
parsing, from a bitstream representing video content, first index information for a coding block, wherein the first index information signals a first triangle merge candidate from among a plurality of candidate triangle merge candidates;
decoding, from the bitstream, a first prediction unit of the coding block according to the first triangle merge candidate;
determining, based on the first index information, a second triangle merge candidate from among the plurality of candidate triangle merge candidates, wherein determining the second triangle merge candidate comprises adding an offset value to the first index information; and
decoding, from the bitstream, a second prediction unit of the coding block according to the second triangle merge candidate.

2. The video decoding method of claim 1, where the offset value is 1.

3. The video decoding method of claim 2, wherein an index value of the first triangle merge candidate is equal to the first index information.

4. The video decoding method of claim 3, wherein an index value of the second triangle merge candidate is equal to the first index information plus the offset value.

5. A system comprising:
one or more processors; and
one or more non-transitory computer readable media storing instructions that, when executed by the one or more processors, cause the one or more processors to perform operations comprising:
parsing, from a bitstream representing video content, first index information for a coding block, wherein the first index information signals a first triangle merge candidate from among a plurality of candidate triangle merge candidates;
decoding, from the bitstream, a first prediction unit of the coding block according to the first triangle merge candidate;
determining, based on the first index information, a second triangle merge candidate from among the plurality of candidate triangle merge candidates, wherein determining the second triangle merge candidate comprises adding an offset value to the first index information; and
decoding, from the bitstream, a second prediction unit of the coding block according to the second triangle merge candidate.

6. The system of claim 5, where the offset value is 1.

7. The system of claim 6, wherein an index value of the first triangle merge candidate is equal to the first index information.

8. The system of claim 7, wherein an index value of the second triangle merge candidate is equal to the first index information plus the offset value.

9. One or more non-transitory computer readable media storing instructions that, when executed by one or more processors, cause the one or more processors to perform operations comprising:
parsing, from a bitstream representing video content, first index information for a coding block, wherein the first index information signals a first triangle merge candidate from among a plurality of candidate triangle merge candidates;
decoding, from the bitstream, a first prediction unit of the coding block according to the first triangle merge candidate;
determining, based on the first index information, a second triangle merge candidate from among the plurality of candidate triangle merge candidates, wherein determining the second triangle merge candidate comprises adding an offset value to the first index information; and
decoding, from the bitstream, a second prediction unit of the coding block according to the second triangle merge candidate.

10. The one or more non-transitory computer readable media of claim 9, where the offset value is 1.

11. The one or more non-transitory computer readable media of claim 10, wherein an index value of the first triangle merge candidate is equal to the first index information.

12. The one or more non-transitory computer readable media of claim 11, wherein an index value of the second triangle merge candidate is equal to the first index information plus the offset value.

* * * * *